(12) United States Patent
Ajami et al.

(10) Patent No.: US 11,849,741 B2
(45) Date of Patent: Dec. 26, 2023

(54) MEAT-LIKE FOOD PRODUCTS

(71) Applicant: Savage River, Inc., El Segundo, CA (US)

(72) Inventors: Dariush Ajami, Torrance, CA (US); David Anderson, Agoura Hills, CA (US); Jesse Dill, Los Angeles, CA (US); Timothy Geistlinger, Redondo Beach, CA (US); Kenny Mayoral, Redondo Beach, CA (US); Huu Ba Ngo, Gardena, CA (US); Thomas Noriega, Culver City, CA (US); Daniel Angus Ryan, El Segundo, CA (US); Deya Suarez-Trujillo, Redondo Beach, CA (US); Michael Timmons, Los Angeles, CA (US); Troy Walton, Pasadena, CA (US)

( * ) Notice: Subject to any disclaimer, the term of this patent is extended or adjusted under 35 U.S.C. 154(b) by 98 days.

(21) Appl. No.: 15/298,199

(22) Filed: Oct. 19, 2016

(65) Prior Publication Data

US 2017/0105438 A1   Apr. 20, 2017

Related U.S. Application Data

(60) Provisional application No. 62/339,765, filed on May 20, 2016, provisional application No. 62/250,161, (Continued)

(51) Int. Cl.
*A23L 13/40* (2023.01)
*A23L 13/00* (2016.01)
(Continued)

(52) U.S. Cl.
CPC ............... *A23L 13/00* (2016.08); *A23L 13/42* (2016.08); *A23L 13/422* (2016.08);
(Continued)

(58) Field of Classification Search
None
See application file for complete search history.

(56) References Cited

U.S. PATENT DOCUMENTS 3,320,070 A   5/1967   Hartman
3,645,747 A   2/1972   Palmer
(Continued)

FOREIGN PATENT DOCUMENTS

GB       2558130       7/2018
JP       S49000500     1/1974
(Continued)

OTHER PUBLICATIONS

Development of Water-in-Oil Emulsions as Delivery Vehicles and Testing with a Natural Antimicrobial Extract Molecules, 2020, 25, 2105; doi:10.3390/molecules25092105.
(Continued)

*Primary Examiner* — Lien T Tran
(74) *Attorney, Agent, or Firm* — David R. Conklin; Kirton McConkie

(57) ABSTRACT

Provided are food products that have structures, textures, and other properties comparable to those of animal meat, and that may therefore serve as substitutes for animal meat. Also provided are processes for production of such ground meat-like food products.

68 Claims, 9 Drawing Sheets

Related U.S. Application Data filed on Nov. 3, 2015, provisional application No. 62/244,092, filed on Oct. 20, 2015.

(51) Int. Cl.
*A23L 33/17* (2016.01)
*A23L 33/24* (2016.01)
*A23L 33/125* (2016.01)

(52) U.S. Cl.
CPC ........... *A23L 13/426* (2016.08); *A23L 33/125* (2016.08); *A23L 33/17* (2016.08); *A23L 33/24* (2016.08); *A23V 2002/00* (2013.01)

(56) References Cited

U.S. PATENT DOCUMENTS

| | | |
|---|---|---|
| 3,898,345 A | 8/1975 | Horrocks et al. |
| 3,935,319 A | 1/1976 | Howard |
| 4,103,034 A | 7/1978 | Ronai et al. |
| 4,376,134 A | 3/1983 | Kumar |
| 4,379,084 A * | 4/1983 | Teranishi .................. A23J 3/28 530/370 |
| 4,755,393 A | 7/1988 | Toba et al. |
| 5,332,595 A | 7/1994 | Gaonkar |
| 5,487,910 A | 1/1996 | Zabel et al. |
| 6,037,571 A | 3/2000 | Christopher et al. |
| 9,693,572 B2 | 7/2017 | Saylock |
| 10,172,380 B2 | 1/2019 | Varadan |
| 2004/0151823 A1 | 8/2004 | Daniels |
| 2005/0003071 A1 | 1/2005 | Cavallini |
| 2005/0058181 A1 | 3/2005 | Gelin |
| 2008/0255247 A1 | 10/2008 | Sagalowicz |
| 2008/0260913 A1* | 10/2008 | Orcutt ...................... A23J 3/16 426/92 |
| 2011/0256264 A1 | 10/2011 | Soe |
| 2012/0093994 A1 | 4/2012 | Hsieh et al. |
| 2012/0135125 A1 | 5/2012 | Muschiolik |
| 2014/0010920 A1 | 1/2014 | Nishimura |
| 2014/0087052 A1 | 3/2014 | Kawai et al. |
| 2014/0113852 A1 | 4/2014 | Bongers |
| 2014/0170283 A1 | 6/2014 | McMindes |
| 2015/0181907 A1* | 7/2015 | Baumer .................... A23L 2/66 426/580 |
| 2015/0305390 A1* | 10/2015 | Vrljic ...................... A23L 27/26 426/574 |
| 2017/0231242 A1 | 8/2017 | Jacobs |

FOREIGN PATENT DOCUMENTS

| | | |
|---|---|---|
| JP | S50025533 | 1/1975 |
| JP | S51032756 | 3/1976 |
| JP | S58121759 | 7/1983 |
| JP | 2005021163 | 1/2005 |
| JP | 2012525118 | 10/2012 |
| WO | WO9423588 | 10/1994 |
| WO | WO9732572 | 9/1997 |
| WO | WO2010126563 | 11/2010 |
| WO | WO2012127694 | 9/2012 |
| WO | WO2013010042 | 1/2013 |

OTHER PUBLICATIONS

Composition of Interfacial Layers in Complex Food Emulsions Before and After Aeration: Effect of Egg to Milk Protein Ratio. Journal of Dairy Science vol. 88:30-39. No. 1, 2005.

Food-grade Pickering emulsions stabilised with solid lipid particle. Food Funct., 2016, 7, 2712.

Emulsion and its Applications in Food Processing. Int. Journal of Engineering Research and Applications ISSN 2248-9622, vol. 4, Issue 4(Version 1), Apr. 2014, pp. 241-248.

Emulsion Design to Improve the Delivery of Functional Lipophilic Components. Annu. Rev. Food Sci. Technol. 2010. 1:241-69.

Bjerregaard et al. Formulation and evaluation of release and swelling mechanism of water-in-oil emulsion using factorial design. International Journal of Pharmaceutics. 1999. vol. 193. 1-11.

Ting et al. Techniques and methods to study functional characteristics of emulsion systems. Journal of Food and Drug Analysis. 2017. vol. 25. 16-26.

Chee-Teck Tan. Physical Chemistry in Flavor Products Preparation. ACS Symposium Series. 1997. Chapter 1. 1-17.

Carneiro et al. Flavoring properties that effect the retention of volatile components during encapsulation process. Food Chemistry: X. 2022. vol. 13. 100230-10239.

Strotmann et al. Mammalian olfactory receptors. Frontiers in Cellular Neuroscience. 2009. vol. 3. 1-10.

Baron et al. Mygolbin-Induced Lipid Oxidation. A Review. 2002. vol. 50. 3887-3897.

Genot et al. Lipid Oxidation in Oil-in-Water Emulsions: Involvement of the Interfacial Layer. vol. 13. 945-977.

Relkin_Effect of Fat Nature and Aroma Compound Hydrophobicity.

Weisany_Targeted delivery and controlled released of essential oils using nanoencapsulation: A review.

Zayas_J.F._Functionality of Proteins in Food. Chapter 3: Emulsifying Properties of Protein. 1997.

Kale,_S.,_and_Deore,_S._Emulsion and Nano Emulsion: A review. Sys Rev Phar. 2017:8(1):39-47 DOI: 10.5530/SRP.2017.1.8.

Mao_L.,_Roos,_Y.H.,_Biliaderis,_C.G.,_and_Miao,_S._Food emulsions as delivery systems for flavor compounds: A review. Critical Reviews in Food Science and Nutrition, 2015, 57(15), 3173-3187. Doi: 10.1080/10408398/2015.1098586.

\* cited by examiner

MEAT-LIKE FOOD PRODUCTS

CROSS REFERENCE TO RELATED APPLICATIONS

This application claims priority from Provisional Application Ser. No. 62/244,092 filed on Oct. 20, 2015; Provisional Application Ser. No. 62/250,161 filed on Nov. 3, 2015; and Provisional Application Ser. No. 62/339,765 filed on May 20, 2016; which are hereby incorporated by reference in their entireties.

FIELD OF THE INVENTION

Provided are food products that are not derived from animals but that may serve as substitutes for animal meat or products derived from animal meat because they provide textural and other properties, nutritional benefits, use versatilities, cooking experiences, and eating experiences that are comparable or superior to those of animal meat or meat derived products. Also provided are processes for production of such meat-like food products.

BACKGROUND OF THE INVENTION

Animal meat is one of the most versatile protein-rich food products available. However, the health and environmental benefits of vegetarian and vegan diets are broadly recognized, and consumers are increasingly making conscious efforts to decrease their intake of animal derived food items and their unhealthy ingredients (e.g., saturated fatty acids, cholesterol).

To meet the rising demand for vegetarian and vegan dietary products and to address the environmental burden associated with animal meat consumption, food scientists have engaged in efforts to develop protein-rich food products that are not derived from animals but provide similar textural properties and nutritional benefits as animal-derived food products. However, such efforts have had limited success, and accordingly consumer satisfaction with and acceptance of the new food products have been low. For example, no food product is currently available that resembles animal meat when uncooked (e.g., has meat-like color, malleability, and use versatility), undergoes meat-like changes in attributes during cooking (e.g., browns, releases sizzling fat, produces meat-like taste, releases meat-like aroma, hardens without losing cohesiveness, has various stages of doneness), and possesses meat-like attributes when cooked (e.g., meat-like color, aroma, taste, chewiness, cohesiveness, texture). Instead, the available products have looser and less complex protein structures that disassemble easily during chewing, requiring an unsatisfactory, diminutive bite force and chewing time, and imparting sensations of "mealiness", "rubberiness", "sponginess", and/or "sliminess". The new food products also cannot trap moisture and flavor effectively. And they aim to simulate only cooked animal meat, providing neither the use versatility that uncooked animal meat offers nor the sensory experiences consumers are accustomed to when cooking animal meat. Furthermore, many of the available products comprise agents such as gluten or soy protein that cannot be consumed by an increasing number of people who are sensitive to these agents or who prefer to not consume them. Lastly, production processes for many currently available meat-like food products are cumbersome, time-consuming, and costly. In sum, there are currently no plant-derived food products available to consumers that provide as comparable a textural and sensory experience, nutritional benefit, use versatility, cooking experience, and eating experience, and as cheap and as versatile a source of protein, as animal meat.

Therefore, there exists an unmet need for non-animal-derived protein products that have the structure, texture, and other properties of animal meat, that do not challenge common nutritional sensitivities, and that provide the use versatility and cooking experiences that consumers are accustomed to from animal meat. The present invention provides such and related food products, as well as processes for their production.

SUMMARY OF THE INVENTION

One aspect of the present invention provides meat-like food products that comprise at least about 25% by weight of one or more meat structured protein products bound together by one or more binding agents so as to produce food products that have one or more similar or superior attributes compared to animal meat. In some embodiments, the meat-like food products comprise two or more meat structured protein products having different attributes. In some embodiments, the meat-like food products further comprise one or more agent release systems that impart meat-like attributes to the meat-like food products such that the meat-like food products better simulate animal meat. The agent release systems can be distributed in the meat-like food products uniformly or non-uniformly. The agents to be released comprised in the agent release systems can impart or enhance meat-like attributes when comprised in the agent release systems and/or after trigger conditions cause their release from the agent release systems. In some embodiments, the agent releases systems are emulsions. In some embodiments, the agent release systems are gels. In some embodiments, the agent release systems are encapsulates.

Another aspect of the present invention provides agent release systems that impart meat-like attributes to the meat-like food products such that the meat-like food products better simulate animal meat. In some such embodiments, the agents to be released comprised in the agent release systems impart or enhance meat-like attributes when comprised in the agent release systems and/or after trigger conditions cause their release from the agent release systems. In some embodiments, the agent releases systems are emulsions. In some embodiments, the agent release systems are gels. In some embodiments, the agent release systems are encapsulates.

Another aspect of the present invention provides processes for producing the meat-like food products by coagulating meat structured protein products, and optionally agent released systems and/or other ingredients, using one or more binding agents.

Yet another aspect of the present invention provides extended meat products comprising animal meat products combined with the meat-like food products provided herein.

DETAILED DESCRIPTION OF THE INVENTION

Figure 1:
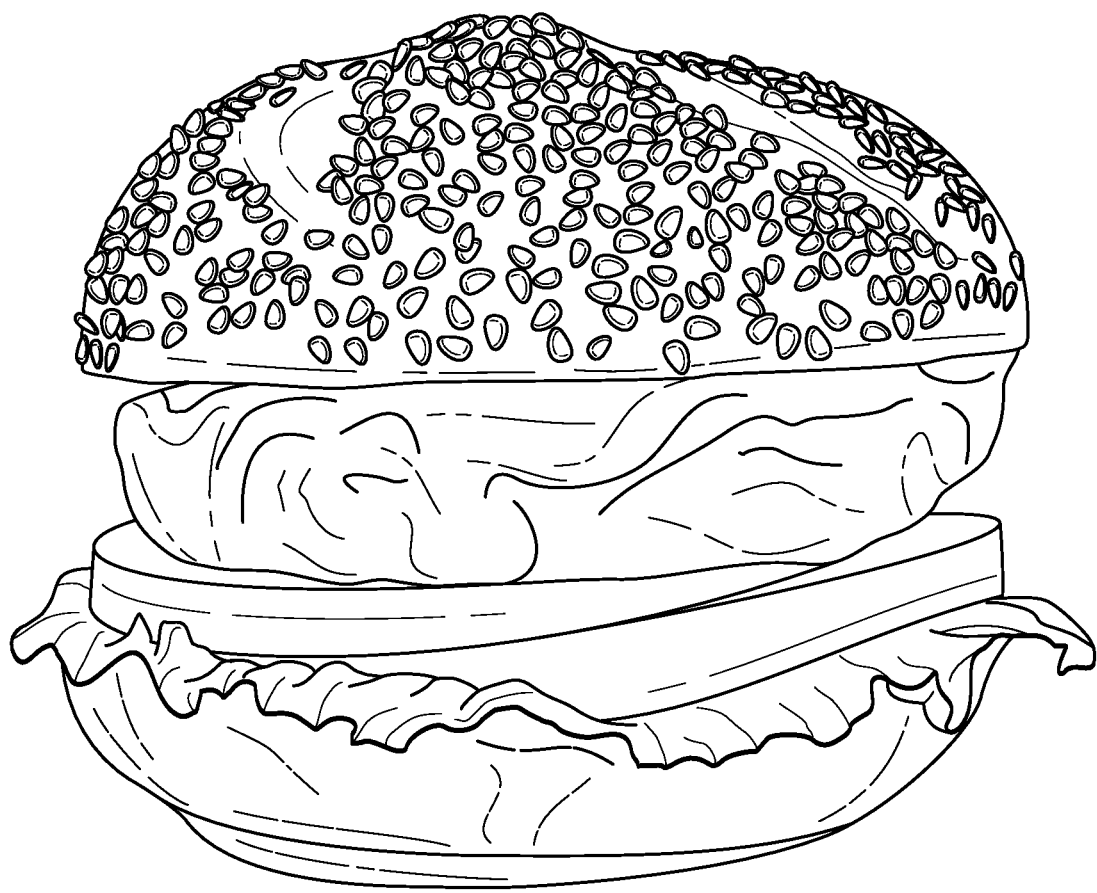
FIG. 1 shows a perspective view of a meat-like food product comprising a burger patty, in accordance with a representative embodiment of the present invention.

Unless defined otherwise, all technical and scientific terms used herein have the same meaning as is commonly understood by one of ordinary skill in the art to which this disclosure pertains.

Definitions

The term "80/20 ground beef" as used herein refers to ground animal meat that comprises 20% by weight of fat.

The term "90/10 ground beef" as used herein refers to ground animal meat that comprises 10% by weight of fat.

The terms "a" and "an" and "the" and similar referents as used herein refer to both the singular and the plural, unless otherwise indicated herein or clearly contradicted by context.

The term "about" as used herein refers to greater or lesser than the value or range of values stated by 1/10 of the stated values, but is not intended to limit any value or range of values to only this broader definition. For instance, a value of "about 30%" means a value of between 27% and 33%. Each value or range of values preceded by the term "about" is also intended to encompass the embodiment of the stated absolute value or range of values.

The term "adhesiveness" as used herein refers to a Texture Profile Analysis (TPA) parameter that quantifies a material's tendency to adhere to the probe.

The term "agent release system" as used herein refers to dispersed system components that include one or more agents to be released and that protect such agents to be released from degradation or other chemical transformation or interaction with their environment until trigger conditions cause the release of the agents to be released from the dispersed system components.

The term "agent to be released" as used herein refers to a compound that is not an integral part of an agent release system but that is non-covalently bound to an agent release system, for example, via hydrogen bonding, ionic bonding, hydrophilic interaction, electrostatic interaction, ion exchange, metal ion chelation, coordination complex formation, or precipitation (e.g., involving hydroxyl, carboxyl, phosphate, sulfate, or amino groups), or that is physically captured in an agent release system. Examples of agents to be released include but are not limited to coloring agents, color stabilizers, color enhancers, aroma agents, aroma stabilizers, aroma enhancers, taste agents, taste stabilizers, taste enhancers, pH and/or ionic strength adjusting agents, binding agents, transition metals, transition metal complexes, anthocyanins, betanins, chelating agents, antioxidants, anti-microbial agents, metal ions, metal ion complexes, lipids, proteins, amino acids, carbohydrates, edible fibers, essential nutrients, Maillard reaction precursors and other precursor molecules that can specifically or non-specifically interact with each other or other compounds to produce agents that impart or enhance meat-like attributes, biologically active substances, food safe ingredients, non-animal ingredients, animal ingredients, nutritional supplements, seasoning agents, salts, sugars (e.g., ribose, glucose), nucleic acids (e.g., DNA, RNA), microbial biomass, iron-containing molecules (e.g., heme, hemin, porphyrin, leghemoglobin, myoglobin, hemoglobin), cell structures (e.g., chloroplasts), medicinal compounds, nutraceuticals, agents that increase the enjoyment or healthfulness of the meat-like food products provided herein, and mixtures thereof.

The term "animal meat" as used herein refers to flesh derived from skeletal muscle or from other organs (e.g., kidney, heart, liver, gallbladder, intestine, stomach, bone marrow, brain, thymus, lung, tongue), or parts thereof, derived from an animal. The animal meat can be dark or white meat. Suitable animals from which the animal meat can be derived include but are not limited to cattle, lamb, mutton, horse, poultry (e.g., chicken, duck, goose, turkey), fowl (any bird species, pigeon, dove, grouse, partridge, ostrich, emu, pheasant, quail), fresh or salt water fish (e.g., catfish, tuna, spearfish, shark, halibut, sturgeon, salmon, bass, muskie, pike, bowfin, gar, eel, paddlefish, bream, carp, trout, walleye, snakehead, crappie, sister, mussel, scallop, abalone, squid, octopus, sea urchin, cuttlefish, tunicate), crustacean (e.g., crab, lobster, shrimp, barnacle), game animals (e.g., deer, fox, wild pig, elk, moose, reindeer, caribou, antelope, zebra, squirrel, marmot, rabbit, bear, beaver, muskrat, opossum, raccoon, armadillo, porcupine, bison, buffalo, boar, lynx, bobcat, bat), reptiles (e.g., snakes, turtles, lizards, alligators, crocodiles), any insect or other arthropod, rodent (nutria, guinea pig, rat, mice, vole, groundhog, capybara), kangaroo, whale, and seal. The term refers to ground, chopped, shredded, or otherwise processed animal meat. The term encompasses both uncooked, cooking, and cooked animal meat unless otherwise indicated herein or clearly contradicted by context.

The term "aroma" as used herein refers to the smell or odor that represents the sensory attributes of certain volatile substances perceptibly by the olfactory system (i.e., the main and accessory olfactory organs). The aroma of a food product can be tested using a panel of expert human subjects. Alternatively, the aroma of a food product can be tested by head space gas chromatography-mass spectrometry (GCMS), including using automated olfactometers, such as, for example, the Heracles II (Alpha MOS America, Hanover, MD). Variables that can be titrated to modulate the aroma of the meat-like food products provided herein include but are not limited to aroma agents, aroma stabilizers, aroma enhancers, and metal complexes. The term "aroma agent" as used herein refers to a volatile substance that activates aroma receptors in the olfactory system. The term "aroma stabilizer" as used herein refers to a compound that stabilizes an aroma agent or the perception of the aroma agent by the olfactory system. The term "aroma enhancer" as used herein refers to a volatile compound that increases the sensitivity of aroma-receptors in the olfactory system. Examples of suitable aroma agents include but are not limited to oil soluble aroma compounds, water soluble aroma compounds, volatile aroma compounds, meat-like furans (e.g., 2-methyl-3-furanthiol, methyl furfuryl disulfide), aldehydes (e.g., 2,4-decadienal), guaicol, 3-methylbutanal, methional, 2-acetyl-2-thiazoline, 2-ethyl-3,5-dimethylpyrazine, 2,3-diethyl-5-methylpyrazine, 3-hydroxy-4,5-dimethyl-2(5H)-furanone, 4-hydroxy-2,5-dimethyl-3(2H)-furanone, octen-3-ol, phenyl acetic acid, 2,4-decadienal, ionone beta, trithioacetone, benzyl mercaptan, furfuryl mercaptan, methyl furfuryl disulfide, oil onion, pyrazine, ammonium sulfide, dimethyl sulfide, acetoin, methional, para cresol, phenyl acetaldehyde, isovaleraldehyde, 5-methyl-2-phenyl-5-hexenal, homofuranol, 2-methyl tetrahydrofuran-3-thiol, methyl mercaptan, furaneol, indole, precursor molecules (i.e., molecules that can specifically or non-specifically react with each other or other compounds to produce agents that impart or enhance meat-like aroma; e.g. Maillard reaction precursors (e.g., 5-8 carbon reducing sugars that have a reactive aldehyde moiety [e.g., ribose, xylose, fructose, arabinose, glucose], reactive primary amines [e.g., lysine, glycine], reactive sulfurs [e.g., cysteine, methyl 3-(methylthio)propionate, thiamine, dimethyl sulfoxide, sodium sulfide], reactive amino acids [e.g., glutamic acid, alanine, aspartic acid, histidine, proline, tryptophan], reactive nucleotides [in mono-, di- and tri-phosphate form; e.g., inosine mono-, di-, tri-phosphate, guanosine mono-, di-, tri-phosphate], reactive peptides [e.g., carnitine, glutathione, mannoproteins; e.g., from food safe non-animal sources such as yeast, mushrooms, algae, bacteria, cheese molds, *Fusarium venenatum, Lactobacillus acidophilus, Lactobacillus lactis, Chlorella*, and *Spirulina*], food safe ionic strength modulators [e.g., sodium/potassium/calcium mono-, di-, or tri-phosphate, sodium/potassium/calcium chloride], food safe pH modulators [e.g., malic acid, tartaric acid, succinic acid, lactic acid], reaction catalysts [coordinated metal ions, such as iron(II), copper(II), and manganese (II)), as salt form or coordinated by heterocyclic ligands or porphyrin-like molecules and possibly stabilized by peptides or proteins, such as non-purified, non-isolated, semi-purified, partially purified, or highly purified forms of heme or hemoproteins, cytochromes, porphyrins, and other heterocycles (e.g., corrins, chlorins, bacteriochlorophylls, corphins, bacteriochlorin, isobacteriochlorin)], molecules such as guanosine and/or inosine mono-, di-, or tri-phosphate that synergistically activate taste and olfactory receptors to enhance taste and aroma), and combinations and derivatives thereof. Examples of suitable aroma enhancers include but are not limited to combinations of volatile chemicals (such as, but not limited to, the ones listed above) that, in combination increase the sensitivity of aroma-receptors in the olfactory system (for example: combining isoamyl acetate and whiskey lactone can produce synergistic activation of olfactory receptors.

The term "binding" as used herein refers to promoting, supporting, or enabling holding together ingredients in one cohesive mass. A method for quantifying binding is described in Example 6.

The term "binding agent" as used herein refers to an agent that mediates binding.

The term "cell wall" as used herein refers to the molecular structure that surrounds many biological cells and provides the cells with structural support and other vital functions.

The composition of cell walls differs between cell types, but they frequently comprise polysaccharides and glycoproteins.

The term "cell wall fragment" as used herein refers to cell walls that are not intact but that are broken into fragments.

The term "cell wall material" as used herein refers to cell walls and cell wall fragments, and extends to cell walls and cell wall fragments with bound cell membrane. Cell wall material is also known in the art under the terms ghosts, hulls, husks, shells, envelopes, debris, refuse, or "ref".

The term "chewiness" as used herein refers to a TPA parameter that is calculated as the product of the TPA parameters gumminess and springiness (see Example 6). It is thought to express the energy required to chew a food product to a state where it is ready for swallowing. Variables that can be titrated to modulate the chewiness of the meat-like food products provided herein include but are not limited to densities of structured protein products, MC, and binding agents with different viscoelastic properties.

The term "cohesiveness" as used herein refers to a TPA parameter that is calculated from the area of work during the first compression of the food product (see Example 6). It is thought to express the structural integrity of a food product, and refers to a property characterized by the strength of internal bonding that makes up the body of a food product. Variables that can be titrated to modulate the cohesiveness of the meat-like food products provided herein include but are not limited to types and amounts of binding agents.

The term "color" as used herein refers to a combination of hue, saturation, and brightness of light reflected by an object. The color of a food product can be tested using a panel of human sensory experts. Alternatively, the color of a food product can be tested using automated colorimetry (see Example 1). Variables that can be titrated to modulate the color of the meat-like food products provided herein include but are not limited to types and amounts of coloring agents, color stabilizers, and color enhancers. The term "coloring agent" as used herein refers to a compound that confers a color on a food product. The term "color stabilizer" as used herein refers to a compound that stabilizes a coloring agent or the perception of the color conferred by the coloring agent by the visual system. The term "color enhancer" as used herein refers to a compound that intensifies the coloring conferred by a coloring agent or the perception of such coloring. Examples of suitable coloring agents include but are not limited to artificial colorants, natural colorants, natural extracts (e.g., beet root extract, pomegranate fruit extract, cherry extract, carrot extract, red cabbage extract, red seaweed extract), modified natural extracts, natural juices (e.g., beet root juice, pomegranate fruit juice, cherry juice, carrot juice, red cabbage juice, red seaweed juice), modified natural juices, FD&C (Food Drug & Cosmetics) Red No. 3 (erythrosine), FD&C Green No. 3 (fast green FCF), FD&C Red No. 40 (allura red AC), FD&C Yellow No. 5 (tartazine), FD&C Yellow No. 6 (sunset yellow FCF), FD&C Blue No. 1 (brilliant blue FCF), FD&C Blue No. 2 (indigotine), titanium oxide, annatto, anthocyanins, betanins, beta-APE 8 carotenal, beta-carotene, black currant, burnt sugar, canthaxanthin, caramel, car-mine/carminic acid, cochineal extract, curcumin, lutein, carotenoids, monascin, paprika, riboflavin, saffron, turmeric, and combinations thereof. Examples of suitable color stabilizers include but are not limited to antioxidants (e.g., ascorbic acid, vitamin E, rosemary extract, tocopherols, gluconate, metal ions), pH and/or ionic strength adjusting agents (e.g., sodium bicarbonate, potassium bicarbonate), chelating agents (e.g., EDTA), reactive metal complexes (ferric and ferrous salts

[e.g., chloride, phosphate, citrate], zinc, copper, magnesium, and manganese), anti-microbial agents (e.g., citrus fruit extract), and combinations thereof. Examples of suitable color enhancers include but are not limited to co-pigments (i.e., non-colored compounds that bind coloring agents creating more color than unbound coloring agents [e.g., non-flavonoid phenols, flavonols, arginine]), metal ions (e.g., ferric salts), metal ion complexes, transition metal complexes, polyphenols, and combinations thereof.

The term "controlled conditions" as used herein refers to conditions that are defined by a human, such as, for example, level of oxygenation, pH, salt concentration, temperature, and nutrient (e.g., carbon, nitrogen, sulfur) availability. A non-animal source grown under controlled conditions may produce a distribution of protein, carbohydrate, lipid, and other compounds that are not native to the non-animal source.

The term "cooked animal meat" as used herein refers to an animal meat that underwent heating until it reached certain attributes. For animal meats such as beef, veal, and lamb steaks and roasts, a "rare cooked animal meat" refers to a soft piece of animal meat that has a cold, red center and an internal temperature of 52-55° C.; a "medium cooked animal meat" refers to a firm piece of animal meat that is pink and has an internal temperature of 60-65° C.; and a "well done cooked animal meat" as used herein refers to a firm piece of animal meat that is grey-brown throughout and has an internal temperature of 71° C.

The term "cooked meat-like food product" as used herein refers to a meat-like food product that underwent heating until it reached a mean internal temperature of between about 60° C. and about 80° C.

The term "cooking experience" as used herein refers to the experience of seeing, hearing, and smelling a food product as it is being cooked, including smelling the aroma, hearing the sizzle sound, and seeing the color change a food product produces or undergoes as it is cooked.

The term "cooking time" as used herein refers to the time required to heat an uncooked meat-like food product to doneness on an electric griddle calibrated to a surface temperature of 350° F. Variables that can be titrated to modulate the cooking time of the meat-like food products provided herein include but are not limited to mass, temperature, surface area and different states of products.

The term "cook loss" as used herein refers to the reduction in weight when a food product is cooked. Variables that can be titrated to modulate the cook loss of the meat-like food products provided herein include but are not limited to MC, lipid content, volatile compounds content, humectants such as sorbitol, structured protein products with different densities, oil absorbing capacity, and surface area.

The term "crosslinking" as used herein refers to the chemical, enzymatic, or chemoenzymatic formation of new covalent bonds between polypeptides.

The term "doneness" as used herein refers to a state in which a meat-like food product as provided herein after heating has obtained one or more similar or superior meat-like attributes compared to cooked animal meat (e.g., rare cooked animal meat, medium cooked animal meat, well done cooked animal meat). Specifically, a food product is "done" when compared to cooked animal meat if it has obtained similar or superior color, aroma, taste, chewiness, gumminess, springiness, cohesiveness, resilience, adhesiveness, hardness, MC, juiciness, internal temperature, cook loss, or head space GCMS.

The term "dough" as used herein refers to a blend of dry ingredients ("dry mix"; e.g., proteins, carbohydrates, and lipids including liquid oils) and liquid ingredients ("liquid mix"; e.g., water or juice [i.e., liquid based extract from a non-animal source such as a plant or any part of a plant]) from which a meat structured protein product is produced through the application of mechanical energy (e.g., spinning, agitating, shaking, shearing, pressure, turbulence, impingement, confluence, beating, friction, wave), radiation energy (e.g., microwave, electromagnetic), thermal energy (e.g., heating, steam texturing), enzymatic activity (e.g., crosslinking activity), chemical reagents (e.g., pH and/or ionic strength adjusting agents, kosmotropic salts, chaotropic salts, gypsum, surfactants, emulsifiers, fatty acids, amino acids), other methods that lead to protein denaturation and protein fiber alignment, or combinations of these methods, followed by fixation of the fibrous structure (e.g., by rapid temperature and/or pressure change, rapid dehydration, chemical fixation, redox).

The term "emulsion" as used herein refers to a mixture of immiscible liquids in which one or more liquids ("dispersed phase(s)") are dispersed as fine droplets in another liquid ("continuous phase").

The term "emulsifier" as used herein refers to a molecule that concentrates at the interface between the phases of an emulsion and reduces the interfacial tension between the phases and thus stabilizes the emulsion. Nonionic emulsifiers that can stabilize oil-in-water or water-in-oil emulsions can be characterized by the Hydrophilic Lipophilic Balance (HLB), which indicates the solubility of the emulsifier. An emulsifier with a high HLB is more soluble in water and promotes oil-in-water emulsions as provided herein. An emulsifier with a low HLB is more soluble in oil and promotes water-in-oil emulsions as provided herein.

The terms "extending", and its passive "extended", as used herein refer to improving the nutritional content or other property of a food product.

The term "extended meat product" as used herein refers to animal meat that is extended with meat-like food products as provided herein.

The term "flour" as used herein refers to a comminuted form of defatted material derived from a natural source that typically has between about 20% and about 40% protein on a dry-weight basis.

The term "food product" as used herein refers to any article that can be consumed (e.g., eaten, drunk, or ingested) by a subject.

The term "gel" as used herein refers to a collection of solid polymer networks dispersed within a liquid that yields a material with properties ranging from a viscous liquid to loose solid.

The term "greasiness" as used herein refers to the qualitative perception of an oil-like slickness or slipperiness in a food product regardless of the actual amount of oil present in the product.

The term "gumminess" as used herein refers to a TPA parameter of a food product and is the product of the TPA parameters hardness and cohesiveness (see Example 6).

The term "hardness" as used herein refers to a texture parameter of a food product and is calculated from the peak force of the first compression of the food product in either the TPA assay or the compression assay (see Example 6). It is thought to correlate with the force required to compress a food product between molars during chewing. Variables that can be titrated to modulate the hardness of the meat-like food products provided herein include but are not limited to lipid content, structured protein products with different densities, MC, and binding agents with different viscoelastic properties, and pH.

The term "head space gas chromatography-mass spectrometry (GCMS) pattern" as used herein refers to the GCMS spectra of volatile compounds obtained when analyzing air surrounding a food product (e.g., the air enclosed in packaging of a food product).

The term "high edible fiber component" as used herein refers to an ingredient that comprises at least about 10% by weight of edible fiber.

The term "hydrogel" as used herein refers to a gel in which the fluid is water.

The term "lipogel" as used herein refers to a gel in which the fluid is a lipid.

The term "juiciness" as used herein refers to the moist feeling that can spread in the mouth during chewing. Juiciness may depend on the water and oil content of a food product. As described in Example 6, a quantitative definition for juiciness is the ratio between the mass of extracted juice and the mass of the cooked sample prior to juice extraction. This ratio, expressed as a percentage, is called the "% Juice Cooked Mass" or "JCM". Another quantitative definition for juiciness is the "oil/water volume" ("OWV") of the extracted juice, which is the ratio between the extracted oil volume and the extracted water volume. Variables that can be titrated to modulate the juiciness of the meat-like food products provided herein include but are not limited to lipid content and binding agents.

The term "malleability" as used herein refers to the property of a food product to be shaped into various forms without breaking. Variables that can be titrated to modulate the malleability of the meat-like food products provided herein include but are not limited to lipid content, structured protein products with different densities, MC, and binding agents with different viscoelastic properties, and pH.

The term "meat-like" as used herein refers to resemblance to animal meat.

The term "meat-like food product" as used herein refers to a food product that is not derived from an animal but has structure, texture, and/or other properties comparable to those of animal meat. The term refers to uncooked, cooking, and cooked meat-like food product unless otherwise indicated herein or clearly contradicted by context.

The term "meat structured protein product" as used herein refers to a product comprising protein fiber networks and/or aligned protein fibers that produce meat-like textures. It can be obtained from a dough after application of mechanical energy (e.g., spinning, agitating, shaking, shearing, pressure, turbulence, impingement, confluence, beating, friction, wave), radiation energy (e.g., microwave, electromagnetic), thermal energy (e.g., heating, steam texturizing), enzymatic activity (e.g., transglutaminase activity), chemical reagents (e.g., pH adjusting agents, kosmotropic salts, chaotropic salts, gypsum, surfactants, emulsifiers, fatty acids, amino acids), other methods that lead to protein denaturation and protein fiber alignment, or combinations of these methods, followed by fixation of the fibrous and/or aligned structure (e.g., by rapid temperature and/or pressure change, rapid dehydration, chemical fixation, redox), and optional post-processing after the fibrous and/or aligned structure is generated and fixed (e.g., hydrating, marinating, drying, coloring). Methods for determining the degree of protein fiber network formation and/or protein fiber alignment are known in the art and include visual determination based upon photographs and micrographic images, as exemplified in U.S. Utility application Ser. No. 14/687,803 filed Apr. 15, 2015. In some embodiments, at least about 55%, at least about 65%, at least about 75%, at least about 85%, or at least about 95% of the protein fibers are substantially aligned. Protein fiber networks and/or protein fiber alignments may impart cohesion and firmness whereas open spaces in the protein fiber networks and/or protein fiber alignments may tenderize the meat structured protein products and provide pockets for capturing water, carbohydrates, salts, lipids, flavorings, and other materials that are slowly released during chewing to lubricate the shearing process and to impart other meat-like sensory characteristics.

The term "melted fat release" as used herein refers to the fat that is melted when a food product is cooked and that is released from the food product (e.g., to form a puddle on the cooking surface around the food product). The melted fat release of a food product can be determined using a melting point apparatus and griddle. Variables that can be titrated to modulate the melted fat release of the meat-like food products provided herein include but are not limited to lipid content and water content.

The term "microbe" as used herein is an abbreviation for microorganism, and refers to a unicellular organism. As used herein, the term includes all bacteria, all archaea, unicellular protista, unicellular animals, unicellular plants, unicellular fungi, unicellular algae, all protozoa, and all chromista.

The term "modified non-animal source" as used herein refers to a non-animal source that is altered from its native state (e.g., mutated, genetically engineered).

The term "moisture content" and its acronym "MC" as used herein refer to the amount of water in a food product calculated as percentage change in mass following the evaporation of water from a sample. Variables that can be titrated to modulate the MC of the meat-like food products provided herein include but are not limited to humectant content (e.g., sorbitol), structured protein products with different water absorbing characteristics, lipid content, and/or binding agents with different water retention characteristics.

The term "mouth feel" as used herein refers to the overall appeal of a food product, which stems from the combination of several characteristics that together provide a satisfactory sensory experience. The mouth feel of a food product can be determined using a panel of human sensory experts.

The term "native" as used herein refers to what is natural. For example, a protein that is native to a non-animal source is naturally produced by the non-animal source when the non-animal source is grown under natural or controlled conditions.

The term "non-purified protein" as used herein refers to a protein preparation in which no protein is more concentrated relative to other proteins in the protein preparation than is present in the natural source from which the protein preparation is derived.

The term "oil-in-water emulsion" as used herein refers to a blend of oil and water wherein the oil is dispersed in the water as droplets.

The terms "optional" or "optionally" mean that the feature or structure may or may not be present, or that an event or circumstance may or may not occur, and that the description includes instances where a particular feature or structure is present and instances where the feature or structure is absent, or instances where the event or circumstance occurs and instances where the event or circumstance does not occur.

The term "organogel" as used herein refers to a gel in which the fluid is an organic liquid (e.g., an organic solvent, mineral oil, or vegetable oil).

The term "panel of human sensory experts" as used herein refers to a group of human subjects trained in evaluating food products. The evaluation of a panel of human sensory experts can involve eyeing, feeling, smelling, chewing, and tasting of the product to judge samples for various attributes.

The term "partially purified protein" as used herein refers to a protein preparation in which one or more proteins are between about 2-fold and about 10-fold more abundant relative to other proteins in the protein preparation than they are present in the natural source from which the protein preparation is derived.

The term "pH and/or ionic strength adjusting agent" as used herein refers to an agent that raises or lowers the pH and/or the ionic strength of a solution. The pH and/or ionic strength adjusting agent can have an acidic (less than 7) pH ("acidic pH and/or ionic strength adjusting agent") or a basic (more than 7) pH ("basic pH and/or ionic strength adjusting agent"). The pH of a pH and/or ionic strength adjusting agent can be measured by methods known in the art, including but not limited to use of a pH meter, a pH strip, a colorimetric kit, conductance, total dissolved solids, or titration. The pH and/or ionic strength adjusting agent may be organic or inorganic. Examples of suitable pH adjusting agents include but are not limited to salts, ionic salts, alkali metals, alkaline earth metals, and monovalent or divalent cationic metals. Examples of suitable salts include but are not limited to hydroxides, carbonates, bicarbonates, chlorides, gluconates, acetates, or sulfides. Examples of suitable monovalent or divalent cationic metals include but are not limited to calcium, sodium, potassium, and magnesium. Examples of suitable acidic pH adjusting agents include but are not limited to acetic acid, hydrochloric acid, phosphoric acid, nitric acid, citric acid, succinic acid, lactic acid, magic acid, glucono-delta-lactone, and combinations thereof. Examples of suitable basic pH adjusting agents include but are not limited to potassium bicarbonate, sodium bicarbonate, sodium hydroxide, potassium hydroxide, calcium hydroxide, lithium hydroxide, magnesium hydroxide, ethanolamine, calcium bicarbonate, calcium hydroxide, ferrous hydroxide, lime, calcium carbonate, trisodium phosphate, and combinations thereof.

The term "precursor molecule" as used herein refers to a molecule that can specifically or non-specifically interact with another molecule to produce an agent that can impart or enhance meat-like attributes in a food product.

The term "protein" as used herein refers to a polymeric form of amino acids of any length, which can include coded and non-coded amino acids, chemically or biochemically modified or derivatized amino acids, and polypeptides having modified peptide backbones.

The term "protein concentrate" as used herein refers to material obtained from a natural source upon removal of soluble carbohydrate, ash, and other minor constituents that has between about 40% and about 80% protein on a dry-weight basis.

The term "protein fiber" as used herein refers to a continuous filament of discrete length made up of proteins held together by intermolecular forces such as disulfide bonds, hydrogen bonds, electrostatic bonds, hydrophobic interactions, peptide strand entanglement, and Maillard reaction chemistry creating covalent cross-links between side chains of proteins.

The term "protein isolate" as used herein refers to material obtained from a natural source upon removal of insoluble polysaccharide, soluble carbohydrate, ash, and other minor constituents that typically has at least about 80% protein on a dry-weight basis.

The term "purified protein" as used herein refers to a protein preparation in which one or more proteins are at least about 10-fold more abundant relative to other proteins present in the protein preparation than they are present in the natural source from which the protein preparation is derived.

The term "redox stability" as used herein refers to the resistance of an agent to take part in a redox reaction and be oxidized or reduced.

The term "resilience" as used herein refers to a TPA parameter of a food product and is calculated by dividing the upstroke energy of the first compression by the downstroke energy of the first compression (see Example 6). It is thought to express how well a food product fights to regain its original shape.

The term "shelf life" as used herein refers to the duration for which a food product can be stored without becoming unsuitable for human consumption.

The term "sizzle sound" as used herein refers to the hissing, spattering, sputtering, and or crackling sound that is produced when two or more liquids come into contact on a hot surface when one (or more) liquids are hotter than the other liquid(s) boiling point(s). The interaction results in some liquids quickly boiling, displacing the other liquid or liquids, and producing a sound. The sizzle sound of a food product can be tested by analyzing the pitch, timbre, loudness, timing, and other auditory characteristics of audio recordings or spectrograms derived therefrom (see Example 6). Variables that can be titrated to modulate the sizzle sound of the meat-like food products provided herein include but are not limited to lipid content and water content.

The term "springiness" as used herein refers to a TPA parameter of a food product and is calculated as the ratio of the food product's height during the second compression and the original compression distance (see Example 6). It is thought to correlate with the ability of a food product to spring back after deformation.

The term "substantially aligned" as used herein refers to an arrangement of protein fibers such that a significantly high percentage of the fibers are contiguous to each other at less than about a 45° angle when viewed in a horizontal plane. Methods for determining the degree of protein fiber alignment and three-dimensional protein network are known in the art and include visual determination based upon photographs and micrographic images, as disclosed in U.S. Utility application Ser. No. 14/687,803, filed on Apr. 15, 2015.

The term "taste" as used herein refers to what is perceived by the gustatory system. The taste of a food product can be tested using a panel of human sensory experts. Alternatively, the taste of a food product can be tested using automated devices, such as, for example, the iNSENT TS-5000Z Taste Testing System (Higuchi USA Inc., Japan) or the Astree tongue system (Alpha MOS America, Hanover, MD). Variables that can be titrated to modulate the taste of the meat-like food products provided herein include but are not limited to taste agents, taste stabilizers, taste enhancers, pH, lipid content, temperature, moisture, and salts. The term "taste agent" as used herein refers to a compound that activates taste receptors in the gustatory system. The term "taste stabilizer" as used herein refers to a compound that stabilizes a taste agent or the perception of the taste agent by the gustatory system. The term "taste enhancer" as used herein refers to a compound that enhances the activity of taste agents or increases the sensitivity of taste-receptors in the gustatory system. Examples of taste agents include but are not limited to oil-soluble taste agents, water-soluble taste agents, 5'-ribonucleotide salts, glutamic acid salts, glycine salts, guanylic acid salts, hydrolyzed proteins, hydrolyzed vegetable proteins, insomniac acid salts, monosodium glutamate, sodium chloride, galacto-oligosaccharides, sorbitol, animal meat taste, animal meat oil, artificial taste agents, aspartamine, fumarate, garlic taste, herb taste, malate, natural taste agents, natural smoke extract, natural smoke solution, onion taste, shiitake extract, spice extract, spice oil, sugars, amino acids, yeast extract, hydrolyzed protein isolates, precursor molecules that can specifically or non-specifically react with each other or other compounds to produce agents that impart or enhance meat-like taste (e.g., Maillard reaction precursors; non-purified, non-isolated, semi-purified, partially purified, or highly purified forms of heme or hemoproteins [e.g., from plants or microorganisms]; cytochromes; porphyrins; other heterocycles [e.g., corrins, chlorins, bacteriochlorophylls, corphins, bacteriochlorin, isobacteriochlorin]; molecules such as guanosine and/or inosine mono, di, or tri-phosphate that synergistically activate taste and olfactory receptors to enhance taste), and derivatives thereof. Examples of taste stabilizers include but are not limited to guar gum, xanthan gum, modified starch, methyl cellulose, antioxidants, and derivatives thereof. Examples of taste enhancers include but are not limited to salts (e.g., sodium salts, potassium salts, calcium salts), sugars, acids (e.g., lactic acid, malic acid, tartaric acid), amino acids (e.g., glutamic acid), nucleotides (e.g., guanylic acid, inosinic acid), and derivatives thereof.

The term "texture" as used herein refers to mechanical characteristics of a food product that are correlated with sensory perceptions of the food product.

The term "Texture Profile Analysis" and its acronym "TPA" as used herein refer to the evaluation of textural properties of a material by subjecting the material to a controlled force from which a deformation curve of its response is generated (see Example 6).

The term "uncooked" as used herein refers to not having been heated.

The term "use versatility" as used herein refers to the diverse possibilities in which a food product can be prepared or consumed. With reference to animal meat such possibilities include but are not limited to preparing and consuming meatballs, meat-loafs, burgers, or meat sauces.

The term "volume fraction" as used herein refers to a dimensionless quantity that expresses the composition of a mixture by dividing the volume of a constituent of the mixture by the volume of all constituents of the mixture prior to mixing.

The term "water-in-oil emulsion" as used herein refers to an emulsion in which water droplets are dispersed in oil.

The term "Warner-Bratzler shear strength" and its acronym "WBS strength" as used herein refer to the maximum force needed to mechanically shear through a sample. The WBS strength is an established measure of meat tenderness. A method for measuring WBS is exemplified in Example 1.

Recitation of ranges of values herein are merely intended to serve as a shorthand method of referring individually to each separate value inclusively falling within the range, unless otherwise indicated herein, and each separate value is incorporated into the specification as if it were individually recited herein.

Meat-Like Food Products

In one aspect, provided herein are meat-like food products that comprise at least about 25% by weight of one or more meat structured protein products bound together by one or more binding agents so as to produce food products that have one or more similar or superior attributes compared to animal meat. In some embodiments, the meat-like food products resemble ground animal meat (e.g., ground beef, ground pork, ground turkey). In one representative embodiment, the present invention is a meat-like food product comprising a burger patty, as shown in FIG. 1. In some embodiments, the meat-like food products are principally or entirely composed of ingredients derived from non-animal sources. In alternative embodiments, the meat-like food products are composed of ingredients partially derived from animal sources but supplemented with ingredients derived from non-animal sources. In some embodiments, the meat-like food products further comprise one or more agent release systems and/or other ingredients.

The meat-like food products provided herein have several advantages. They resemble or surpass animal meat in textural and other properties (e.g., color, aroma, malleability) and nutritional benefits (e.g., content of protein), and yet provide similar use versatility (e.g., can be used in sauces, burger patties, meat-loafs, meatballs, and the like), cooking experiences (e.g., produce meat-like aroma, color change, sizzle sound, and the like during cooking), and eating experiences (e.g., taste, juiciness, chewiness, mouth feel). Compared to meat production from domesticated animals, the production of the meat-like food products can be less costly, have a smaller negative impact on the environment (e.g., less carbon footprint, water use, or land use), have no negative impact on animal welfare (e.g., no animal confinement, force feeding, premature weaning, or animal slaughter), and require less resources for production and distribution (e.g., less energy use, less shipment due to local production). Compared to animal meat, the meat-like food products can have significantly reduced or no unhealthy saturated fats and cholesterol, be eaten by people whose religious beliefs forbid consumption of animal products, be devoid of allergenic compounds (e.g., gluten, soy), and can be produced using waste streams (e.g., brewery yeast waste streams) or only non-animal ingredients, preferably from local sources.

In some embodiments, the meat-like food products are vegan. In some embodiments, the meat-like food products comprise no GMO ingredients. In some embodiments, the meat-like food products comprise no ingredients derived from nuts. In some embodiments, the meat-like food products comprise less than about 0.6%, less than about 0.5%, between about 0.025% and about 0.6%, between about 0.25% and about 0.5%, between about 0.025% and about 0.4%, between about 0.025% and about 0.3%, between about 0.025% and about 0.2%, between about 0.025% and about 0.1%, between about 0.05% and about 0.1%, between about 0.1% and about 0.2%, between about 0.2% and about 0.3%, between about 0.3% and about 0.4%, between about 0.4% and about 0.5%, or between about 0.5% and about 0.6% by weight of sodium. In some embodiments, the meat-like food products comprise only organic ingredients. In some embodiments, the meat-like food products comprise no gluten. In some embodiments, the meat-like food products comprise no soy. In some embodiments, the meat-like food products comprise no added protein crosslinking agent that could facilitate filament formation, including but not limited to glucomannan, beta-1,3-glucan, transglutaminase, calcium salts, and magnesium salts. In some embodiments, the meat-like food products comprise less than about 100 ppm, less than about 50 ppm, less than about 40 ppm, less than about 30 ppm, less than about 20 ppm, or less than about 10 ppm of acrylamide. In some embodiments, the meat-like food products have cooking times of about 10 min or less, about 8 min or less, or about 6 min or less.

The meat-like food products provided herein may have any shape and form. In some embodiments, the meat-like food products have the shape of crumbles with dimensions of between about 2 mm and about 25 mm width, between about 2 mm and about 25 mm thickness, and between about 2 mm and about 50 mm length. In some embodiments, the meat-like food products have the shape of loafs with dimensions of between about 70 mm and about 150 mm. In some embodiments, the meat-like food products have the shape of balls with diameters of between about 20 mm and about 60 mm. In some embodiments, the meat-like food products have the shape of patties. The patties can have any shape, including but not limited to square, rectangular, circular, and non-geometric. In some embodiments, the patties are circular and have diameters of between about 80 mm and 100 mm and thicknesses of between about 4 mm and about 85 mm. The meat-like food products may also be stuffed into permeable or impermeable casings to form sausages. In some embodiments, the meat-like food products provided herein have a thickness of between about 2 mm and about 15 mm, between about 3 mm and about 12 mm, between about 4 mm and about 10 mm, or between about 5 mm and about 8 mm. In some embodiments, the meat-like food products provided herein have the same thickness across at least about 95%, at least about 90%, at least about 80%, at least about 70%, at least about 60%, or at least about 50% of their length or width. In some embodiments, the meat-like food products provided herein have the same thickness across no more than about 50%, no more than about 40%, no more than about 30%, no more than about 20%, or no more than about 10% of their width or length.

The meat-like food products can be sliced, cut, ground, shredded, grated, or otherwise processed, or left unprocessed. Examples of sliced forms include but are not limited to dried meats, cured meats, and sliced lunch meats. In some embodiments, the meat-like food products provided herein are shredded and then bound together, chunked and formed, ground and formed, or chopped and formed according in compliance with Food Standards and Labeling Policy Book (USDA, August 2005) guidelines as pertaining to animal jerky.

The meat-like food products provided herein may be consumed by humans or animals, including domesticated animals (e.g., dogs, cats), farm animals (e.g., cows, pigs, horses), and wild animals (e.g., non-domesticated predatory animals). They may be cooked, partially cooked, or frozen either in uncooked, partially cooked, or cooked state. Cooking may include frying either as sautéing or as deep-frying, baking, smoking, impingement cooking, steaming, grilling, boiling, roasting, broiling, braising, microwaving, heating in forced air system, heating in an air tunnel, and combinations thereof. In some embodiments, the meat-like food products are used in cooked meals, including but not limited to soups, burritos, chilis, sandwiches, lasagnas, sauces, stews, kebabs, pizza toppings, tacos, hamburgers, cheeseburgers, and meat sticks. In some embodiments, the meat-like food products are mixed with other protein products, including but not limited to other plant-derived products and/or animal meat. The meat-like food products can be used for various purposes, including but not limited to feeding; delivery of active ingredients (e.g., vitamins, minerals, nutrients, therapeutics); and analogs for pork, beef, poultry, game, ham, veal, and fish.

The meat-like food products provided herein meet standards for food safety required by government regulation. In various embodiments, the meat-like food products meet standards for food safety required by the U.S. Food and Drug Administration (FDA), the U.S. Department of Agriculture, the European Food Safety Authority, or other state or regional food regulatory agencies. In some embodiments, the meat-like food products provided herein have at least the shelf life of animal meat. In some such embodiments, the meat-like food products have at least the shelf life of 80/20 ground beef. In some such embodiments, the meat-like food products have at least the shelf life of 90/10 ground beef.

The meat-like food products provided herein comprise at least about 5% by weight of protein. Without being bound by theory, it is believed that protein is responsible for some binding of water via hydrophilic interactions (e.g., mediated by polar groups of the side chains of proteins, such as carboxyl-, amino-, hydroxyl-, and sulfhydryl-groups, or by undissociated carbonyl- and imidi-groups of the peptide bonds), and cross linkages and electrostatic forces between peptide chains create pockets in which water can be retained. The protein may be comprised of polypeptide molecules having an identical amino acid sequence, or of a mixture of polypeptide molecules having at least 2 different amino acid sequences. The protein may be derived from any one non-animal or modified non-animal source or from multiple non-animal or modified non-animal sources. In some embodiments, the protein is not derived from a non-animal or modified non-animal source but is identical or similar to protein found in a non-animal or modified non-animal source, for example, the protein is synthetically or biosynthetically generated but comprises polypeptide molecules that have an identical or similar amino acid sequence as polypeptide molecules found in a non-animal source. In some embodiments, at least some of the protein is derived from plant. In some embodiments, at least some of the protein is derived from pea. The pea protein may be derived from whole pea or from a component of pea in accordance with methods generally known in the art. The pea may be standard pea (i.e., non-genetically modified pea), commoditized pea, genetically modified pea, or combinations thereof. In some embodiments, the meat-like food products comprise a similar amount of protein as animal meat. In some embodiments, the meat-like food products comprise between about 10% and about 90%, between about 15% and about 45%, between about 20% and about 40%, between about 25% and about 35%, between about 10% and about 20%, or between about 15% and about 25% by weight of protein. In some embodiments, the meat-like food products comprise a similar amount of protein as 80/20 ground beef. In some embodiments, the meat-like food products comprise a similar amount of protein as 90/10 ground beef. Protein content of a food product can be determined by a variety of methods, including but not limited to AOAC International reference methods AOAC 990.03 and AOAC 992.15. In some embodiments, the meat-like food products comprise no soy protein. In some embodiments, the meat-like food products comprise no modified protein. In some embodiments, the meat-like food products comprise only protein extracted from native sources. In some embodiments, the meat-like food products comprise only non-purified protein. In other embodiments, the meat-like food products comprise at least some partially purified protein. In yet other embodiments, the meat-like food products comprise at least some purified protein. In some embodiments, the meat-like food products comprise less than about 40%, less than about 30%, less than about 20%, less than about 10%, or less than about 6% by weight of a single protein species. In some embodiments, the most abundant protein species comprised in the meat-like food products is legumin. In some such embodiments, the meat-like food products comprise no more than about 5%, about 7.5%, or about 10% by weight of legumin. In some embodiments, the meat-like food products comprise between about 2% and about 80%, between about 5% and about 70%, between about 20% and about 60%, between about 30% and about 50%, between about 34% and about 50%, between about 30% and about 60%, between about 40% and about 70%, between about 40% and about 60%, between about 5% and about 35%, between about 10% and about 30%, between about 10% and about 25%, between about 15% and about 25%, between about 17% and about 25%, between about 15% and about 30%, between about 20% and about 35%, between about 2% and about 25%, or between about 20% and about 30% by weight of plant protein. In some embodiments, the meat-like food products comprise between about 5% and about 90% by weight of *Pisum sativum* protein.

The meat-like food products provided herein comprise at least about 0.05% by weight of lipid. Without being bound by theory it is believed that higher lipid content increases tenderness and juiciness of the meat-like food products. Juiciness may depend on the amount of liquid released during mastication both from the food product and from saliva, and lipids may affect saliva production through controlling the force with which the meat-like food products are chewed or by introducing taste compounds that stimulate saliva flow. Tenderness may depend on the amount of lipid because lipid may act as a lubricant in mastication and ease the process of swallowing. Examples of suitable lipids include but are not limited to microbial oil, plant oil, algal oil, fungal oil, marine oil, (e.g., Atlantic fish oil, Pacific fish oil, Mediterranean fish oil, light pressed fish oil, alkaline treated fish oil, heat treated fish oil, light and heavy brown fish oil, bonito oil, pilchard oil, tuna oil, sea bass oil, halibut oil, spearfish oil, barracuda oil, cod oil, menhaden oil, sardine oil, anchovy oil, capelin oil, Atlantic cod oil, Atlantic herring oil, Atlantic mackerel oil, Atlantic menhaden oil, salmonid oil, and shark oil, squid oil, cuttle fish oil, octopus oil, hill oil, seal oil, whale oil), docosahexaenoic acid, eicosapentaenoic acid, conjugated fatty acids, eicosanoids, palmitic acid, glycolipids (e.g., cerebrosides, galactolipids, glycosphingolipids, lipopolysaccharides, gangliosides), membrane lipids (e.g., ceramides, sphingomyelin, bactoprenol), glycerides, second messenger signaling lipid (e.g., diglyceride), triglycerides, prenol lipids, prostaglandins, saccharolipids, oils (e.g., non-essential oils, essential oils, almond oil, aloe vera oil, apricot kernel oil, avocado oil, baobab oil, calendula oil, canola oil, corn oil, cottonseed oil, evening primrose oil, grape oil, grape seed oil, hazelnut oil, jojoba oil, linseed oil, macadamia oil, natural oils, neem oil, non-hydrogenated oils, olive oil, palm oil, coconut oil, partially hydrogenated oils, peanut oil, rapeseed oil, sesame oil, soybean oil, sunflower oil, synthetic oils, vegetable oil), omega-fatty acids (e.g., arachidonic acid, omega-3-fatty acids, omega-6-fatty acids, omega-7-fatty acids, omega-9-fatty acids), and phospholipids (e.g., cardiolipin, ceramide phosphocholines, ceramide phosphoethanolamines, glycerophospholipids, phasphatidic acid, phosphatidylcholine, phosphatidylethanolamine, phosphatidylinositol, phosphosphingolipids, phosphatidylserine), fatty acids having a range of carbon atoms (e.g., from about 8 to about 40, from about 10 to about 38, from about 12 to about 36, from about 14 to about 34, from about 16 to about 32, from about 18 to about 30, or from about 20 to about 28 carbon atoms), fatty acids that comprise at least one unsaturated bond (i.e., a carbon-carbon double or triple bond; e.g., at least 2, at least 3, at least 4, at least 5, at least 6, at least 7, or at least 8 carbon-carbon double bonds and/or triple bonds), fatty acids with conjugated unsaturated bonds (= at least one pair of carbon-carbon double and/or triple bonds are bonded together, without a methylene (CH2) group between them (e.g., 4CH:CHi CH:CHi)), derivatives of the above named fatty acids (e.g., esters [e.g., methyl and ethyl esters], salts [e.g., sodium and potassium salts], triglyceride derivatives, diglycerides derivatives, monoglyceride derivatives, crude oils, semi-refined (also called alkaline refined) oils, refined oils, oils comprising re-esterified triglycerides, fatty acids with low interfacial tension (e.g., less than about 20, less than about 15, less than about 11, less than about 9, less than about 7, less than about 5, less than about 3, less than about 2, less than about 1, or less than about 0.5 dynes/cm, from about 0.1 to about 20, from about 1 to about 15, from about 2 to about 9, from about 3 to about 9, from about 4 to about 9, from about 5 to about 9, from about 2 to about 7, from about 0.1 to 5, from about 0.3 to 2, or from about 0.5 to 1 dynes/cm, about 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0), fatty acids suitable for human consumption (e.g., oils that are liquid at ambient temperature like avocado, mustard, coconut, cottonseed, fish, flax seed, grape, olive, palm, peanut, rapeseed, safflower, sesame, soybean, sunflower; oils that are solid at ambient temperature like butter fat, chocolate fat, chicken fat), conventional fat substitutes (e.g., fatty acid-esterified alkoxylated glycerin compositions, sucrose fatty acid esters, sole fats (e.g., palm oil, palm kernel oil, coconut oil, cocoa butter, shea butter, butter fat, milk fat), soft fats (e.g., canola oil, soybean oil, sunflower oil, safflower oil, olive oil, nut oils), vegetable fats and oils (e.g., e.g., soy bean, corn, cotton seed, rapeseed, rice, peanut, and palm), and derivatives thereof. The lipid may be derived from any one natural or modified natural source or from multiple natural or modified natural sources. In some embodiments, the lipid is not derived from a natural or modified natural source but is identical or similar to lipid found in a natural or modified natural source, for example, the lipid is synthetically or biosynthetically generated but is identical or similar to lipid found in a natural source. In some embodiments, at least some of the lipid is derived from plant. In some embodiments, the meat-like food products comprise between about 0.1% and about 10%, between about 0.5% and about 30%, between about 5% and about 25%, between about 10% and about 20%, between about 10% and about 15%, between about 15% and about 25%, between about 6% and about 23%, or between about 15% and about 20% by weight of lipid. In some embodiments, the meat-like food products comprise a similar amount of lipid as animal meat. In some embodiments, the meat-like food products comprise a similar amount of lipid as ground 80/20 beef. In some embodiments, the meat-like food products comprise a similar amount of lipid as ground 90/10 beef. In some embodiments, the meat-like food products comprise less than about 7%, less than about 6%, less than about 5%, less than about 4%, less than about 3%, less than about 2%, less than about 1%, less than about 0.5%, less than about 0.25%, less than about 0.1%, or less than about 0.005% by weight of saturated fat. In some embodiments, the meat-like food products comprise no cholesterol. In some embodiments, the meat-like food products comprise at least about 2%, between about 2% and about 10%, between about 3% and about 9%, between about 4% and about 8%, between about 5% and about 7% by weight of mono-unsaturated lipids. In some embodiments, the meat-like food products comprise at least about 5%, between about 5% and about 30%, between about 10% and about 25%, between about 15% and about 20%, or between about 10% and about 15%, by weight of poly-unsaturated lipids. In some embodiments, the meat-like food products provided herein may comprise between about 0.1% and about 10%, between about 0.5% and about 8%, between about 1% and about 6%, between about 2% and about 5%, between about 2% and about 4%, between about 3% and about 6%, between about 3% and about 5%, between about 3% and about 4%, between about 4% and about 5%, between about 5% and about 10%, between about 0.5% and about 5%, between about 1% and about 4%, between about 1% and about 3%, between about 1% and about 2%, between about 1.5% and about 3%, between about 1.5% and about 2.5%, between about 1.5% and about 2%, between about 2% and about 2.5%, or between about 2.5% and about 5% by weight of plant lipid. Lipid content of a food product can be determined by a variety of methods, including but not limited to AOAC International reference method AOAC 954.02, or using the Babcock for meat method (S.S. Nielson, Introduction to the Chemical Analysis of Foods (Jones & Bartlett Publishers, Boston, 1994).

The meat-like food products provided herein can optionally comprise at least about 0.05% by weight of carbohydrate. A variety of ingredients may be used as all or part of the carbohydrate, including but not limited to starch, flour, edible fiber, and combinations thereof. Examples of suitable starches include but are not limited to maltodextrin, inulin, fructooligosaccharides, pectin, carboxymethyl cellulose, guar gum, corn starch, oat starch, potato starch, rice starch, pea starch, and wheat starch. Examples of suitable flours include but are not limited to amaranth flour, oat flour, quinoa flour, rice flour, rye flour, sorghum flour, soy flour, wheat flour, and corn flour. Examples of suitable edible fiber include but are not limited to bamboo fiber, barley bran, carrot fiber, citrus fiber, corn bran, soluble dietary fiber, insoluble dietary fiber, oat bran, pea fiber, rice bran, head husks, soy fiber, soy polysaccharide, wheat bran, and wood pulp cellulose. The carbohydrate may be derived from any one natural or modified natural source or from multiple natural or modified natural sources. In some embodiments, the carbohydrate is not derived from a natural or modified natural source but is identical or similar to carbohydrate found in a natural source, for example, the carbohydrate is synthetically or biosynthetically generated but comprises molecules that have an identical or similar primary structure as molecules found in a natural source. In some embodiments, at least some of the carbohydrate is derived from plant. In some embodiments, at least some of the carbohydrate is derived from pea. In some embodiments, the meat-like food products comprise between about 0.1% and about 25%, between about 3% and about 20%, between about 5% and about 15%, between about 5% and about 10%, between about 4% and about 7%, or between about 3% and about 35% by weight of carbohydrate. In some embodiments, the meat-like food products comprise between about 0.1% and about 10%, between about 1% and about 8%, between about 2% and about 6%, or between about 3% and about 4.5% by weight of fiber. In some embodiments, the meat-like food products provided herein comprise between about 0.1% and about 25%, between about 1% and about 10%, between about 2% and about 9%, between about 1% and about 5%, between about 2% and about 4%, between about 1% and about 3%, between about 5% and about 15%, between about 0.1% and about 10%, between about 0.1% and about 5%, between about 0.1% and about 2.5%, between about 0.1% and about 1.5%, between about 1% and about 3%, between about 4% and about 7%, or between about 2.5% and about 7.5% by weight of plant carbohydrate. In some embodiments, the meat-like food products comprise between about 0.1% and about 15%, between about 0.5% and about 15%, between about 3% and about 15%, between about 5% and about 15%, between about 10% and about 15%, between about 0.1% and about 3%, between about 1% and about 3%, between about 2% and about 3%, 0.1% to about 1.5%, between about 0.5% and about 1.5%, or between about 1% and about 1.5% by weight of plant starch. In some embodiments, the meat-like food products comprise pea starch. In some such embodiments, the meat-like food products comprise between about 0.1% and about 3%, between about 1% and about 3%, between about 2% and about 3%, between about 0.1% and about 1.5%, between about 0.5% and about 1.5%, or between about 1% and about 1.5% by weight of *Pisum sativum* starch. In some embodiments, the meat-like food products comprise between about 0.1% and about 10%, between about 0.1% and about 5%, between about 0.1% and about 3%, between about 0.1% and about 2%, between about 0.4% and about 0.6%, between about 0.05% and about 2.5%, between about 0.05% and about 1.5%, between about 0.05% and about 1%, or between about 0.05% and about 0.5% by weight of plant edible fiber. In some embodiments, the meat-like food products comprise edible pea fiber. In some such embodiments, the meat-like food products comprise between 0.1% and about 10%, between about 0.1% and about 5%, between about 0.1% and about 3%, between about 0.1% and about 2%, between about 0.4% and about 0.6%, between about 0.05% and about 2.5%, between about 0.05% and about 1.5%, between about 0.05% and about 1%, or between about 0.05% and about 0.5% by weight of *Pisum sativum* edible fiber.

In some embodiments, the meat-like food products provided herein comprise between about 10% and about 25% by weight of protein, between about 5% and about 30% by weight of lipid, between about 0.5% and about 10% by weight of total carbohydrate, and between about 0.5% and about 5% by weight of edible fiber. In some embodiments, the meat-like food products provided herein comprise between about 10% and about 20% by weight of protein, between about 10% and about 25% by weight of lipid, between about 3% and about 8% by weight of total carbohydrate, and between about 1% and about 5% by weight of edible fiber. In some embodiments, the meat-like food products provided herein comprise between about 10% and about 25% by weight of protein, between about 6% and about 23% by weight of lipid, between about 4% and about 7% by weight of total carbohydrate, between about 3% and about 4.5% by weight of edible fiber.

The meat-like food products provided herein comprise a moisture content (MC) of at least about 30%. A method for determining MC is disclosed in U.S. Utility application Ser. No. 14/687,803 filed on Apr. 15, 2015. Without being bound by theory, it is believed that a high MC may prevent the sensation of drying during chewing. In some embodiments, the meat-like food products comprise a MC of between about 30% and about 90%, between about 30% and about 70%, between about 40% and about 80%, between about 40% and about 60%, between about 40% and about 50%, between about 40% and about 80%, between about 30% and about 60%, between about 50% and about 70%, between about 55% and about 65%, between about 50% and about 90%, between about 60% and about 80%, between about 70% and about 80%, between about 75% and about 85%, or between about 65% and about 90% by weight. In some embodiments, the meat-like food products comprise a similar MC as animal meat.

In some embodiments, the meat-like food products comprise one or more coloring agents. In some embodiments, the meat-like food products comprise one or more color enhancers. In some embodiments, the meat-like food products comprise mixtures of two or more coloring agents, color stabilizers, and/or color enhancers. In some embodiments, the agents to be released comprise mixtures of two or more coloring agents, color stabilizers, and/or color enhancers. Suitable mixtures include but are not limited to beet extract and annatto, beet extract and turmeric, beet extract and saffron, beet extract and purple carrot, beet extract and grape seed extract, beet extract and tomato extract, beet extract and lycopene, beet extract and beta carotene, beet extract and anthocyanin, beet extract and anthocyanin and annatto, beet extract and annatto and lycopene, beet extract and ascorbic acid, anthocyanin and annatto, beet extract and annatto and ascorbic acid, beet extract and annatto and beta carotene, beet extract and turmeric and ascorbic acid, and anthocyanin and lycopene and annatto. In some such embodiments, the coloring agents, color stabilizers, and/or color enhancers are present at equal weight ratios. In other such embodiments, the coloring agents, color stabilizers, and/or color enhancers are present at unequal weight ratios (e.g., 55:45, 60:40, 65:35, 2:1, 70:30, 75:25, 80:20, 5:1, 85:15, 90:10, 20:1, 95:5, 99:1). In some embodiments, the meat-like food products comprise browning agents (i.e., natural and vegan coloring products that are made from the pyrolysis of wood). Examples of suitable browning agents include but are not limited to pentose (e.g., ribose, arabinose, xylose), hexose (e.g., glucose, fructose, mannose, galactose), dextrins, and commercial browning agent (e.g., red arrow dextrose, wood-derived agents).

In some embodiments, the meat-like food products comprise a solid phase, a lipid phase, and an aqueous phase, which can be separated by suitable fractionation methods. In some embodiments, the meat-like food products comprise about 40% by weight of aqueous phase, about 19% by weight of lipid phase, and about 42% by weight of solid phase as determined by fractionation methods involving lower centrifugation speeds (i.e., less than 3,000 rpm). In some embodiments, the meat-like food products comprise about 57% by weight of aqueous phase, about 19% by weight of lipid phase, and about 24% by weight of solid phase as determined by fractionation methods involving higher centrifugation speeds (i.e., more than 5,000 rpm). A suitable high centrifugation fractionation method is described in Example 6. Alternatively, a lower centrifugation speed fractionation method can be used, and the MC of the solid phase then be determined and added to the fractionated aqueous phase to obtain the total aqueous phase component.

Meat Structured Protein Products

The meat-like food products provided herein comprise at least about 25% by weight of one or more meat structured protein products. In some embodiments, the meat-like food products comprise between about 25% and about 60%, between about 30% and about 55%, between about 35% and about 50%, between about 40% and about 45%, between about 35% and about 40%, between about 40% and about 50%, between about 30% and about 40%, between about 40% and about 60%, between about 50% and about 60%, or between about 50% and about 70% by weight of meat structured protein products.

In some embodiments, the meat-like food products provided herein comprise two or more meat structured protein products having different attributes. Examples of such different attributes include but are not limited to different color, aroma, taste, protein content, lipid content, carbohydrate content, edible fiber content, protein type, lipid type, carbohydrate type, edible fiber type, MC, pH, percentage of protein fibers that are substantially aligned, TPA parameters, diameter, and length. In some embodiments, the two or more meat structured protein products having different attributes are present in equal proportion in the meat-like food products. In other embodiments, the two or more meat structured protein products having different attributes are present in different proportions in the meat-like food products. In some embodiments, the meat-like food products comprise two meat structured protein products, wherein the meat structured protein products differ from each other in size, wherein a first structured protein product is of a first size and a second structured protein product is of a second size, wherein the first size is such that the first structured protein product can pass through a sieve having a pore size of about 3.125 mm, and wherein the second size is such that the second structured protein product can pass through a sieve having a pore size of no less than about 6.35 mm but not through a sieve having a pore size of about 3.125 mm. In some such embodiments, the meat-like food products comprise between about 40% and about 50% by weight of the first meat structured protein product and between about 50% and about 60% of the second meat structured protein product. In some such embodiments, the meat-like food products comprise about 45% by weight of the first meat structured protein product and about 55% of the second meat structured protein product.

The meat structured protein products comprised in the meat-like food products provided herein may be produced by any method that produces protein fiber networks and/or aligned protein fibers that confer meat-like textures. Methods for determining the degree of protein fiber alignment and three-dimensional protein network are known in the art and include visual determination based upon photographs and micrographic images, as disclosed in U.S. Utility application Ser. No. 14/687,803 filed on Apr. 15, 2015. Without being bound by theory, it is believed that the microscopic protein structures of the meat-like food products provided herein impart physical, textural, and sensory properties that are similar to those of cooked animal meat, wherein the aligned and interconnected protein fibers may impart cohesion and firmness, and the open spaces in the protein network may weaken the integrity of the fibrous structures and tenderize the meat-like food products, while also providing pockets for capturing water, carbohydrates, salts, lipids, flavorings, and other materials that are slowly released during chewing to lubricate the shearing process and to impart other meat-like sensory characteristics. In some embodiments, the meat structured protein products have at least about 55%, at least about 65%, at least about 75%, at least about 85%, or at least about 95% of the protein fibers substantially aligned.

In some embodiments, the meat structured protein products comprised in the meat-like food products provided herein are the meat structured protein products described in U.S. Utility application Ser. No. 13/272,825 filed Oct. 13, 2011; U.S. Utility application Ser. No. 14/687,803 filed Apr. 15, 2015; U.S. Utility application Ser. No. 14/687,830 filed Apr. 15, 2015; U.S. Utility application Ser. No. 14/855,212 filed Sep. 15, 2015; and U.S. Utility application Ser. No. 15/225,646 filed Aug. 1, 2016; the disclosures of which are all hereby incorporated by reference in their entireties.

In some embodiments, the meat structured protein products comprised in the meat-like food products provided herein comprise between about 5% and about 70% by weight of protein, between about 0.5% and about 25% by weight of total carbohydrate, between about 0.05% and about 10% by weight of edible fiber, between about 0.1% and about 25% by weight of total lipid, and between about 30% and about 80% by weight of water. In some such embodiments, the meat structured protein products comprise between about 30% and about 60% by weight of protein, between about 1% and about 10% by weight of total carbohydrate, between about 0.1% and about 5% by weight of edible fiber, between about 1% and about 5% by weight of total lipid, and between about 40% and about 60% by weight of water. In some embodiments, the meat structured protein products comprise between about 40% and about 60% of protein, between about 2% and about 4% of total carbohydrate, between about 2% and about 4% by weight of edible fiber, between about 3% and about 5% of total lipid, and between about 45% and about 55% by weight of water.

It is also within the scope of the invention that the meat structured protein products comprised in the meat-like food products provided herein comprise small amounts (i.e., 2% or less by weight) of protein, carbohydrate, lipid, or other ingredients derived from animal (e.g., albumin or collagen).

In some embodiments, the meat structured protein products comprised in the meat-like food products provided herein have a density of between about 0.3 and about 0.5, between about 0.3 and about 0.45, between about 0.35 and about 0.4. In some embodiments, the meat structured protein products have a fold-volume-change-after-hydration of between about 1.8 and about 3, between about 2 and about 2.7, between about 2.1 and about 2.6, between about 2.3 and about 2.5, or between about 2.5 and about 3. In some embodiments, the meat structured protein products have a color difference, deltaE (CIEDE2000), of between about 3.5 and about 4.5. Methods for determining density, fold-volume-change-after-hydration, and deltaE are disclosed in Example 2.

In some embodiments, the meat structured protein products comprised in the meat-like food products provided herein have an alkaline pH of at least 7.05. In some such embodiments, the meat structured protein products have a pH of between 7.2 and about 12.

In some embodiments, the meat structured protein products comprised in the meat-like food products provided herein are of such size that they can pass through a sieve having a pore size of less than about 10 mm, less than about 9 mm, less than about 8 mm, less than about 7 mm, less than 6 mm, less than about 5 mm, less that about 4 mm, less than about 3 mm, less than about 2 mm, between about 1 mm and about 10 mm, between about 2 mm and about 8 mm, between about 3 mm and about 6 mm, between about 3 mm and about 5 mm, between about 3 mm and about 4 mm, between about 2 mm and about 6 mm, between about 2 mm and about 5 mm, between about 2 mm and about 4 mm, between about 2 mm and about 3 mm, between about 2 mm and about 2.5 mm, between about 2.5 mm and about 3 mm, between about 3 mm and about 3.5 mm, between about 4 mm and about 8 mm, between about 4 mm and about 7 mm, between about 4 mm and about 6 mm, between about 4 mm and about 5 mm, about 8.3 mm, about 6.8 mm, about 6.35 mm, about 5.6 mm, about 4.6 mm, about 3.8 mm, about 3.125 mm, about 2.6 mm, about 2.2 mm, about 1.8 mm, or about 1.5 mm. In some embodiments, the meat structured protein products are of such size that they can pass through a sieve having a pore size of about 6.35 mm but cannot pass through a sieve having a pore size of about 3.125 mm. The presence and size of meat structured protein products in a meat-like food product provided herein can be determined by methods known in the art, such as, for example, methods that involve microscopic observation using brightfield, fluorescence, or phase contrast microscopy of thin strips of refrigerated meat-like food product stained with a natural or fluorescent dye that selectively stains protein.

Binding Agents

The meat-like food products provided herein comprise one or more binding agents. In some embodiments, the meat-like food products comprise at least about 0.01%, between about 0.01% and about 15%, between about 0.1% and about 10%, between about 0.25% and about 7%, between about 0.25% and about 5%, between about 0.5% and about 4.5%, between about 1% and about 4%, between about 1.5% and about 3.5%, between about 2% and about 3%, between about 1% and about 2.5%, between about 2% and about 2.5%, between about 0.5% and about 2%, or between about 5% and about 10% by weight of binding agents.

Examples of suitable binding agents include but are not limited to purees (e.g., bean puree, sweet potato puree, pumpkin puree, applesauce, yam puree, banana puree, plantain puree, date puree, prune puree, fig puree, zucchini puree, carrot puree, coconut puree), native or modified starches (e.g., starches from grains, starches from tuber, potato starch, sweet potato starch, corn starch, waxy corn starch, tapioca starch, tapioca, arrowroot starch, taro starch, pea starch, chickpea starch, rice starch, waxy rice starch, lentil starch, barley starch, sorghum starch, wheat starch, and physical or chemical modifications thereof [including, e.g., pre-gelatinized starch, acetylated starch, phosphate bonded starch, carboxymethylated starch, hydroxypropylated starch]), flours derived from grains or legumes or roots (e.g., from taro, banana, jackfruit, konjac, lentil, fava, lupin bean, pea, bean, rice, wheat, barley, rye, corn, sweet rice, soy, teff, buckwheat, amaranth, chickpea, sorghum, almond, chia seed, flaxseed, potato, tapioca, potato), protein isolates (e.g., from potato, soy, pea, lentil, chickpea, lupin, oat, canola, wheat), hydrolyzed protein isolates (e.g., hydrolyzed pea protein isolate, hydrolyzed soy protein isolate), protein concentrates (e.g. from algae, lentil, pea, soy, chickpea, rice, hemp, fava bean, pigeon pea, cowpea, vital wheat gluten), beta-glucans (e.g., from bacteria [e.g., curdlan], oat, rye, wheat, yeast, barley, algae, mushroom), gums (e.g., xanthan gum, guar gum, locust bean gum, gellan gum, gum arabic, vegetable gum, tara gum, tragacanth gum, konjac gum, fenugreek gum, gum karaya, gellan gum, high-acetyl gellan gum, low-acetyl gellan gum), native or relatively folded (i.e., not fully in the native functional state but not fully denatured) proteins (e.g., fava protein, lentil protein, pea protein, ribulose-1,5-bisphosphate carboxylase/oxygenase [Rubisco], chickpea protein, mung bean protein, pigeon pea protein, lupin bean protein, soybean protein, white bean protein, black bean protein, navy bean protein, adzuki bean protein, sunflower seed protein), polysaccharides and modified polysaccharides (e.g., methylcellulose, hydroxypropyl methylcellulose, carboxymethyl cellulose, maltodextrin, carrageenan and its salts, alginic acid and its salts, agar, agarose, agaropectin, pectin, alginate), nut and seed butters (e.g., almond butter, cashew butter, hazelnut butter, macadamia nut butter, peanut butter, pecan butter, pistachio butter, walnut butter, pumpkin seed butter, sesame seed butter, soybean butter, sunflower seed butter), enzymes (e.g., transglutaminase, thio-oxidoreductase), prolamin proteins (e.g., Zein protein), gelatin, egg protein, potato flakes, okra, tubers, fibers (e.g., *psyllium* husk), and derivatives and combinations thereof. In some embodiments, the meat-like food products comprise between about 0.1% and about 4%, between about 0.25% and about 1.5%, between about 0.5% and about 1.25%, between about 0.75% and about 1%, between about 1% and about 1.5%, between about 1.5% and about 2%, between about 2% and about 2.5%, between about 2.5% and about 3%, or between about 3% and about 4% by weight of starch. In some embodiments, the meat-like food products comprise between about 0.5% and about 5%, between about 1% and about 4%, between about 2% and about 3%, between about 1% and about 2%, between about 3% and about 4%, between about 4% and about 5%, between about 0.5% and about 1.5%, or between about 1% and about 1.5% by weight of methyl cellulose.

Suitable binding agents and suitable amounts of such binding agents can be identified by titrating different binding agents against the cohesiveness, binding, and malleability of uncooked meat-like food products, or against the cohesiveness and binding of cooked meat-like food products. A suitable assay for determining binding is disclosed in Example 6. The presence and distribution of carbohydrates used as binders in a meat-like food product provided herein can be determined by methods known in the art, such as, for example, methods that involve microscopic observation using brightfield, fluorescence, or phase contrast microscopy of thin strips of refrigerated meat-like food product stained with a natural or fluorescent dye that selectively stains carbohydrates.

Agent Release Systems

The meat-like food products provided herein may optionally comprise one or more agent release systems. In some embodiments, the dispersed system components of the agent release systems are droplets of dispersed phases of emulsions. In some embodiments, the dispersed system components are gels. In some embodiments, the dispersed system components are encapsulates (e.g., liposomes; microparticles; nanoparticles; microreservoirs; cell wall materials; cell wall derived gluten particles; coacervates). In some embodiments, the dispersed system components are edible wax molecules. In some embodiments, the dispersed system components are alginate spheres. In some embodiments, the dispersed system components are agglomerates. In some embodiments, the dispersed system components are cyclodextrin complexes. In some embodiments, the dispersed system components are nanoparticles, conjugates, and complexes comprised of extracellular polymeric substance or exopolysaccharides (e.g., dextran, curdlan, scleroglucan, pullulan, levan) of bacterial, fungal, or algal origin. In some embodiments, the dispersed system components are edible diatoms.

Meat-like food products that comprise agent release systems have several advantages. For example, agent release systems can act as carrier phases for oil-soluble agents to be released (e.g., lipid-soluble top note flavoring agents) or water-soluble agents to be released (e.g., pH and/or ionic strength adjusting agents). Such agent release systems can then release such agents in a slow and controlled manner when trigger conditions are reached (e.g., release binding agents once a particular temperature is reached during cooking), thus preventing premature reaction of the agents to be released with other components (e.g., coloring agents) of the meat-like food products.

Suitable amounts of agent release systems comprised in the meat-like food products provided herein will vary depending on the compositions of the agent release systems and the desired degree of imparted or enhanced meat-like attributes. In some embodiments, the meat-like food products comprise at least about 0.0001%, at least about 1%, at least about 5%, between about 0.5% and about 50%, between about 1% and about 40%, between about 5% and about 40%, between about 10% and about 35%, between about 15% and about 35%, between about 20% and about 25%, between about 3% and about 10%, between about 10% and about 15%, between about 15% and about 30%, between about 15% and about 20%, between about 20% and about 25%, between about 25% and about 30%, between about 30% and about 35%, between about 35% and about 40%, between about 40% and about 45%, or between about 45% and about 50% by weight of agent release systems.

The meat-like food products may comprise a single agent release system or a mixture of two or more agent release systems. In some such embodiments, the two or more agent release systems have similar properties (e.g., same agents to be released, same melting temperature). In other such embodiments, the two or more agent release systems have different properties (e.g., different agents to be released, different melting temperatures).

The agent release systems and/or the properties imparted by the agent release systems can be distributed uniformly or non-uniformly in the meat-like food products provided herein. Examples of non-uniform distributions of the agent release systems include but are not limited to non-uniform distribution across space (e.g., surface, periphery, middle) and across phases (e.g., lipid phase, aqueous phase, solid phase). Examples of non-uniform distributions of the properties imparted by the agent release systems include but are not limited non-uniform distribution across space (e.g., different colors on surface versus periphery versus middle), phase (e.g., different tastes in various phases), and time (e.g., non-constant color change or aroma release or melted fat release or sizzle sounds over the course of cooking).

In some embodiments, at least two different agent release systems are distributed uniformly throughout the meat-like food products provided herein. In some such embodiments, the properties imparted by the at least two different agent release systems are evenly distributed. In other embodiments, at least two different agent release systems are distributed non-uniformly in the meat-like food products (e.g., some agent release systems may be localized on the surface of the meat-like food products whereas others at specific locations within the meat-like food products). In some such embodiments, the properties imparted by the at least two different agent releases systems are localized (e.g., specific colors in different regions, aroma release from the surface, melted fat release from the area underneath the skin). In other embodiments, at least two different agent releases systems are distributed uniformly across various phases (i.e., lipid phase, aqueous phase, solid phase) of the meat-like food products. In some such embodiments, the properties imparted by the at least two different agent release systems are evenly distributed. In other embodiments, at least two different agent release systems are distributed non-uniformly across various phases in the meat-like food products. In some such embodiments, the properties imparted by the at least two different agent releases systems are localized (e.g., physically localized, temporally localized [e.g., temporal release of aromas, tastes, melted fat release, color change).

The agents to be released can impart or enhance meat-like attributes when merely contained in the agent release systems or after trigger conditions cause their release from the agent release systems. In some embodiments, the agents to be released impart or enhance meat-like attributes both when comprised in the agent release systems and after trigger conditions cause their release from the agent release systems. Examples of trigger conditions that can cause the release of the agents to be released from the agent release systems include but are not limited to temperature (e.g., cooking, cooling, freezing), pH, pressure, shear (e.g., chewing), level of oxygenation, time, salt concentration, and combinations thereof. In some embodiments, trigger conditions are temperatures lower than ambient temperature (e.g., below 25 C, below about 20 C, below about 15 C, below about 10 C, below about 4 C, below about 0 C, below about −15 C, between about 20 C and 25 C, between about 15 C and about 20 C, between about 10 C and 15 C, between about 4 C and about 10 C, or between about 0 C and about 4 C, between about −15 C and about 0 C). In other embodiments, trigger conditions are temperatures higher than ambient temperature (e.g., at least about 25 C, at least about 50 C, at least about 75 C, at least about 100 C, at least about 125 C, between about 25 C and about 50 C, between about 50 C and about 75 C, between about 75 C and about 100 C, or between about 100 C and about 125 C). In some embodiments, trigger conditions are alkaline pH (e.g., pH of greater than 7, between 7 and about 8, between 7 and about 9, between about 8 and about 9, between about 7.05 and about 10). In other embodiments, trigger conditions are acidic pH (e.g., pH of less than 7, between about 6 and 7, between about 5 and 7, between about 4 and about 5). In some embodiments, trigger conditions for one or more primary agent release systems are effected by the release of one or more agents to be released from one or more secondary agent release systems. In some such embodiments, the trigger conditions for one or more primary agent release systems are pH that are effected by the release of one or more pH and/or ionic strength adjusting agents from one or more secondary agent release systems.

In some embodiments, the agent release systems comprise at least about 45% by weight of lipid. In some embodiments, the agent release systems comprise at least about 30% by weight of canola oil. In some embodiments, the agent release systems comprise at least about 10% by weight of palm oil or coconut oil. In some embodiments, the agent release systems have melting temperatures of at least about 35° C., between about 30° C. and about 100° C., or between about 37° C. and about 95° C. In some embodiments, the agent release systems have melting temperatures that are lower than the cooking temperatures of the meat-like food products such that by the time the meat-like food products are cooked all agent release systems in the meat-like food products are melted.

In some embodiments, the meat-like food products provided herein comprise such amounts of agent release systems that the meat-like food products have similar colors as animal meat. In general, the higher the agent release system content in the meat-like food products, the more the hue of the agent release systems are noticeable in the colors of the meat-like meat products. In some embodiments, the meat-like food products provided herein comprise such amounts of agent release systems that the meat-like food products have similar colors as animal meat stored under similar conditions for similar amounts of time.

In some embodiments, the meat-like food products provided herein comprise such amounts of agent release systems that the meat-like food products produce similar greasiness as uncooked animal meat. Greasiness may further be titrated by varying the compositions of the agent release systems (e.g., by decreasing the lipid content of the agent release systems).

In some embodiments, the meat-like food products provided herein comprise such amounts of agent release systems that the meat-like food products release similar aromas during cooking as cooking animal meat. In general, the higher the amount of agent release system in the meat-like food products, the longer the time over which fat release (i.e., aroma release) lasts. In some embodiments, localization of the agent release systems on the surfaces of the meat-like food products affects aroma release.

In some embodiments, the meat-like food products provided herein comprise such amounts of agent release systems that the meat-like food products have similar tastes as cooked animal meat. In general, the higher the amount of agent release system in the meat-like food products, the stronger the meat-like taste imparted or enhanced by the agent release systems. In some embodiments, the meat-like food products provided herein comprise such amounts of agent release systems that the meat-like food products have similar tastes as cooked animal meat stored under similar conditions for similar amounts of time.

In some embodiments, the meat-like food products provided herein comprise such amounts of agent release systems that the meat-like food products produce similar sizzle sounds and melted fat releases during cooking as cooking animal meat. In general, the higher the amount of agent release system in the meat-like food products, the longer the time over which the melted fat releases and sizzle sounds last. In some such embodiments, localization of the agent release systems on the surfaces of the meat-like food products affects melted fat releases and sizzle sounds.

In some embodiments, the meat-like food products provided herein comprise such amounts of agent release systems that the meat-like food products have similar textures and/or elasticities as cooked animal meat. In general, the higher the amount of agent release system in the meat-like food products, the more the viscoelastic properties of the agent release systems are noticeable in the textures of the meat-like food products.

In some embodiments, the meat-like food products provided herein comprise such amounts of agent release systems that the meat-like food products produce similar juiciness as cooked animal meat.

In some embodiments, the meat-like food products provided herein comprise such amounts of agent release systems that the meat-like food products produce similar binding as uncooked or cooked animal meat.

In some embodiments, the meat-like food products provided herein comprise such amounts of agent release systems that the meat-like food products have one or more similar TPA parameters (e.g., chewiness, gumminess, springiness, cohesiveness, resilience, adhesiveness, hardness) as uncooked, cooking, or cooked animal meat. In general, the higher the amount of agent release system in the meat-like food products, the more the viscoelastic properties of the agent release systems can influence the one or more TPA parameters of the meat-like food products.

In some embodiments, the agents to be released included in the agent release systems comprised in the meat-like food products provided herein impart or enhance meat-like colors. In some such embodiments, the agents to be released are coloring agents. In some embodiments, the coloring agents have spectral absorption profiles similar to the spectral absorption profiles of uncooked animal meat. In some embodiments, the coloring agents have spectral absorption profiles similar to the spectral absorption profiles of cooked animal meat. In some embodiments, the agents to be released are coloring agents that undergo transition from first spectral absorption profiles to second spectral absorption profiles when heated (due to, e.g., chemical transformation, structural changes, degradation, oxidation, reduction), wherein the first spectral absorption profiles are similar to the spectral absorption profiles of uncooked animal meat and wherein the second spectral absorption profiles are similar to the spectral absorption profiles of cooked animal meat. In other embodiments, the agents to be released are color stabilizers or color enhancers. In some embodiments, the agents to be released are transition agents, wherein the transition agents mediate transition from such first spectral absorption profiles of coloring agents to such second spectral absorption profiles. Examples of suitable transition agents include but are not limited to pH and/or ionic strength adjusting agents, metal ions (e.g., ferric salts), metal ion complexes, transition metal complexes, and combinations thereof.

In some embodiments, the agents to be released comprise mixtures of two or more coloring agents, color stabilizers, and/or color enhancers. Suitable mixtures include but are not limited to beet extract and annatto, beet extract and turmeric, beet extract and saffron, beet extract and purple carrot, beet extract and grape seed extract, beet extract and tomato extract, beet extract and lycopene, beet extract and beta carotene, beet extract and anthocyanin, beet extract and anthocyanin and annatto, beet extract and annatto and lycopene, beet extract and ascorbic acid, anthocyanin and annatto, beet extract and annatto and ascorbic acid, beet extract and annatto and beta carotene, beet extract and turmeric and ascorbic acid, and anthocyanin and lycopene and annatto. In some such embodiments, the coloring agents, color stabilizers, and/or color enhancers are present at equal weight ratios. In other such embodiments, the coloring agents, color stabilizers, and/or color enhancers are present at unequal weight ratios (e.g., 55:45, 60:40, 65:35, 2:1, 70:30, 75:25, 80:20, 5:1, 85:15, 90:10, 20:1, 95:5, 99:1).

In some embodiments, the agents to be released included in the agent release systems comprised in the meat-like food products provided herein impart or enhance meat-like aromas. In some embodiments, the molecules are aroma agents. In some embodiments, the agents to be released are aroma stabilizers. In some embodiments, the agents to be released are aroma enhancers.

In some embodiments, the agents to be released included in the agent release systems comprised in the meat-like food products provided herein impart or enhance meat-like taste. In some such embodiments, the agents to be released are taste agents. In some embodiments, the agents to be released are taste enhancers. In some embodiments, the agents to be released are taste stabilizers. In some embodiments, the agents to be released are precursor molecules that can specifically or non-specifically react with each other or other compounds to produce agents that impart or enhance meat-like taste.

In some embodiments, the agents to be released included in the agent release systems comprised in the meat-like food products provided herein impart or enhance meat-like melted fat release and/or sizzle sound. In some such embodiments, the agents to be released are lipids. In other such embodiments, the agents to be released are precursor molecules that can specifically or non-specifically react with each other or other compounds to produce agents that impart or enhance meat-like melted fat release and/or sizzle sound. In some such embodiments, the lipids are saturated fats. In other such embodiments, the lipids are unsaturated fats. In yet other such embodiments, the lipids are both saturated and unsaturated fats.

In some embodiments, the agents to be released included in the agent release systems comprised in the meat-like food products provided herein are pH and/or ionic strength adjusting agents that enable chemical reactions that produce agents that can impart or enhance meat-like attributes.

In some embodiments, the agents to be released included in the agent release systems comprised in the meat-like food products provided herein impart or enhance meat-like cohesiveness and/or binding. In some such embodiments, the agents to be released are binding agents.

In some embodiments, the agents to be released included in the agent release systems comprised in the meat-like food products provided herein when not included in agent release systems are unstable below certain temperatures (e.g., below ambient temperature, below about 4 C, below about −20 C) but stable at such temperatures when included in agent release systems. In some embodiments, the agents to be released when not included in agent release systems are unstable above certain temperatures (e.g., above ambient temperature, above about 40 C, above about 60 C) but stable at such temperatures when included in agent release systems.

In some embodiments, the agents to be released included in the agent release systems comprised in the meat-like food products provided herein increase the shelf life of food products (e.g., by reducing oxidation, reduction, spoilage, mixing, hydrolysis, chemical reactions, microbial utilization, or other processes commonly associated with a reduction in the shelf life of food products).

In some embodiments, the agents to be released included in the agent release systems comprised in the meat-like food products provided herein impart or enhance meat-like attributes at specific stages of cooking (e.g., after addition of specific amounts of thermal energy). In some such embodiments, the agents to be released are precursor molecules that can react with other precursor molecules or other ingredients of the food products to effect color change, aroma release, taste production, melted fat release, sizzle sound, and other effects consumers associate with the cooking of animal meat at specific points during the cooking process and at specific locations within the food products. In some embodiments, trigger conditions are elevated temperatures, and the agents to be released impart or enhance the impression of meat-like stages of doneness. Without wishing to be bound by theory, thermal energy addition decreases from the surface to the middle of cooking food products, such that agent release systems that release their agents at specific elevated temperatures will first do so on the surface of a cooking food product and require longer or hotter cooking to do so in the middle of the food product.

In exemplary embodiments, the agents to be released when included in the agent release systems impart or enhance uncooked meat-like colors (e.g., red color of uncooked beef) or are kept separate from agents that impart or enhance uncooked meat-like colors, the trigger conditions are temperatures of at least about 25 C, at least about 50 C, at least about 75 C, or at least about 100 C, and, upon release, the released agents to be released undergo chemical transformations (e.g., oxidation) that eliminate the uncooked meat-like color or interact or catalyze a chemical transformation of another agent in the meat-like food products that eliminate the uncooked meat-like color. In some such embodiments, the chemical transformations yield agents that impart or enhance cooked meat-like colors (e.g., brown color of cooked beef). In other such embodiments, the chemical transformations yield agents that deliver healthful nutrients or agents that aid with absorption of nutrients. In some embodiments, the agents to be released comprise transition metals (e.g., iron sulfate heptahydrate, iron fumarate, manganese gluconate dihydrate, Orgen-I natural iron, magnesium chloride, manganese glutamate, zinc, ferric phosphate hydrate, atomic numbers 21 to 30). In some such embodiments, the transition metals are complexed with other molecules (e.g., porphyrin, hemin, chelating agents [e.g., vitamin], phytates, proteins, fats, chemicals, plant parts, microorganisms). In other embodiments, the agents to be released are anthocyanins and/or betanins.

In other exemplary embodiments, the agents to be released included in the agent release systems comprised in the meat-like food products provided herein impart or enhance cooked meat-like colors (e.g., brown color of cooked beef) when released from the agent release systems, the agents to be released are pH and/or ionic strength adjusting agents, the trigger conditions are temperatures of at least about 25 C, at least about 50 C, at least about 75 C, or at least about 100 C, and, upon release of the agent to be released the pH is adjusted to an alkaline pH and the alkaline pH enables chemical transformations that eliminate the uncooked meat-like color and yield agents that impart or enhance cooked meat-like colors (e.g., brown color of cooked beef).

In other exemplary embodiments, the agents to be released included in the agent release systems comprised in the meat-like food products provided herein impart or enhance cooked meat-like tastes when released from the agent release systems, the trigger conditions are temperatures of at least about 25 C, at least about 50 C, at least about 75 C, or at least about 100 C, and, upon release, the released agents undergo chemical transformations or cause chemical transformations of other agents, and such chemical transformations yield agents that impart or enhance cooked meat-like tastes. In some such embodiments, the agents to be released are pH and/or ionic strength adjusting agents.

In other exemplary embodiments, the agents to be released included in the agent release systems comprised in the meat-like food products provided herein are calcium ions that when released cause alginate present to form alginate gels or spheres, which impart a meat-like cooked texture, either throughout the product or in controlled, localized regions.

The agent release systems comprised in some embodiments of the meat-like food products provided herein may be acidified to inhibit microbiological growth. In some embodiments, the pH of the agent release systems is between about 2.75 to about 5.75, between about 2.85 to about 5.5, or between about 3.25 to about 4.25, including all ranges subsumed therein.

The compositions (i.e., relative proportions of components) of the agent release systems comprised in some embodiments of the meat-like food products provided herein may vary over a wide range, depending on the desired end properties of the products.

Emulsions

In some embodiments, the agent release systems comprised in the meat-like food products provided herein are emulsions.

Examples of suitable emulsions include but are not limited to water-in-oil emulsions, oil-in-water emulsions, oil-in-water-in-oil double emulsions, water-in-oil-in-water double emulsions, and Pickering emulsions. Emulsions are well known in the chemical arts, and edible emulsions are used in many types of food products (e.g., mayonnaise, milk, chocolate spread).

The presence of an emulsion in a meat-like food product provided herein can be determined semi-quantitatively by a combination of selective staining and microscopic observation using brightfield, fluorescence, or phase contrast microscopy. Observation using transmitted or reflected light may be required to distinguish the emulsion droplets within the food matrix. For example, a refrigerated meat-like food product may be histologically dissected into thin strips, stained with a selective natural or fluorescent dye (e.g., oil soluble dye, Oil Red O) and loaded on a microscope slide.

The dispersed phase of the emulsions can be any dispersed phase that is not perfectly soluble in the continuous phase. In some embodiments, the dispersed phase is lipid. Suitable examples of lipids include but are not limited to microbial oil, plant oil, algal oil, fungal oil, marine oil (e.g., Atlantic fish oil, Pacific fish oil, Mediterranean fish oil, light pressed fish oil, alkaline treated fish oil, heat treated fish oil, light and heavy brown fish oil, bonito oil, pilchard oil, tuna oil, sea bass oil, halibut oil, spearfish oil, barracuda oil, cod oil, menhaden oil, sardine oil, anchovy oil, capelin oil, Atlantic cod oil, Atlantic herring oil, Atlantic mackerel oil, Atlantic menhaden oil, salmonid oil, and shark oil, squid oil, cuttlefish oil, octopus oil, hill oil, seal oil, whale oil), docosahexaenoic acid, eicosapentaenoic acid, conjugated fatty acids, eicosanoids, palmitic acid, glycolipids (e.g., cerebrosides, galactolipids, glycosphingolipids, lipopolysaccharides, gangliosides), membrane lipids (e.g., ceramides, sphingomyelin, bactoprenol), glycerides, second messenger signaling lipid (e.g., diglyceride), triglycerides, prenol lipids, prostaglandins, saccharolipids, oils (e.g., non-essential oils, essential oils, almond oil, aloe vera oil, apricot kernel oil, avocado oil, baobab oil, calendula oil, canola oil, corn oil, cottonseed oil, evening primrose oil, grape oil, grape seed oil, hazelnut oil, jojoba oil, linseed oil, macadamia oil, natural oils, neem oil, non-hydrogenated oils, olive oil, palm oil, coconut oil, partially hydrogenated oils, peanut oil, rapeseed oil, sesame oil, soybean oil, sunflower oil, synthetic oils, vegetable oil), omega-fatty acids (e.g., arachidonic acid, omega-3-fatty acids, omega-6-fatty acids, omega-7-fatty acids, omega-9-fatty acids), and phospholipids (e.g., cardiolipin, ceramide phosphocholines, ceramide phosphoethanolamines, glycerophospholipids, phosphatidic acid, phosphatidylcholine, phosphatidylethanolamine, phosphatidylinositol, phosphosphingolipids, phosphatidylserine), fatty acids having a range of carbon atoms (e.g., from about 8 to about 40, from about 10 to about 38, from about 12 to about 36, from about 14 to about 34, from about 16 to about 32, from about 18 to about 30, or from about 20 to about 28 carbon atoms), fatty acids that comprise at least one unsaturated bond (i.e., a carbon-carbon double or triple bond; e.g., at least 2, at least 3, at least 4, at least 5, at least 6, at least 7, or at least 8 carbon-carbon double bonds and/or triple bonds), fatty acids with conjugated unsaturated bonds (= at least one pair of carbon-carbon double and/or triple bonds are bonded together, without a methylene (CH2) group between them (e.g., 4CH:CHi CH:CHi)), derivatives of the above named fatty acids (e.g., esters [e.g., methyl and ethyl esters], salts [e.g., sodium and potassium salts], triglyceride derivatives, diglyceride derivatives, monoglyceride derivatives, crude oils, semi-refined (also called alkaline refined) oils, refined oils, oils comprising re-esterified triglycerides, fatty acids with low interfacial tension (e.g., less than about 20, less than about 15, less than about 11, less than about 9, less than about 7, less than about 5, less than about 3, less than about 2, less than about 1, or less than about 0.5 dynes/cm, from about 0.1 to about 20, from about 1 to about 15, from about 2 to about 9, from about 3 to about 9, from about 4 to about 9, from about 5 to about 9, from about 2 to about 7, from about 0.1 to 5, from about 0.3 to 2, or from about 0.5 to 1 dynes/cm, about 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0), fatty acids suitable for human consumption (e.g., oils that are liquid at ambient temperature like avocado, mustard, coconut, cottonseed, fish, flax seed, grape, olive, palm, peanut, rapeseed, safflower, sesame, soybean, sunflower; oils that are solid at ambient temperature like butter fat, chocolate fat, chicken fat), conventional fat substitutes (e.g., fatty acid-esterified alkoxylated glycerin compositions, sucrose fatty acid esters, sole fats (e.g., palm oil, palm kernel oil, coconut oil, cocoa butter, shea butter, butter fat, milk fat), soft fats (e.g., canola oil, soybean oil, sunflower oil, safflower oil, olive oil, nut oils), vegetable fats and oils (e.g., from soy bean, corn, cotton seed, rapeseed, rice, peanut, and palm), and derivatives thereof. In some embodiments, the emulsions comprise between about 30% and about 85%, between about 40% and about 70%, between about 50% and about 60%, or at least about 50% by weight of lipid. In some such embodiments, the emulsions comprise oils in amounts of between about 1% and about 50%, between about 3% and about 40%, between about 5% and about 20%, between about 5% and 10%, between about 5% and about 40%, between about 5% and about 60%, or between about 10% and about 30% by weight of oil. In some embodiments, the emulsions comprise between about 70% and about 90% by weight of unsaturated lipid. In some embodiments, the emulsions comprise between about 10% and about 30% by weight of saturated lipid. In some embodiments, the emulsions comprise at least about 30% by weight of canola oil or sunflower oil. In some embodiments, the emulsions comprise at least about 10% by weight of palm oil or coconut oil. In some embodiments, the emulsions comprise unsaturated lipid and saturated lipid at a ratio of about 12 to 1.

The continuous phase of the emulsions can be any suitable continuous phase. In preferred embodiments, for oil-in-water emulsions the continuous phase is water. The water can be pure water, tap water, bottled water, deionized water, spring water, natural juice [i.e., liquid based extract from a non-animal source such as a plant or any part of a plant], modified natural juice, or a mixture thereof. Thus, the water may be an aqueous solution comprising salts or minerals or both. In some embodiments, the continuous phase comprises an agent that increases the vapor pressure of the continuous phase (e.g., alcohol).

In some embodiments, the emulsions further comprise an emulsifier. Suitable emulsifiers must stabilize the emulsions during preparation procedures and until trigger conditions are reached. Suitable emulsifiers include but are not limited to anionic emulsifiers, nonionic emulsifiers, cationic emulsifiers, amphoteric emulsifiers, bioemulsifiers, steric emulsifiers, Pickering emulsifiers, glycolipids (e.g., trehalose lipids, sophorolipids, rhamnolipids, manno-sylerythriol lipids), oligopeptides (e.g., gramicidin S, polymyxin), lipopeptides (e.g., surfactin), phospholipids, fatty acids, neutral lipids, polymeric biosurfactants, amphipathic polysaccharides, lipopolysaccharides, proteins (e.g., pea protein, soy protein, chickpea protein, algae protein, yeast protein, potato protein, lentil protein), mannoprotein, sodium phosphates, calcium stearoyl lactylate, mono- and diacetyl tartaric acid esters of monoglycerides, phospholipids, sorbitan monostearate, magnesium stearate, sodium/potassium/calcium salts of fatty acids, calcium stearoyl di lactate, poly-glycerol esters, sorbitan fatty acid esters, acetic acid esters of monoglycerides, lactic acid esters of monoglycerides, citric acid esters of monoglycerides, polyglycerol esters of fatty acids, polyglycerol polyricinoleate, propane-1,2-diol esters of fatty acids, sugar esters, sucrose esters of fatty acids, monoglycerides, acetylated monoglycerides, lactylated monoglycerides, diglycerides, phosphate monoglycerides, diacetyl tartaric acid esters, sodium/calcium stearoyl-2-lactylate, ammonium phosphatide, polysorbates, polysorbate-80, carboxymethylcellulose (CMC), modified cellulose, citric acid esters, locust bean gum, guar gum, liposan, emulsan, lecithins, surfactants (e.g., sorbitan trioleate (Span 85), sorbitan tristearate (Span 65), sorbitan sesquioleate (Arlacel 83), glyceryl monostearate, sorbitan monooleate (Span 80), sorbitan monostearate (Span 60), sorbitan monopalmitate (Span 40), sorbitan monolaurate (Span 20), polyoxyethylene sorbitan tristearate (Tween 65), polyoxyethylene sorbitan trioleate (Tween 85), polyethylene glycol 400 monostearate, polysorbate 60 (Tween 60), polyoxyethylene monostearate, polysorbate 80 (Tween 80), polysorbate 40 (Tween 40), polysorbate 20 (Tween 20), PEG 20 tristearate, PEG 20 trioleate, PEG 20 monostearate, PEG 20 monooleate, PEG 20 monopalmitate, and PEG 20 monolaurate sorbitan), and derivatives and mixtures thereof. In some embodiments, the emulsifier comprises about 25% by weight of Tween 80 and about 75% by weight of Span 80. In some embodiments, a suitable emulsifier has an HLB of at least about 1, at least about 2, at least about 4, at least about 6, at least about 8, at least about 10, at least about 12, at least about 14, at least about 16, or at least about 18. In preferred embodiments, the emulsifier is a protein that has fat emulsifying properties (e.g., fruit protein, vegetable protein [e.g., wheat, corn, oats, rye, barley, triticale, field peas, lentils, chickpeas, fababeans, navy beans, pinto beans, sun flower seeds, peanuts, rape seeds, soybeans], milk protein, microbial protein, protein separated from defatted products of oil stuff seeds [e.g., soy bean], animal proteins, and cereal proteins [e.g., wheat gluten, corn gluten, rice gluten]). Different protein isolates produce different oil release and texture characteristics, and mixtures of such materials may be used to provide the desired combination of properties. In preferred embodiments, the protein is in substantially un-denatured form. In some embodiments, the emulsion comprises between about 0.1% to about 10.0%, between about 0.5% to about 8.0%, between about 2% and about 4%, or between about 1.5% to about 6.5% by weight of emulsifier.

In some embodiments, the compositions of the emulsions are such that the meat-like food products provided herein have meat-like color. For example, oil-in-water emulsions that appear yellow can add a yellow hue to food products comprising such emulsions. Also, water-in-oil-in-water emulsions that have a ferrous sulfate aqueous solution inside the interior droplet and are microfluidically homogenized to −100 nm droplets equilibrate to appear pink and can add a pink hue to food products comprising such emulsions.

In some embodiments, the emulsions comprise meat-like aroma molecules and the meat-like food products provided herein produce meat-like aroma during cooking. In some such embodiments, the aroma molecules are preferentially soluble in the dispersed phase. In some such embodiments, the aroma molecules are preferentially soluble in the continuous phase. In other such embodiments, the aroma molecules are tightly bound to the emulsifier. In other such embodiments, the aroma molecules are lightly bound to the emulsifier. In other such embodiments, the aroma molecules are adhered to and interact favorably in emulsifier micelles.

In some embodiments, the emulsions comprise meat-like taste agents and the meat-like food products provided herein produce meat-like taste during cooking. In some such embodiments, the taste agents are preferentially soluble in the dispersed phase. In some such embodiments, the taste agents are preferentially soluble in the continuous phase. In other such embodiments, the taste agents are tightly bound to the emulsifier. In other such embodiments, the taste agents are lightly bound to the emulsifier. In other such embodiments, the taste agents are adhered to and interact favorably in emulsifier micelles. In some embodiments, the taste agents are Maillard reaction precursors that require thermal energy to react with each other to produce a meat-like taste.

In some embodiments, the compositions of the emulsions are such that the meat-like food products provided herein have meat-like texture. Without wishing to be bound by theory, it is believed that smaller droplet sizes of the dispersed phase and higher density of droplets reduces the compressibility and increases the elasticity of emulsions. Therefore, the specific dispersed phase, continuous phase, emulsifier, and droplet size and density used can influence texture (e.g., the compression stress required for deforming) of any food products comprising such emulsions.

In some embodiments, the compositions of the emulsions are such that the meat-like food products provided herein have meat-like cohesiveness and/or binding. In some such embodiments, the emulsions gel upon heating.

In some embodiments, the compositions of the emulsions are such that the meat-like food products provided herein have meat-like juiciness.

In some embodiments, the compositions of the emulsions are such that the meat-like food products provided herein produce meat-like sizzle sound during cooking. Without wishing to be bound by theory, it is believed that sizzle sound is dependent on various factors, including but not limited to the types and ratios of constituent fats of a food product and the ratio of constituent fats to water in a food product. Therefore, in some embodiments, the ratio of continuous phase to dispersed phase is such that such amounts of continuous and dispersed phases are released at higher temperature such that a meat-like sizzle sound is produced.

Emulsions can have droplets of various sizes. In some embodiments, the emulsions comprised in the meat-like food products provided herein are polydisperse emulsions (i.e., emulsions comprising droplets with a broad distribution of droplet sizes). In other embodiments, the emulsions are monodisperse (i.e., emulsions comprising droplets with a narrow distribution of droplet sizes). In some embodiments, the emulsions are microemulsions (i.e., thermodynamic stable systems of dispersed droplets in continuous phase). In other embodiments, the emulsions are nanoemulsions (i.e., metastable [or kinetically stable] dispersions of one liquid in another immiscible liquid having droplet sizes ranging from 1 to 100 nm). In some embodiments, the emulsions have an average droplet size of less than about 1,000 nm, less than about 750 nm, less than about 500 nm, less than about 250 nm, less than about 100 nm, less than about 50 nm, between about 100 nm and about 800 nm, between about 100 nm and about 300 nm, between about 4 um and about 8 um, between about 5 um and about 10 um, or between about 10 um and about 50 um. The size of droplets can be determined by methods known in the art including but not limited to light scattering, microscopy, and spectroscopy. In some embodiments, the emulsions comprised in the meat-like food products provided herein remain stable against droplet coalescence and gravitational creaming for at least 7 days, at least 10 days, or at least 14 days when stored at 4 C. In some embodiments, the emulsions have monodisperse droplet size distributions with a polydispersity index (PDI) of between about 0.10 and about 0.25.

In some embodiments, the average sizes of the droplets of the emulsions are such that the meat-like food products provided herein have meat-like colors. Without wishing to be bound by theory, it is believed that as the average sizes of droplets decrease below 100 nm, droplets scatter less light and therefore appear increasingly transparent. However, for more densely packed systems, at larger sizes, i.e. average sizes that correspond to the shortest wavelengths of visible light (e.g., between about 100 nm and about 800 nm, or between about 100 nm and about 300 nm), the droplets preferentially scatter blue light. When emulsions comprising droplets of such larger average sizes are observed by reflected light they appear bluish-white whereas when they are observed by light transmitted through the samples they appear pinkish-white. Such blueish-white and pinkish-white hues can modulate the overall color of food products comprising such agent releases systems and thus impart or enhance meat-like color.

In some embodiments, the average sizes of the droplets of the emulsions are such that the meat-like food products provided herein produce meat-like aromas during cooking. Without wishing to be bound by theory, it is believed that as the emulsions are heated, the rate of system component collisions is increased, facilitating coalescence and system component destabilization. Such coalescence and system component destabilization events increase the vapor pressure of the droplets, and volatilize the molecules that impart or enhance meat-like aromas comprised in the emulsions into the vapor phase. It is further believed that system component size determines the amount of molecules that impart or enhance meat-like aromas in two ways: if the molecules thermodynamically prefer to reside on the surface of droplets (e.g., because of interactions with an emulsifier), then larger droplets mean more surface area for more molecules; if the molecules thermodynamically prefer to reside inside the droplets (e.g., because of greater solubility in the dispersed phase than in the continuous phase), then larger droplets mean more volume for more molecules. Therefore, in some embodiments, the average sizes of the droplets provided herein are large enough such that an optimal amount of molecules that impart or enhance meat-like aromas can be comprised in the emulsions and such that food products comprising such emulsions produce aromas during cooking that have similar intensities as the aromas of cooking animal meats.

In some embodiments, the average sizes of the droplets of the emulsions are such that the meat-like food products provided herein produce meat-like sizzle sounds during cooking. Without wishing to be bound by theory, it is believed that the smaller the average size of droplets, the greater the ratio of continuous phase in contact with dispersed phase, the greater the amount of continuous and dispersed phases released at higher temperature, and thus the greater the sizzle sound. Therefore, in some embodiments, the average droplet sizes of the emulsions provided herein are less than about 20 microns, less than about 5 microns, between about 1 micron and about 500 nm, or between about 500 nm and about 50 nm.

In some embodiments, the average sizes of the droplets of the emulsions are such that the meat-like food products provided herein produce meat-like melted fat releases during cooking. Without wishing to be bound by theory, it is believed that the smaller the average size of droplets, the more surface area contact between the continuous and dispersed phases, the greater the amount of continuous and dispersed phases released at higher temperature, and the greater melted fat release. Therefore, in some embodiments, average droplet sizes of the emulsions provided herein are less than about 500 nm, less than about 100 nm, between about 75 nm and about 100 nm, or between about 45 nm and about 75 nm.

In some embodiments, the average sizes of the droplets of the emulsions are such that the meat-like food products provided herein have meat-like textures. Without wishing to be bound by theory, it is believed that the smaller the average sizes of the droplets, the tighter the droplets can pack and the firmer a texture they can produce. Therefore, in some embodiments, the average sizes of the droplets comprised in the emulsions are less than about 500 nm, less than about 100 nm, between about 75 nm and about 100 nm, or between about 45 nm and about 75 nm. In some embodiments, the emulsions are nanoemulsions.

In some embodiments, the average sizes of the droplets of the emulsions are such that the meat-like food products provided herein have meat-like elasticities. Without wishing to be bound by theory, it is believed that as the radius of a system component decreases, the Laplace pressure (i.e., the pressure difference between the inside and the outside of a system component) increases, such that at higher system component volume fractions the elasticity (or viscoelastic properties) of the emulsions (and food products comprising such emulsions) can be affected through the interactions of many droplets with large Laplace pressures. Consequently, the smaller the average size of the droplets, the more the texture is elastically dominated rather than viscously dominated, and the larger the average size of the droplets, the more the texture is viscously dominated rather than elastically dominated. Therefore, in some embodiments, the average sizes of the droplets of the emulsions are less than about 500 nm, less than about 100 nm, between about 75 nm and about 100 nm, or between about 45 nm and about 75 nm.

In some embodiments, the average sizes of the droplets of the emulsions are such that the meat-like food products provided herein have meat-like cohesivenesses and/or binding. Without wishing to be bound by theory, it is believed that increasing the elasticity of the emulsions (i.e., by decreasing the average sizes of the droplets) firms up the emulsions and food products comprising such emulsions, and permits stronger binding of food product components. Therefore, in some embodiments, the average sizes of the droplets of the emulsions are less than about 20 microns, less than about 5 microns, between about 1 micron and about 500 nm, or between about 500 nm and about 50 nm.

The volume fractions of emulsions can play a pivotal role in the imparting or enhancing of meat-like attributes.

In some embodiments, the volume fractions of the emulsions are such that the meat-like food products provided herein have meat-like color. Without wishing to be bound by theory, it is believed that the volume fractions of emulsions determine whether there is single or multiple scattering of light, which in turn produce meat-like color during cooking.

In some embodiments, the volume fractions of the emulsions are such that the meat-like food products provided herein have meat-like aromas. Without wishing to be bound by theory, it is believed that the larger the volume fractions of emulsions, the more molecules that can impart or enhance meat-like aromas are volatilized from the interiors or surfaces of the droplets during cooking. Therefore, in some embodiments, the volume fractions of the emulsions are less than about 5%, less than about 20%, between about 5% and about 20% or between about 20% and about 40%.

In some embodiments, the volume fractions of the emulsions are such that the meat-like food products provided herein produce meat-like sizzle sounds during cooking. Without wishing to be bound by theory, it is believed that the volume fraction of an emulsion affects the ratio of continuous phase in contact with dispersed phase, which in turn changes the amount of continuous phase and dispersed phase released at higher temperature, and thus the sizzle sound. Therefore, in some embodiments, the volume fractions of the emulsions are less than about 10%, less than about 40%, between about 40% and about 60%, or between about 5% and about 40%.

In some embodiments, the volume fractions of the emulsions are such that the meat-like food products provided herein have meat-like elasticities. Without wishing to be bound by theory, it is believed that for an emulsion in the dilute regime (volume fraction <10%), increasing the component system density will result in a more viscous agent release system. When random close packing is approached (at volume fraction of about 64%), droplet interfaces are in contact with each other with enough frequency that the combined elastic contributions of droplets having a large Laplace pressure will become significant and the emulsion exhibits elastic behavior. Elasticity increases as the packing volume fraction increases to about 74% (hexagonal close packing—the largest packing density volume fraction possible for un-deformed spheres), and even more once the volume fraction increases above this volume fraction and droplets press on each other to become distorted polyhedra rather than spherical. Therefore, in some embodiments, the droplet densities of the emulsions are less than about 64%, less than about 74%, between about 64% and about 74%, or between about 74% and about 85%.

In some embodiments, the volume fractions of the emulsions are such that the meat-like food products provided herein have meat-like cohesiveness and/or binding. Without wishing to be bound by theory, it is believed that increasing the elasticities of the emulsions (i.e., by increasing system component volume fractions) firms up the emulsions and food products comprising such emulsions, and permits stronger binding of food product components. Therefore, in some embodiments, the volume fractions of the emulsions are less than about 64%, less than about 74%, between about 64% and about 74%, or between about 74% and about 85%.

In some embodiments, the emulsions are double emulsions. In some such embodiments, the emulsions are water-in-oil-in-water emulsions. In other such embodiments, the emulsions are oil-in-water-in-oil emulsions. In some such embodiments, the innermost droplet of the emulsions comprise transition metals (e.g., iron sulfate heptahydrate, iron fumarate, manganese gluconate dihydrate, Orgen-I® natural iron, magnesium chloride), or Maillard reaction precursor mixes, or any other water soluble molecules described above which may impart meat-like characters.

Emulsions have melting points that are higher than those of naturally occurring plant-based fats, enabling their use for thermo-responsive release of agents (e.g., during cooking of a food product) that confer meat-like attributes or improve such meat-like attributes. In some embodiments, such agents are coloring agents, and the release of such agents changes the color of the meat-like food products in a manner that is similar to the change in color animal meat undergoes during cooking. In some embodiments, such agents are aroma molecules, and the release of such agents produce aromas similar to the aromas released by animal meat during cooking. In some embodiments, such agents are water and fatty acids, and the release of such agents produce sizzle sounds that are reminiscent of the sizzle sounds produced by animal meat during cooking. In some embodiments, such agents are texturizing agents, and the release of such agents change the texture of the meat-like food products in a manner that is similar to the change in texture animal meat undergoes during cooking. In some embodiments, such agents are fatty acids, and the release of such agents produce melted fat releases that are similar to the melted fat release produced by animal meat during cooking. In some embodiments, such agents are binding agents, and the release of such agents provides a cohesiveness to the meat-like consumables that is similar to the cohesiveness of animal meat during cooking.

In some embodiments, the emulsions have melting points of at least about 30° C. In some embodiments, the emulsions have melting points of between about 30° C. and about 100° C., between about 40° C. and about 90° C., between about 50° C. and about 80° C., between about 50° C. and about 70° C., between about 55° C. and about 65° C., between about 60° C. and about 70° C., or between about 37° C. and about 95° C.

Without wishing to be bound by theory, it is believed that melting point is dependent on various factors, including but not limited to the types of the constituent lipids and the ratio of the constituent lipids. In general, it is expected that lipids that have a longer fatty acid chain length and are more saturated have a higher melting point. Consequently, emulsions that comprise a single type of saturated lipid should have higher melting points than emulsions that comprise blends of saturated and unsaturated lipids, and emulsions that comprise lower contents of unsaturated lipids should have higher melting points than emulsions that comprise higher contents of unsaturated lipids. However, the inventors have made the surprising observation that in some embodiments, emulsions provided herein that have higher contents of unsaturated lipids have higher melting points than emulsions that comprise lower contents of unsaturated lipids (see Example 3).

Cell Wall Materials

In some embodiments, the dispersed system components of the agent release systems comprised in the meat-like food products provided herein are cell wall materials.

The cell wall materials may be derived from a single non-animal or modified non-animal source or from multiple non-animal or modified non-animal sources. Methods for preparing cell wall materials are disclosed in U.S. Utility application Ser. No. 15/225,646 filed Aug. 1, 2016.

In some embodiments, the cell wall materials are cell walls. In some embodiments, the cell walls are yeast cell walls. In some embodiments, the cell wall materials are glucan particles derived from yeast cell walls.

Methods for determining the cell wall material content of a composition are known in the art. Examples of such methods include but are not limited to histological staining of cell wall material followed by microscopy and protein quantitation (e.g., by mass spectroscopy) of protein found in cell wall material (e.g., polysaccharides, glycoproteins, orthosilicic acid).

In some embodiments, the cell wall materials are coated with protective layers. In some such embodiments, the protective layers comprise lipids. In other such embodiments, the protective layers comprise glycoproteins. In other such embodiments, the protective layers comprise polysaccharides. In some such embodiments, the cell wall materials are encapsulated in emulsions.

In some embodiments, the cell wall materials comprise agents to be released that are produced by the non-animal or modified non-animal sources from which the cell wall materials are derived and are extracted together with the cell wall materials. In other embodiments, the cell wall materials comprise agents to be released that are introduced after extraction of the cell wall materials, for example during a post-extraction incubation of the cell wall materials with the agents to be released.

Edible Wax Molecules

In some embodiments, the dispersed system components of the agent release systems comprised in the meat-like food products provided herein are wax molecules. In some embodiments, the wax molecules are paraffin wax molecules. In some embodiments, the wax molecules are natural wax molecules. Suitable examples of natural wax molecules include but are not limited to insect wax molecules, Carnauba wax molecules, yellow bee wax molecules, white bee wax molecules, ouricury wax molecule, and candellila wax molecules.

Alginate Spheres

In some embodiments, the dispersed system components of the agent release systems comprised in the meat-like food products provided herein are alginate spheres. In some embodiments, the alginate spheres comprise between about 0.1% and about 10% by weight of alginate.

Gels

In some embodiments, the agent release systems comprised in the meat-like food products provided herein are kinetically stabilized and/or hardened gels.

The gels can be hydrogels (i.e., gels with water as fluid), organogels (i.e., gels with organic liquid as fluid), lipogels (i.e., gels with lipid as fluid), or xerogels (i.e., gels with fluid removed).

The gels may comprise polymer networks of either natural or synthetic origin. They may be homopolymeric (i.e., polymer networks derived from a single monomer species), copolymeric (i.e., polymer networks derived from two or more different monomer species), multipolymer interpenetrating polymeric (i.e., polymer networks derived from two independent cross-linked synthetic and/or natural polymer components), semi-multipolymer interpenetrating polymeric (i.e., polymer networks derived from one cross-linked polymer and one non-crosslinked polymer), amorphous (i.e., non-crystalline), semicrystalline (i.e., mixtures of amorphous and crystalline phases), crystalline, chemically cross-linked (i.e., polymer networks with permanent junctions), physically cross-linked (i.e., polymer networks with transient junctions that arise from either polymer chain entanglements or physical interactions such as ionic interactions, hydrogen bonds, or hydrophobic interactions), nonionic (i.e., neutral), ionic, ampholytic (i.e., containing both acidic and basic groups), or Zwitterionic (i.e., containing both anionic and cationic groups in each structural repeating unit). The polymer networks may have hydrophilic, hydrophobic, insoluble, soluble, slightly swelling, or strongly swelling properties. In some embodiments, the gels comprise at least about 10%, at least about 20%, at least about 30%, between about 10% and about 15%, between about 15% and about 20%, between about 13% and about 17%, between about 10% and about 13%, between about 8% and about 11%, or between about 8% and about 17% by weight of polymer networks. In some embodiments, the gels comprise carbohydrate polymer networks. Different carbohydrate polymer networks produce different meat-like attributes (e.g., different oil release, different texture, etc.), and mixtures of such materials may be used to provide the desired combinations of properties. Examples of suitable carbohydrate polymer networks include but are not limited to polymer networks made up of polymer network components such as cellulose fibers (e.g., bamboo fibers) and starch strands. The polymer networks may comprise polymer network components (e.g., cellulose fibers, starch strands) of various sizes. In some embodiments, the polymer network components are polydisperse (i.e., of varied fiber lengths). In some embodiments, the polymer network components are monodisperse (i.e., of similar fiber lengths). In some embodiments, the polymer network components are small enough to remain dispersed throughout the fluid of the gel. In some embodiments, the polymer network components may be large enough to settle to the bottom of the fluid of the gel and therefore require the input of energy and/or bulking agents to remain stable. In some embodiments, the polymer network components have an average length of less than about 400 um, less than about 200 um, less than about 110 um, less than about 60 um, or less than about 35 um. The size of the polymer network components can be determined by methods known in the art including but not limited to optical and confocal microscopy.

Gels can be formed using gelling agents. In some embodiments, the gelling agents are synthetic compounds. In other embodiments, the gelling agents are natural compounds. In some such embodiments, the natural compounds are modified to increase their ability to gelatinize or polymerize. Examples of suitable natural compounds include but are not limited to polysaccharides and modified polysaccharides (e.g., cellulose, methylcellulose, ethylcellulose, carboxymethylcellulose, hydropropylmethylcellulose, maltodextrin, carrageenan and its salts, alginic acid and its salts, agar, agarose, oat hydrocolloid, chitosan, cyclodextrin, ammonium alginate, calcium alginate, yeast beta-glucans, bioemulsans, dextran, curdlan, pullulan, scleroglucan, schizophyllan, pachyman, krestin, lentinan, grifolan, glomerellan, pestalotan, tylopilan, cinerean, kefiran, laminarin, fucoidan, glucuronan, pectins [e.g., pectin, agaropectin, low methoxyl pectin]), hyaluronan, carbohydrates, starches, fibers, proteins (e.g., collagen, albumin, ovalbumin, milk protein, whey protein, soy protein, canola protein, alpha-lactalbumin, beta-lactoglobulin, globulins, seed proteins), natural gums (e.g., locust bean gum, gum arabic, gellan gum, xanthan gum, wean gum, succinoglycan gum), gelatins (e.g., gelatin A, gelatin B, Halal gelatin, non-Halal gelatin, Kosher gelatin, non-Kosher gelatin), polyphosphates, and other naturally derived polymers. In some embodiments, the gels comprise less than about 3%, between about 0.5% and about 5%, between about 0.75% and between about 4%, between about 1% and about 3%, between about 0.2% and about 2%, between about 0.5% and about 1.5%, or between about 1.5% and about 2% by weight of agar. In general, the higher the gelling agent contents, the harder the gels.

In some embodiments, the gels further comprise gel stabilizing agents that stabilize the gels during preparation procedures and until trigger conditions are reached. Suitable gel stabilizing agents include but are not limited to polymeric biosurfactants, amphipathic polysaccharides (e.g., methylcellulose), lipopolysaccharides, proteins (e.g., pea protein, soy protein, chickpea protein, algae protein, yeast protein, potato protein, lentil protein), or mannoprotein. In some embodiments, the gel stabilizing agents are insoluble fiber or starch that have moderate swelling properties (e.g., pea fiber, potato starch, corn starch, bamboo fiber, waxy maize, oat fiber, rice starch). In some embodiments, the gels comprise between about 0.1% and about 1.0%, between about 1.0% and about 8.0%, between about 2% and about 10%, or between about 10% and about 20% by weight of stabilizing agents. In some embodiments, the liquid phase acts as the stabilizing agent.

In some embodiments, the gels are hydrogels consisting of primarily water as fluid and of carbohydrate polymer networks that are slightly or strongly swelling in water. Hydrogels are well known in the culinary arts. For example, vegetable cellulose hydrogels are commonly found in sauces, dressings, and ice creams, and creative chefs interested in molecular gastronomy are constantly producing novel dishes using hydrogels in modern cuisine. Hydrogels are also formed by pectins in jams and jellies, by gelatins in Jell-O, by starches in puddings, and by gums in ice creams. Examples of suitable water as fluid include but are not limited to pure water, tap water, bottled water, deionized water, spring water, natural juice, or a mixture thereof. The water may comprise salts and/or minerals. Examples of suitable carbohydrate polymer networks include but are not limited to polymer networks made up of polymer network components such as chitosan, gellan, cellulose, methylcellulose, ethylcellulose, carboxymethylcellulose, hydropropylmethylcellulose, *psyllium* husk, konjac, xanthan gum, guar gum, rhamnose, galacturonic acid, xylose, apiose, arabinose, glucose, glucose groups with methoxide or carboxymethyl or hydroxypropyl groups substituted for hydroxyl residues, mannose, glucuronic acid, sulfated and non-sulfated 3,6 anhydrogalactose, sulfated and nonsulfated galactose, mannuronic acid, 3,6-anhydro-L-galactopyranose, and guluronic acid. The hydrogels may further comprise emulsions (e.g., oil-in-water emulsions) or foams (optionally stabilized with proteins or carbohydrates).

In some embodiments, the gels are lipogels comprising lipids as fluid and carbohydrate polymer networks that are slightly or strongly swelling in lipid. Lipogels are well known in the culinary arts. For example, lipogels are formed when flour and fats are mixed together to fortify the texture of sauces, baking doughs, and other food products. Examples of suitable lipids as fluids comprised in lipogels include but are not limited to microbial oil, plant oil (e.g., almond oil, aloe vera oil, apricot kernel oil, avocado oil, baobab oil, calendula oil, canola oil, corn oil, cottonseed oil, evening primrose oil, grape oil, grape seed oil, hazelnut oil, jojoba oil, linseed oil, macadamia oil, neem oil, olive oil, palm oil, coconut oil, peanut oil, rapeseed oil, sesame oil, soybean oil, sunflower oil, synthetic oils, vegetable oil), algal oil, fungal oil, marine oil, (e.g., Atlantic fish oil, Pacific fish oil, Mediterranean fish oil, light pressed fish oil, alkaline treated fish oil, heat treated fish oil, light and heavy brown fish oil, bonito oil, pilchard oil, tuna oil, sea bass oil, halibut oil, spearfish oil, barracuda oil, cod oil, menhaden oil, sardine oil, anchovy oil, capelin oil, Atlantic cod oil, Atlantic herring oil, Atlantic mackerel oil, Atlantic menhaden oil, salmonid oil, and shark oil, squid oil, cuttlefish oil, octopus oil, krill oil, seal oil, whale oil), docosahexaenoic acid, eicosapentaenoic acid, conjugated fatty acids, eicosanoids, palmitic acid, glycolipids (e.g., cerebrosides, galactolipids, glycosphingolipids, lipopolysaccharides, gangliosides), membrane lipids (e.g., ceramides, sphingomyelin, bactoprenol), glycerides, second messenger signaling lipids (e.g., diglyceride), triglycerides, prenol lipids, prostaglandins, saccharolipids, oils (e.g., non-essential oils, essential oils, natural oils, non-hydrogenated oils, partially hydrogenated oils, synthetic oils), omega-fatty acids (e.g., arachidonic acid, omega-3-fatty acids, omega-6-fatty acids, omega-7-fatty acids, omega-9-fatty acids), and phospholipids (e.g., cardiolipin, ceramide phosphocholines, ceramide phosphoethanolamines, glycerophospholipids, phosphatidic acid, phosphatidylcholine, phosphatidylethanolamine, phosphatidylinositol, phosphosphingolipids, phosphatidylserine), fatty acids having a range of carbon atoms (e.g, from about 8 to about 40, from about 10 to about 38, from about 12 to about 36, from about 14 to about 34, from about 16 to about 32, from about 18 to about 30, or from about 20 to about 28 carbon atoms), fatty acids that comprise at least one unsaturated bond (i.e., a carbon-carbon double or triple bond; e.g., at least 2, at least 3, at least 4, at least 5, at least 6, at least 7, or at least 8 carbon-carbon double bonds and/or triple bonds), fatty acids with conjugated unsaturated bonds (= at least one pair of carbon-carbon double and/or triple bonds are bonded together, without a methylene (CH2) group between them (e.g., 4CH:CHi CH:CHi)), derivatives of the above named fatty acids (e.g., esters [e.g., methyl and ethyl esters], salts [e.g., sodium and potassium salts], triglyceride derivatives, diglycerides derivatives, monoglyceride derivatives, crude oils, semi-refined (also called alkaline refined) oils, refined oils, oils comprising re-esterified triglycerides, fatty acids with low interfacial tension (e.g., less than about 20, less than about 15, less than about 11, less than about 9, less than about 7, less than about 5, less than about 3, less than about 2, less than about 1, or less than about 0.5 dynes/cm, from about 0.1 to about 20, from about 1 to about 15, from about 2 to about 9, from about 3 to about 9, from about 4 to about 9, from about 5 to about 9, from about 2 to about 7, from about 0.1 to 5, from about 0.3 to 2, or from about 0.5 to 1 dynes/cm, about 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0), fatty acids suitable for human consumption (e.g., oils that are liquid at ambient temperature like avocado, mustard, coconut, cottonseed, fish, flax seed, grape, olive, palm, peanut, rapeseed, safflower, sesame, soybean, sunflower; oils that are solid at ambient temperature like butter fat, chocolate fat, chicken fat), conventional fat substitutes (e.g., fatty acid-esterified alkoxylated glycerin compositions, sucrose fatty acid esters, sole fats (e.g., palm oil, palm kernel oil, coconut oil, cocoa butter, shea butter, butter fat, milk fat), soft fats (e.g., canola oil, soybean oil, sunflower oil, safflower oil, olive oil, nut oils), vegetable fats and oils (e.g., e.g., soy bean, corn, cotton seed, rapeseed, rice, peanut, and palm), and combinations and derivatives thereof. Examples of suitable carbohydrate polymer networks include but are not limited to polymer networks made up of polymer network components such as cellulose, bamboo fiber, carrot fiber, oak fiber, chill fiber, pea fiber, and citrus fiber. In some embodiments, the lipogels comprise lipid and carbohydrate polymer combinations selected from the group consisting of canola oil and bamboo fiber, palm oil and bamboo fiber, coconut oil and bamboo fiber, cellulose fibers and canola oil, carrot fiber and canola oil, coconut oil and canola oil and sunflower oil and fiber, palm oil and oak fiber, palm oil and chili fiber, olive oil and cellulose fiber, avocado oil and coconut oil and bamboo fiber, canola oil and pea fiber, sunflower oil and rapeseed oil and cellulose fibers. In some embodiments, the lipogels comprise lipid and carbohydrate polymers at weight ratios of about 95 to about 5, about 90 to about 10, or about 75 to about 25. The lipogels may further comprise emulsions (e.g., oil-in-water emulsions, water-in-oil emulsions) or lipid soluble fractions. In some embodiments, the lipogels comprise small amounts of water and/or gel stabilizing agents. In some such embodiments, the lipogels comprise water-in-oil emulsion droplets dispersed within the lipid phases. In some such embodiments, the water-in-oil emulsion droplets are formed prior to incorporation of the lipogels into the meat-like food products. In other such embodiments, the water-in-oil emulsion droplets are formed during the incorporation of the lipogels into the meat-like food products. In some embodiments, such water-in-oil emulsions comprise transition metals (e.g., iron sulfate heptahydrate, iron fumarate, manganese gluconate dihydrate, Orgen-I® natural iron, magnesium chloride) or Maillard reaction precursor mixes or any other water soluble molecules described above that may impart meat-like properties. In some embodiments, the agents to be released are lipid-soluble and are comprised in lipids comprised in the lipogels. In other embodiments, the agents to be released are water-soluble and are comprised in water-in-oil emulsions comprising in the lipogels.

In some embodiments, the gels comprise meat-like aroma molecules that are released during cooking of the meat-like food products comprising such gels. In some embodiments, the aroma molecules are preferentially soluble in the liquid phases of the gels. In some embodiments, the aroma molecules are preferentially adhered within the polymer networks of the gels. In some embodiments, the aroma molecules are tightly bound to stabilizing agents. In some embodiments, the aroma molecules are adhered to and interact favorably in water-in-oil emulsion droplets.

In some embodiments, the gels comprise meat-like taste agents that are released during cooking of the meat-like food products comprising such gels. In some embodiments, the taste agents are preferentially soluble in the liquid phases of the gels. In some embodiments, the taste agents are preferentially adhered within the polymer networks of the gels. In some embodiments, the taste agents are tightly bound to stabilizing agents. In some embodiments, the taste agents are adhered to and interact favorably in water-in-oil emulsion droplets. In some embodiments, the taste agents are Maillard reaction precursors that require thermal energy to react with each other to produce meat-like tastes.

In some embodiments, the compositions of the gels are such that the meat-like food products provided herein have meat-like colors. For example, gels that appear tan can add a tan hue to food products comprising such gels. Additionally, gels that have been made using a small quantity of oil-soluble dye appear orange-red and can add a modified red hue to food products comprising such gels.

In some embodiments, the compositions of the gels are such that the meat-like food products provided herein have meat-like textures. Without wishing to be bound by theory, it is believed that longer polymer network components form tighter polymer networks with larger viscoelastic characteristics than shorter polymer network components. Other factors that can influence the texture of meat-like food products comprising gels include but are not limited to liquid phases, stabilizing agents, and water content of the gels.

In some embodiments, the compositions of the gels are such that the meat-like food products provided herein have meat-like cohesiveness and/or binding. In some such embodiments, the gels become firmer upon heating.

In some embodiments, the compositions of the gels are such that the meat-like food products provided herein have meat-like juiciness.

In some embodiments, the compositions of the gels are such that the meat-like food products provided herein have meat-like fat release and/or produce meat-like sizzle sounds during cooking. Without wishing to be bound by theory, it is believed that sizzle sound is dependent on various factors, including but not limited to the types and ratios of constituent fats of a food product and the ratio of constituent fats to water in a food product. Therefore, in some embodiments, the ratios of water to lipid are such that such amounts of water and lipid phases are released at higher temperatures such that meat-like sizzle sounds are produced. In some embodiments, the gels contain oil-in-water emulsions that have lipid to water ratios of about 7 to 1.

In some embodiments, the average characteristic mesh size for the polymer chain networks in the gels are such that the meat-like food products provided herein have meat-like cohesivenesses. Without wishing to be bound by theory, it is believed that an increase in the average length of the polymer network of a gel has the effect of increasing its elasticity, which in turn can firm up the food product comprising such a gel and permits stronger binding of that food product's components. Therefore, in some embodiments, the average characteristic mesh sizes of the polymer networks are less than about 100 microns, less than about 20 microns, or between about 5 micron and about 1 micron.

In some embodiments, the gels comprise other agent release systems. For example, a gel can comprise an emulsion. In general, it is expected that gel-stabilization of emulsions does not affect melted fat release or sizzle sound of the emulsions. However, the inventors have made the surprising observation that in certain embodiments, gel stabilization of emulsions is required to produce melted fat releases or sizzle sounds when the emulsions are comprised in the meat-like food products provided. In general, it is expected that the melted fat releases and sizzle sounds produced by gels comprising emulsions are the same when the gels comprising emulsions are isolated in meat-like food products. However, the inventors have made the surprising observation that whereas emulsions in low-fat gels exhibit better melted fat releases and sizzle sounds compared to emulsions in high-fat gels when heated on a griddle, the high-fat gel emulsions produce better melted fat releases and sizzle sounds than the low-fat gel emulsions when comprised in the meat-like food products provided herein. In general, it is expected that the gelling agent contents or emulsifier contents of gel-stabilized emulsions influence melting points to the same extent regardless of lipid contents. However, the inventors have made the surprising observation that in some embodiments, the influence of gelling agent contents or emulsifier contents of gel-stabilized emulsions provided herein differ depending on the lipid contents of the gel-stabilized emulsions. In some embodiments, the gel-stabilized emulsions are easily sliceable. In some embodiments, the gel stabilized emulsions are hard at ambient temperatures of between about 0.1 kg and about 14 kg, between about 2 kg and about 12 kg, between about 2 kg and about 10 kg, between about 4 kg and about 8 kg, between about 10 kg and about 14 kg, or between about 0.1 kg and about 2 kg. In some embodiments, the gel-stabilized emulsions have an adhesiveness of between about 1 and about 30, between about 5 and about 25, between about 10 and about 20, or between about 12 and about 17. In some embodiments, the gel-stabilized emulsions have a resilience of between about 20 and about 70, between about 30 and about 60, or between about 40 and about 50. In some embodiments, the gel-stabilized emulsions have a cohesiveness of between about 0.1 and about 3, between about 0.3 and about 2, or between about 0.5 and about 1. In some embodiments, the gel-stabilized emulsions have a gumminess of between about 500 and about 5000, between about 1000 and about 4000, or between about 2000 and about 3000.

Meat-like Attributes

The one or more similar or superior attributes of animal meat provided by the meat-like products provided herein include but are not limited to color, color stability, cooking color change profile, aroma, aroma stability, cooking aroma release change profile, taste, taste stability, cooking taste change profile, chewiness, chewiness stability, cooking chewiness change profile, gumminess, gumminess stability, cooking gumminess change profile, springiness, springiness stability, cooking springiness change profile, cohesiveness, cohesiveness stability, cooking cohesiveness change profile, resilience, resilience stability, cooking resilience change profile, adhesiveness, adhesiveness stability, cooking adhesiveness change profile, hardness, hardness stability, cooking hardness change profile, MC, MC stability, cooking MC change profile, juiciness, juiciness stability, cooking juiciness change profile, head space GCMS pattern, head space GCMS pattern stability, cooking head space GCMS pattern change profile, protein content, lipid content, carbohydrate content, fiber content, cooking sizzle sound change profile, cooking melted fat release change profile, cook loss, cook loss change profile, doneness change profile, and combinations thereof. In this context, attribute stabilities (e.g., color stability, aroma stability, taste stability, chewiness stability, gumminess stability, springiness stability, cohesiveness stability, resilience stability, adhesiveness stability, hardness stability, MC stability, juiciness stability, head space GCMS pattern stability) refer to the persistence of the attributes over the course of time (e.g., over the course of time in storage), and cooking attribute change profiles (e.g., cooking color change profile, cooking aroma release change profile, cooking taste change profile, cooking chewiness change profile, cooking gumminess change profile, cooking springiness change profile, cooking cohesiveness change profile, cooking resilience change profile, cooking adhesiveness change profile, cooking hardness change profile, cooking moisture loss change profile, cooking head space GCMS pattern change profile, cooking sizzle sound change profile, cooking melted fat release change profile, cook loss change profile, doneness change profile) refer to the change profiles of attributes over the course of a cooking process.

In some embodiments, the uncooked meat-like food products provided herein have one or more similar or superior meat-like attributes compared to uncooked animal meat. In some such embodiments, the uncooked meat-like food products have one or more similar or superior meat-like attributes compared to uncooked 80/20 ground beef. In some such embodiments, the uncooked meat-like food products have one or more similar or superior meat-like attributes compared to uncooked 90/10 ground beef. Suitable meat-like attributes of uncooked animal meat include but are not limited to color, aroma, taste, chewiness, gumminess, springiness, cohesiveness, resilience, adhesiveness, hardness, MC, protein content, lipid content, carbohydrate content, fiber content, juiciness, and head space GCMS.

In some embodiments, the uncooked meat-like food products have a L* color value of between about 49 and about 36.7, an a* color value of between about 21.8 and about 21.3, and a b* color value of between about 22.8 and about 20.7. In some embodiments, the uncooked meat-like food products have a L* color value of between about 40.7 and about 39, an a* color value of between about 18.3 and about 17.3, and a b* color value of between about 20.7 and about 16.8. In some embodiments, the uncooked meat-like food products have a L* color value of between about 43.5 and about 46.5, an a* color value of between about 18 and about 19.2, and a b* color value of between about 14.5 and about 15.

In some embodiments, the uncooked meat-like food products have a hardness of between about 1000 g and about 6000 g, about 5500 g, about 5000 g, about 4500 g, about 4000 g, about 3500 g, about 3000 g, about 2500 g, about 2000 g, or about 1500 g; between about 1500 g and about 6000 g, about 5500 g, about 5000 g, about 4500 g, about 4000 g, about 3500 g, about 3000 g, about 2500 g, or about 2000 g; between about 2000 g and about 6000 g, about 5500 g, about 5000 g, about 4500 g, about 4000 g, about 3500 g, about 3000 g, or about 2500 g; between about 2500 g and about 6000 g, about 5500 g, about 5000 g, about 4500 g, about 4000 g, about 3500 g, about 3000 g; between about 3000 g and about 6000 g, about 5500 g, about 5000 g, about 4500 g, about 4000 g, or about 3500 g; between about 3500 g and about 6000 g, about 5500 g, about 5000 g, about 4500 g, or about 4000 g; between about 4000 g and about 6000 g, about 5500 g, about 5000 g, or about 4500 g; between about 4500 g and about 6000 g, about 5500 g, or about 5000 g; between about 5000 g and about 6000 g, or about 5500 g; or between about 5500 g and about 6000 g In some embodiments, the uncooked meat-like food products have a resilience of between about 4 and about 9, about 8.5, about 8, about 7.5, about 7, about 6.5, about 6, about 5.5, about 5, or about 4.5; between about 4.5 and about 9, about 8.5, about 8, about 7.5, about 7, about 6.5, about 6, about 5.5, or about 5; between about 5 and about 9, about 8.5, about 8, about 7.5, about 7, about 6.5, about 6, or about 5.5; between about 5.5 and about 9, about 8.5, about 8, about 7.5, about 7, about 6.5, or about 6; between about 6 and about 9, about 8.5, about 8, about 7.5, about 7, or about 6.5; between about 6.5 and about 9, about 8.5, about 8, about 7.5, or about 7; between about 7 and about 9, about 8.5, about 8, or about 7.5; between about 7.5 and about 9, about 8.5, or about 8; between about 8 and about 9, or about 8.5; or between about 8.5 and about 9.

In some embodiments, the uncooked meat-like food products have a cohesiveness of between about 0.1 and about 0.5, about 0.45, about 0.4, about 0.35, about 0.3, about 0.25, about 0.2, or about 0.15; between about 0.15 and about 0.5, about 0.45, about 0.4, about 0.35, about 0.3, about 0.25, or about 0.2; between about 0.2 and about 0.5, about 0.45, about 0.4, about 0.35, about 0.3, or about 0.25; between about 0.25 and about 0.5, about 0.45, about 0.4, about 0.35, or about 0.3; between about 0.3 and about 0.5, about 0.45, about 0.4, or about 0.35; between about 0.35 and about 0.5, about 0.45, or about 0.4; between about 0.4 and about 0.5, or about 0.45; or between about 0.45 and about 0.5.

In some embodiments, the uncooked meat-like food products have a springiness of between about 20 and about 60, about 55, about 50, about 45, about 40, about 35, about 30, or about 25; between about 25 and about 60, about 55, about 50, about 45, about 40, about 35, or about 30; between about 30 and about 60, about 55, about 50, about 45, about 40, or about 35; between about 35 and about 60, about 55, about 50, about 45, or about 40; between about 40 and about 60, about 55, about 50, or about 45; between about 45 and about 60, about 55, or about 50; between about 50 and about 60, or about 55; or between about 55 and about 60.

In some embodiments, the uncooked meat-like food products have a gumminess of between about 300 and about 1000, about 900, about 800, about 700, about 600, about 500, or about 400; between about 400 and about 1000, about 900, about 800, about 700, about 600, or about 500; between about 500 and about 1000, about 900, about 800, about 700, or about 600; between about 600 and about 1000, about 900, about 800, or about 700; between about 700 and about 1000, about 900, or about 800; between about 800 and about 1000, or about 900; or between about 900 and about 1000.

In some embodiments, the uncooked meat-like food products have a chewiness of between about 100 and about 500, about 450, about 400, about 350, about 300, about 250, about 200, or about 150; between about 150 and about 500, about 450, about 400, about 350, about 300, about 250, or about 200; between about 200 and about 500, about 450, about 400, about 350, about 300, or about 250; between about 250 and about 500, about 450, about 400, about 350, or about 300; between about 300 and about 500, about 450, about 400, or about 350; between about 350 and about 500, about 450, or about 400; between about 400 and about 500, or about 450; or between about 450 and about 500.

In some embodiments, the cooked meat-like food products have a JCM of between about 0.09 and about 0.15, about 0.14, about 0.13, about 0.12, about 0.11, or about 0.10; between about 0.10 and about 0.15, about 0.14, about 0.13, about 0.12, or about 0.11; between about 0.11 and about 0.15, about 0.14, about 0.13, or about 0.12; between about 0.12 and about 0.15, about 0.14, or about 0.13; between about 0.13 and about 0.15, or about 0.14; or between about 0.14 and about 0.15.

In some embodiments, the cooked meat-like food products have an OWV of between about 1 and about 4, about 3.5, about 3, about 2.5, about 2, or about 1.5; between about 1.5 and about 4, about 3.5, about 3, about 2.5, or about 2; between about 2 and about 4, about 3.5, about 3, or about 2.5; between about 2.5 and about 4, about 3.5, or about 3; between about 3 and about 4, or about 3.5; or between about 3.5 and about 4.

In some embodiments, the uncooked meat-like food products have a binding (in N*mm) at 10 C of between about 30 and about 150, about 140, about 130, about 120, about 110, about 100, about 90, about 80, about 70, about 60, about 50, or about 40; between about 40 and about 150, about 140, about 130, about 120, about 110, about 100, about 90, about 80, about 70, about 60, or about 50; between about 50 and about 150, about 140, about 130, about 120, about 110, about 100, about 90, about 80, about 70, or about 60; between about 60 and about 150, about 140, about 130, about 120, about 110, about 100, about 90, about 80, or about 70; between about 70 and about 150, about 140, about 130, about 120, about 110, about 100, about 90, or about 80; between about 80 and about 150, about 140, about 130, about 120, about 110, about 100, or about 90; between about 90 and about 150, about 140, about 130, about 120, about 110, or about 100; between about 100 and about 150, about 140, about 130, about 120, or about 110; between about 110 and about 150, about 140, about 130, or about 120; between about 120 and about 150, about 140, or about 130; between about 130 and about 150, or about 140; or between about 140 and about 150. In some embodiments, the uncooked meat-like food products have a binding at 15 C of between about 20 and about 90, about 80, about 70, about 60, about 50, about 40, or about 30; between about 30 and about 90, about 80, about 70, about 60, about 50, or about 40; between about 40 and about 90, about 80, about 70, about 60, about 50; between about 50 and about 90, about 80, about 70, about 60; between about 60 and about 90, about 80, about 70; between about 70 and about 90, about 80; or between about 80 and about 90.

In some embodiments, the uncooked meat-like food products provided herein have one or more similar or superior meat-like attribute stabilities compared to uncooked animal meat. In some such embodiments, the uncooked meat-like food products have one or more similar or superior meat-like attribute stabilities compared to uncooked 80/20 ground beef. In some such embodiments, the uncooked meat-like food products have one or more similar or superior meat-like attribute stabilities compared to uncooked 90/10 ground beef. Suitable meat-like attribute stabilities include but are not limited to color stability, aroma stability, taste stability, chewiness stability, gumminess stability, springiness stability, cohesiveness stability, resilience stability, adhesiveness stability, hardness stability, MC stability, juiciness stability, and head space GCMS pattern stability. In some embodiments, the similar or superior meat-like attribute stabilities persist over storing the meat-like food products at suitable storage conditions. In some such embodiments, the suitable storage conditions include storage at temperatures of less than about 15° C. In some embodiments, the similar or superior meat-like attribute stabilities persist over one or more cycles of freezing and thawing. In some such embodiments, the one or more cycles of freezing and thawing are 1 cycle, 2 cycles, 3 cycles, 4 cycles, 5 cycles, and more than 5 cycles of freezing and thawing.

In some embodiments, the uncooked meat-like food products comprise coloring agents that either natively or due to the presence of other agents in the uncooked meat-like food product have at least the same or superior redox stabilities as myoglobin.

In some embodiments, the meat-like food products provided herein have one or more similar or superior cooking attribute change profiles compared to animal meat. In some such embodiments, the meat-like food products have one or more similar or superior cooking attribute change profiles compared to 80/20 ground beef. In some such embodiments, the meat-like food products have one or more similar or superior cooking attribute change profiles compared to 90/10 ground beef. Suitable cooking attribute change profiles include but are not limited to cooking color change profile, cooking aroma release change profile, cooking taste change profile, cooking chewiness change profile, cooking gumminess change profile, cooking springiness change profile, cooking cohesiveness change profile, cooking resilience change profile, cooking adhesiveness change profile, cooking hardness change profile, cooking moisture loss change profile, cooking head space GCMS pattern change profile, cooking sizzle sound change profile, cooking melted fat release change profile, cook loss change profile, and doneness change profile.

In some embodiments, the cooking color change profile of the meat-like food products is decreasing $L^*a^*b^*$ color values from those of the uncooked meat-like food products. In some embodiments, the cooking chewiness change profile of the meat-like food products is increasing chewiness. In some embodiments, the cooking gumminess change profile of the meat-like food products is increasing gumminess. In some embodiments, the cooking springiness change profile of the meat-like food products is increasing springiness. In some embodiments, the cooking cohesiveness change profile of the meat-like food products is increasing cohesiveness. In some embodiments, the cooking resilience change profile of the meat-like food products is increasing resilience. In some embodiments, the cooking adhesiveness change profile of the meat-like food products is decreasing adhesiveness. In some embodiments, the cooking hardness change profile of the meat-like food products is increasing hardness. In some embodiments, the cooking moisture loss change profile of the meat-like food products is increasing moisture loss. In some embodiments, the cook loss change profile of the meat-like food products is increasing cook loss. In this context, the term "cooking" refers to a cooking time of up to 3-6 minutes on each side of the meat-like food product (i.e., 10 minutes total cooking time) at a cooking temperature of 350° F.

In some embodiments, the cooked meat-like food products provided herein have one or more similar or superior meat-like attributes compared to cooked animal meat. In some such embodiments, the cooked meat-like food products have one or more similar or superior meat-like attributes compared to cooked 80/20 ground beef. In some such embodiments, the cooked meat-like food products have one or more similar or superior meat-like attributes compared to cooked 90/10 ground beef. In some embodiments, the cooked meat-like food products have one or more similar or superior meat-like attributes compared to rare cooked animal meat. In some embodiments, the cooked meat-like food products have one or more similar or superior meat-like attributes compared to medium cooked animal meat. In some embodiments, the cooked meat-like food products have one or more similar or superior meat-like attributes compared to well done cooked animal meat. Suitable meat-like attributes of cooked animal meat include but are not limited to color, aroma, taste, chewiness, gumminess, springiness, cohesiveness, resilience, adhesiveness, hardness, MC, protein content, lipid content, carbohydrate content, fiber content, juiciness, head space GCMS, and cooking time.

In some embodiments, the cooked meat-like food products have a $L^*$ color value of between about 27.8 and about 26.4, an $a^*$ color value of between about 12.8 and about 12.2, and a $b^*$ color value of between about 18.4 and about 15.2. In some embodiments, the cooked meat-like food products have a $L^*$ color value of between about 34.8 and about 28.9, an $a^*$ color value of between about 10.6 and about 9.4, and a $b^*$ color value of between about 19 and about 12.4. In some embodiments, the cooked meat-like food products have a $L^*$ color value of between about 37 and about 39.5, an $a^*$ color value of between about 13.5 and about 14.5, and a $b^*$ color value of between about 20 and about 21.5.

In some embodiments, the cooked meat-like food products provided herein have one or more similar or superior meat-like attribute stabilities compared to cooked animal meat. In some such embodiments, the cooked meat-like food products have one or more similar or superior meat-like attribute stabilities compared to cooked 80/20 ground beef. In some such embodiments, the cooked meat-like food products have one or more similar or superior meat-like attribute stabilities compared to cooked 90/10 ground beef. In some embodiments, the cooked meat-like food products have one or more similar or superior meat-like attribute stabilities compared to rare cooked animal meat. In some embodiments, the cooked meat-like food products have one or more similar or superior meat-like attribute stabilities compared to medium cooked animal meat. In some embodiments, the cooked meat-like food products have one or more similar or superior meat-like attribute stabilities compared to well done cooked animal meat. Suitable meat-like attribute stabilities include but are not limited to color stability, aroma stability, taste stability, chewiness stability, gumminess stability, springiness stability, cohesiveness stability, resilience stability, adhesiveness stability, hardness stability, MC stability, juiciness stability, and head space GCMS pattern stability. In some embodiments, the similar or superior meat-like attribute stabilities persist over storing the meat-like food products at suitable storage conditions. In some such embodiments, the suitable storage conditions include storage at temperatures of less than about 15 C. In some embodiments, the similar or superior meat-like attribute stabilities persist over one or more cycles of freezing and thawing. In some such embodiments, the one or more cycles of freezing and thawing are 1 cycle, 2 cycles, 3 cycles, 4 cycles, 5 cycles, and more than 5 cycles of freezing and thawing.

In some embodiments, the meat-like food products provided herein have one or more different (e.g., less, more, shorter, longer) attributes, attribute stabilities, or attribute cooking change profiles compared to animal meat. In some such embodiments, the meat-like food products have one or more different attributes, attribute stabilities, or attribute cooking change profiles compared to 80/20 ground beef. In some such embodiments, the meat-like food products have one or more different attributes, attribute stabilities, or attribute cooking change profiles compared to 90/10 ground beef. In some embodiments, the meat-like food products have a different sizzle sound cooking change profile. In some such embodiments, the meat-like food products comprise different contents of protein, lipid, carbohydrate, edible fiber, and water as uncooked animal meat (e.g., the meat-like food products may comprise more water) but similar contents of protein, lipid, carbohydrate, edible fiber, and water as cooked animal meat.

The meat-like attributes of the meat-like food products can be calibrated by inclusion of one or more high edible fiber components. Without wishing to be bound by theory, it is believed that the presence of such high edible fiber components can improve the animal meat-like attributes of the meat-like food products, but that at high concentrations they can harm the animal meat-like attributes of the meat-like food products. Therefore, in some embodiments, the meat-like food products provided herein comprise at least about 1%, between about 1% and about 20%, between about 5% and 15%, between about 8% and about 13%, between about 1% and about 10%, between about 2% and about 9%, between about 3% and about 8%, between about 4% and about 7%, between about 2% and about 7%, or between about 5% and about 6% by weight of high edible fiber components. Suitable examples of high edible fiber components include but are not limited to *Psyllium* husk (see Example 1), calcium alginate (see Example 1), and konjac flour. In some embodiments, the meat-like food products comprise between about 2% and about 7% by weight of *Psyllium* husk. In some embodiments, the meat-like food products comprise konjac flour and have an alkaline pH (e.g., pH of greater than about 8, greater than about 9, greater than about 10, greater than about 11, greater than about 12). In some embodiments, the average WBS strengths of the high edible fiber components are between about 500 g/mm2 and about 4,000 g/mm2. In some embodiments, the diameters of the high edible fiber components are between about 1 mm and about 10 mm, between about 2 mm and about 9 mm, between about 3 mm and 8 mm, between about 4 mm and about 7 mm, between about 5 mm and about 6 mm, between about 2 mm and about 5 mm, or between about 3 mm and about 4 mm. In some embodiments, the lengths of the high edible fiber components are between about 0.5 cm and about 10 cm, between about 1 cm and about 9 cm, between about 2 cm and about 8 cm, between about 3 cm and about 7 cm, between about 4 cm and about 6 cm, between about 3 cm and about 6 cm, or between about 4 cm and about 5 cm.

Process for Producing Meat-Like Food Products

In another aspect, provided herein are methods for producing the meat-like food products provided herein. The meat-like food products are produced by coagulating meat structured protein products, and optionally agent released systems and/or other ingredients, using one or more binding agents.

Processes for producing meat structured protein products are disclosed, for example, in U.S. Utility application Ser. No. 13/272,825 filed Oct. 13, 2011; U.S. Utility application Ser. No. 14/687,803 filed Apr. 15, 2015; U.S. Utility application Ser. No. 14/687,830 filed Apr. 15, 2015; U.S. Utility application Ser. No. 14/855,212 filed Sep. 15, 2015; or U.S. Utility application Ser. No. 15/225,646 filed Aug. 1, 2016.

In some embodiments, the methods for producing the meat-like food products comprise the step of combining at least one meat structured protein product with at least one binding agent and optional other ingredients. In some embodiments, the methods for producing the meat-like food products comprise the step of combining at least one meat structured protein product with at least one agent release system and at least one binding agent and optional other ingredients.

In some embodiments, the binding agents, and the optional agent release systems and/or other ingredients, are introduced into the meat-like food products evenly. In some embodiments, the binding agents, and the optional agent release systems and/or other ingredients, are introduced into the meat-like food products unevenly (e.g., to create local concentrations of agent release systems). In some embodiments in which the agent release systems comprise gels, the agent release systems are mixed with the meat structured protein products and binding agents and optional other ingredients prior to setting of the gels. In other embodiments in which the agent release systems comprise gels, the agent release systems may need to be shredded or cut or sliced into pieces prior to inclusion in the meat-like food products. In some embodiments, the binding agents and/or the agent release systems and/or the other ingredients are applied to the surface of the meat-like food products (e.g., by spraying). In some embodiments, the binding agents and/or the agent release systems and/or the other ingredients, are injected or sprayed (e.g., in dry form) into specific locations in the meat-like food products.

In embodiments in which the agent release systems are emulsions, the emulsions are typically formed by combining a dispersed phase with an immiscible continuous phase. Suitable dispersed and continuous phases for producing the emulsions are those disclosed elsewhere in this document. In preferred oil-in-water emulsions, lipid is present in an amount of between about 1% and about 50%, between about 3% and about 40%, between about 5% and about 20%, between about 5% and 10%, between about 5% and about 40%, between about 5% and about 60%, or between about 10% and about 30% by weight. In some embodiments, the emulsions comprise at least about 30% by weight of canola oil. In some embodiments, the emulsions comprise at least about 10% by weight of palm oil or coconut oil. In some embodiments, droplet sizes are reduced to reduce the lipid contents of the emulsions and meat-like food products provided herein. Emulsifiers can be added to the dispersed phase, the continuous phase, or the emulsion. It is usually preferred to add the emulsifiers to the continuous phase prior to addition of the dispersed phase. Other ingredients may be included in the dispersed phases or continuous phases of the emulsions to improve qualities of the emulsions. Such other ingredients can be added to the dispersed phases before the emulsions are made, added during emulsification, or mixed in after the emulsions are made.

Emulsions can form spontaneously, or they may require mechanical energy to form (e.g., vortexing, homogenization, agitation, sonication, high pressure, or any other suitable mechanical activity). When emulsification is aided by lower amounts of mechanical energy (e.g., agitation in a conventional mixer under moderate shear of between about 100 rpm and about 1,000 rpm), the average droplet size of the resulting emulsion is typically larger (e.g., at least about 75% of the droplets have a diameter greater than about 25 um). When emulsification is aided by higher amounts of mechanical energy (e.g., homogenization in a high-pressure [e.g., between about 35 bar and about 650 bar] 1- or 2-stage homogenizer [e.g., between about 1,000 rpm and about 10,000 rpm], or microfluidic homogenization [between about 500 and about 2,000 bar]), the average droplet size of the resulting emulsion is typically smaller (e.g., at least about 75% of the droplets have a diameter of less than about 10 um). Nanoemulsions can be obtained by homogenizing in a microfluidizer. To obtain high lipid emulsions, lipid must be added gradually during mixing.

Heating can aide in emulsification. In some embodiments, emulsification is performed at greater than room temperature, greater than 30° C., 40° C., 50° C., 60° C., 70° C., 80° C., between about 90° C. and about 120° C., between about 30° C. and about 60° C., or between about 40° C. and about 50° C. The use of higher temperatures is preferred as it decreases microbial stability and increases sterility. Heating is avoided when the emulsions comprise thermally labile or reactive compounds. Alternatively, the emulsions may be acidified to inhibit microbiological growth. When acidified, the emulsions typically have enough acidic pH and/or ionic strength adjusting agents added so that the pH of the emulsions is between about 2.75 and about 5.75, and preferably, between about 2.85 and about 5.50, and most preferably, between about 3.25 and about 4.25, including all ranges subsumed therein. There is no limitation with respect to the type of pH and/or ionic strength adjusting agents employed other than that they be used in formulations suitable for human consumption and that they not affect the surface activity of the emulsifiers (i.e., too low or too high pH can change the chemistry of emulsifiers, making them no longer suitable to stabilize emulsions). The pH and/or ionic strength adjusting agents may be added before or after the emulsions are made.

Emulsification can be monitored by removing a sample of the mixture and analyzing it by such methods as microscopy, light scattering, or refractometry.

Heating is generally followed by cooling, whereby emulsions that comprise a high density of droplets may set into solid materials consisting of heat-coagulated matrices of emulsifiers with entrapped lipid droplets comprising agents to be released. Cooling can be accomplished by methods known in the art (e.g., the use of a chiller). The rate of cooling can be about 1° C. per about 1 to about 100 minutes. For example, the rate of cooling can be about 1° C. per about 1, 5, 10, 15, 20, 25, 30, 35, 40, 45, 50, 55, 60, 65, 70, 75, 80, 85, 90, 95, or 100 minutes. Cooling can continue until the mixture reaches a temperature of between about 5° C. and about 10° C.

The emulsions can be dehydrated. Methods for dehydrating emulsions are known in the art and include, but are not limited to, spray drying, freeze drying, drying with ethanol, and evaporation. Spray drying techniques are disclosed in "Spray Drying Hand book", K. Masters, 5th edition, Longman Scientific Technical UK, 1991.

The degree of emulsification achieved and hence the final textures of the emulsions can be controlled to a certain degree by varying certain parameters during emulsification. For example, droplet sizes can be adjusted by titrating types and amounts of emulsifiers and/or dispersed phases, and by titrating the amount of mechanical energy used during emulsification. Droplet sizes can also be adjusted with flow-focusing techniques or other microfluidic techniques. Droplet densities can be adjusted by centrifugation or filtration techniques; depending on the density differences between the dispersed and continuous phases, droplets will either rise to the top of vials in a centrifuge (if the density of droplets is lower than the density of the continuous phases) or settle to the bottoms (if the density of droplets is higher than continuous phases), and polydisperse emulsions can be fractionated into multiple monodisperse samples using macro- and microfiltration and utilizing filters with different pore sizes, or using tangential flow filtration (TFF). The emulsification capacity of emulsifiers can be affected by changes in the pH of the continuous phase, by variations in temperature at which emulsification occurs (with greater emulsification occurring at 40° C. than at ambient temperature, which can, for example, permit higher lipid release), and by the presence of salts in the continuous phases that affect the dispersion of the emulsifiers (the more dispersed the emulsifiers, the more available they are for emulsification).

When droplet densities are high, and emulsion viscosities are high (e.g., volume fractions of greater than 0.64), the emulsions may gel. Alternatively, gel formation may be brought about by adding gelling agents to the emulsions. Such gelling agents can be added to the continuous phases prior to addition of the dispersed phases and emulsification. Alternatively, the gelling agent can be added after emulsification to the emulsions.

In embodiments in which the agent release systems are gels, any techniques that can be used to create cross-linked polymers in liquids can be used to produce the gels, including one-step procedures like gelation, polymerization, and parallel cross-linking of multifunctional monomers, as well as multiple step procedures involving synthesis of polymer molecules having reactive groups and their subsequent cross-linking, possibly also by reacting polymers with suitable cross-linking agents. The gels can be designed with tailored properties, such as biodegradation, mechanical strength, and chemical and biological response to stimuli. After polymerization or gelation, the gel mass may be washed to remove impurities left from the preparation process, including but not limited to non-reacted monomer, initiators, cross-linkers, and unwanted products produced via side reactions. Gels comprising emulsions can be generated by generating the emulsions first and either dissolving or injecting the emulsions in water comprising dissolved gelling agents, ideally right before setting of the gels to prevent excessive heating of the emulsions, and finally cooling the mix. Alternatively, dispersed phases can be slowly added to solutions of the continuous phases comprising dissolved gelling agents. Gels comprising more than one agent to be released can be generated by injecting gels comprising a first agent to be released with agent release systems comprising additional agents to be released. In some embodiments, the gels comprise ingredients that increase gel firmness. Examples of ingredients that increase gel firmness include but are not limited to agar agar, gelatin, and denatured protein fractions. In other embodiments, the gels comprise ingredients that decrease gel firmness. Examples of ingredients that decrease gel firmness include but are not limited to diluents and non-interacting emulsion cargo.

Extended Meat Products

In a further aspect, the present invention provides extended meat products that are produced by extending animal meat with meat-like food products as provided herein.

The animal meat may be intact, in chunks, in steak form, ground, finely textured, trim or residues derived from processing frozen animals, low temperature rendered, mechanically separated or deboned (MDM, which is a meat paste that is recovered from animal bones, and a comminuted product that is devoid of the natural fibrous texture found in intact muscles) (i.e., meat removed from bone by various mechanical means), cooked, or combinations thereof. The animal meat may include muscle, skin, fat (including rendered fat such as lard and tallow, flavor enhanced animal fats, fractionated or further processed animal fat tissue), or other animal components.

Animal meat may be extended by blending with meat-like food products as provided, optionally together with other constituents, including but not limited to dietary fiber, animal or plant lipid, or animal-derived protein material (e.g. casein, caseinates, whey protein, milk protein concentrate, milk protein isolate, ovalbumin, ovoglobulin, ovomucin, ovomucoid, ovotransferrin, ovovitella, ovovitellin, albumin globulin, and vitellin). Preferably, the blended meat-like food products and the animal meat have similar particle sizes. The amount of meat-like food products in relation to the amount of animal meat during blending will vary depending on the intended use of the extended meat products. By way of example, when a significantly vegetarian composition that has a relatively small degree of animal flavor is desired, the concentration of animal meat in the extended meat may be about 45%, about 40%, about 35%, about 30%, about 25%, about 20%, about 15%, or about 10% by weight. Alternatively, when a composition having a relatively high degree of animal meat flavor is desired, the concentration of animal meat in the extended meat product may be about 50%, about 55%, about 60%, about 65%, about 70%, or about 75% by weight. Depending upon the intended use of the extended meat product, the animal meat is typically precooked to partially dehydrate the flesh and to prevent the release of fluids during further processing applications (e.g., such as retort cooking), to remove natural liquids or oils that may have strong flavors, to coagulate the animal protein and loosen the meat from the skeleton, or to develop desirable and textural flavor properties. The precooking process may be carried out in steam, water, oil, hot air, smoke, or a combination thereof. The animal meat is generally heated until the internal temperature is between about 60° C. and about 85° C.

Other Ingredients

The meat-like food products and extended meat products provided herein may comprise various other ingredients. In most embodiments, the meat-like protein products and extended meat products provided herein may comprise any one of these other ingredients at between about 0.01% and about 5% by weight.

Examples of such ingredients include but are not limited to amino acids and amino acid derivatives (e.g., 1-aminocyclopropane-1-carboxylic acid, 2-aminoisobutyric acid, alanine, arginine, aspartic acid, canavanine, catecholamine, citruline, cysteine, essential amino acids, glutamate, glutamic acid, glutamine, glycine, histidine, homocysteine, hydroxyproline, hypusine, isoleucine, lanthionine, leucine, lysine, lysinoalanine, methionine, mimosine, non-essential amino acids, ornithine, phenylalanine, phenylpropanoids, photoleucine, photomethionine, photoreactive amino acids, proline, pyrrolysine, selenocysteine, serine, threonine, tryptophan, tyrosine, valine), anti-inflammatory agents (e.g., leukotriene antagonists, lipoxins, resolvins), antibiotics (e.g., alamethicin, erythromycin, tetracyclines), antimicrobial agents (e.g., potassium sorbate), antiparasitic agents (e.g., avermectins), buffering agents (e.g., citrate), clot-ting agents (e.g., thromboxane), coagulants (e.g., fumarate), coenzymes (e.g., coenzyme A, coenzyme C, s-adenosylmethionine, vitamin derivatives), crosslinking agents (e.g., beta-1,3-glucan transglutaminase, calcium salts, magnesium salts), dairy protein (e.g., casein, whey protein), dietary minerals (e.g., ammonium, calcium, fat soluble minerals, gypsum, iron, magnesium, potassium, aluminum), disaccharides (e.g., lactose, maltose, trehalose), edulcorants (e.g., artificial sweeteners, corn sweeteners, sugars), egg protein (e.g., ovalbumin, ovoglobulin, ovomucin, ovomucoid, ovotransferrin, ovovitella, ovovitellin), elasticizing agents (e.g., gluten), emulsifiers (e.g., lecithin, lecithins), enzymes (e.g., hydrolase, oxidoreductase, peroxidase), essential nutrients (e.g., alpha-linolenic acid, gamma-linolenic acid, linoleic acid, calcium, iron, omega-3 fatty acids, zinc), fat soluble compounds, flavones (e.g., apigenin, chrysin, luteolin, flavonols, daemfero, datiscetin, myricetin), glycoproteins, gums (e.g., carob bean gum, guar gum, tragacanth gum, xanthan gum), hemoproteins (e.g., hemoglobin, leghemoglobin, myoglobin), humectants (e.g., polyethylene glycol, propylene glycol, sorbitol, xylitol), isoprenes, isoprenoid pathway compounds (e.g., mevalonic acid, dimethylallyl pyrophosphate, isopentenyl pyrophosphate), isoprenoids or isoprenoid derivatives (e.g., dolichols, polyprenols), liver X receptor (LXR) agonists and antagonists, meat proteins (e.g., collagen), mechanically separated meat, metabolic pathway intermediates (e.g., oxaloacetate, succinyl-CoA), monosaccharides (e.g., fructose, galactose, glucose, lactose, lyxose, maltose, mannose, ribose, ribulose, xylulose), neuroactive compounds (e.g., anandamide, cannabinoids, cortisol, endocannabinoids, gamma-aminobutyric acid, inositol), neutraceuticals, nucleic acids (e.g., DNA, RNA, rRNA, tRNA), nutritional supplements (e.g., carnitine, fumarate, glucosamine), oil-soluble compounds, organ meat, oxidizing agents (e.g., quinones), partially defatted tissue and blood serum proteins, plasticizing materials, polyols (e.g., alkylene glycols, butanediols, glycerine, glycerol, mannitol, propylene glycol, sorbitol, xylitol), polysaccharides (e.g., pectin, maltodextrin, glycogen, inulin), porphyrins, secondary metabolites (e.g., polyketides), secosteroids, spices, steroids (e.g., C18-carbon containing steroids, C19-carbon containing steroids, C21-carbon containing steroids, cholesterol, cycloartenol, estradiol, lanosterol, squalene), sterols (e.g., betasitosterol, bras sicasterol, cholesterol, ergosterol, lanosterol, oxysterols, phytosterols, stigmasterol), tannins (e.g., ellagic tannins, ellagic tannins from roasted oak wood, gallic tannins, proanthocyanidin tannins from aromatic grape skin, proanthocyanidin tannins from grape seeds, proanthocyanidin tannins from grape skin, profisetinidin tannins, tannins from green tea leaves, tannins from sangre de drago), terpenes (e.g., diterpenes, monoterpenes, sesquiterpene, squalane, tetraterpenes, triterpenes), thickening agents (e.g., guar gum, pectin, xanthan gum, agar, alginic acid and its salts, carboxymethyl cellulose, carrageenan and its salts, gums, modified starches, pectins, processed Eucheuma seaweed, sodium carboxymethyl cellulose, tara gum), vitamins (e.g., alpha-tocopherol, alpha-tocotrienol, beta-tocopherol, beta-tocotrienol, delta-tocopherol, delta-tocotrienols, fat soluble vitamins, gamma-tocopherol, gamma-tocotrienol, pantothenic acid, vitamin A, vitamin B-12, vitamin C, vitamin D, vitamin E, vitamin K, water soluble vitamins), water-soluble compounds, wax esters, and xenoestrogens (e.g., phytoestrogens).

Further examples include but are not limited to antioxidants (e.g., carotenes, ubiquinone, resveratrol, alpha-tocopherol, lutein, zeaxanthin, "2,4-(tris-3',5'-bitert-butyl-4'-hydroxybenzyl)-mesitylene (i.e., Ionox 330)", "2,4,5-trihydroxybutyrophenone", "2,6-di-tert-butyiphenol", "2,6-di-tert-butyl-4-hydroxymethylphenol (i.e., Ionox 100)", "3,4-dihydroxybenzoic acid", 5-methoxy tryptamine, "6-ethoxy 1,2-dihydro-2,2,4-trimethylquinoline", acetyl gallate, alpha-carotene, alpha-hydroxybenzyl phosphinic acid, alphaketoglutarate, anoxomer, ascorbic acid and its salts, ascorbyl palmitate, ascorbyl stearate, benzyl isothiocyanate, beta naphthoflavone, beta-apo-carotenoic acid, beta-carotene, butylated hydroxyanisole (BHA), butylated hydroxytoluene (BHT), caffeic acid, canthaxantin, carnosol, carvacrol, catalase, catechins, chlorogenic acid, citric acid and its salts, clove extract, coffee bean extract, di-stearyl thiodipropionate, dilauryl thiodipropionate, dodecyl gallate, edetic acid, ellagic acid, erythorbic acid, esculetin, esculin, ethyl gallate, ethyl maltol, ethylenediaminetetraacetic acid (EDTA), *eucalyptus* extract, eugenol, ferulic acid, flavanones, flavones, flavonoids, flavonoids, flavonols, fraxetin, fumaric acid, gallic acid, gentian extract, gluconic acid, glycine, gum guaiacum, hesperetin, hydroquinone, hydroxycinammic acid, hydroxyglutaric acid, hydroxytyrosol, hydroxyurea, isoflavones, lactic acid and its salts, lecithin, lecithin citrate; R-alpha-lipoic acid, lutein, lycopene, malic acid, maltol, methyl gallate, mono isopropyl citrate, monoglyceride citrate, morin, N-acetylcysteine, N-hydroxysuccinic acid, "N,N'-diphenyl-p-phenylenediamine (DPPD)", natural antioxidants, nordihydroguaiaretic acid (NDGA), octyl gallate, oxalic acid, p-coumaric acid, palmityl citrate, phenothiazine, phosphates, phosphatidylcholine, phosphoric acid, phytic acid, phytylubichromel, pimento extract, polyphosphates, propyl gallate, quercetin, retinyl palmitate, rice bran extract, rosemary extract, rosmarinic acid, sage extract, sesamol, silymarin, sinapic acid, sodium erythorbate, stearyl citrate, succinic acid, superoxide dismutase (SOD), synthetic antioxidants, syringic acid, tartaric acid, taurine, tertiary butyl hydroquinone (TBHO), thiodipropionic acid, thymol, tocopherols, tocotrienols, trans resveratrol, trihydroxy butyrophenone, tryptamine, tyramine, tyrosol, ubiquinone, uric acid, vanillic acid, vitamin K and derivates, wheat germ oil, zeaxanthin).

Further examples include dietary minerals (e.g., ammonium, calcium, fat soluble minerals, gypsum, iron, iodine, magnesium, potassium, aluminum, zinc). In some embodiments, the meat-like food products comprise at least about 0.005%, at least about 0.006%, at least about 0.007%, between about 0.005% and about 0.015%, between about 0.006% and about 0.012%, between about 0.007% and about 0.01%, between about 0.007% and about 0.009%, or between about 0.007% and about 0.008% by weight of iron. In some embodiments, the meat-like food products comprise at least about 0.025%, at least about 0.05%, at least about 0.1%, between about 0.05% and about 0.2%, between about 0.075% and about 0.175%, between about 0.1% and about 0.15%, between about 0.11% and about 0.13%, or between about 0.12% and about 0.13% by weight of iron. Suitable iron sources include but are not limited to non-heme organic and inorganic low molecular weight iron sources such as ferric citrate, ferrous gluconate, ferrous fumarate, ferrous sulfate, ferrous carbonate, ferric chloride (pH<2.5), ferric citrate, ferric EDTA, and ferric chloride (pH>4); and high molecular weight iron sources such as iron carbonyl, iron-dextran (a polysaccharide with small clusters of ferric ions linked by oxygen atoms), and ferritin (a protein-iron complex with a protein cage and a mineral center of thousands of ferric ions linked by oxygen atoms).

Further examples include but are not limited to pH and/or ionic strength adjusting agents.

Further examples include but are not limited to shelf life extending agents (e.g., carbon monoxide, nitrites, sodium metabisulfite, Bombal, vitamin E, rosemary extract, greet tea extract, catechins, antioxidants).

Further examples of other ingredients which may be included in meat-like food products and extended meat products include but are not limited to taste agents, taste enhancers, or taste stabilizers.

Such other ingredients can be native to one or more non-animal sources; produced by one or more modified non-animal sources; produced by one or more non-animal sources or modified non-animal sources under controlled conditions.

Non-animal and Modified Non-animal Sources

The protein, lipid, carbohydrate, or other ingredients of the meat structured protein products, the meat-like food products, and the extended meat products provided herein may be derived from one or more non-animal or modified non-animal sources.

Suitable non-animal sources are naturally occurring plants, algae, fungi, or microbes.

Examples of suitable plants include but are not limited to spermatophytes (spermatophyte), acrogymnospermae, angiosperms (magnoliophyta), ginkgoidae, pinidae, mesangiospermae, cycads, *Ginkgo*, conifers, gnetophytes, *Ginkgo biloba*, cypress, junipers, *thuja*, cedar-wood, pines, *angelica*, caraway, coriander, cumin, fennel, parsley, dill, dandelion, helichrysum, marigold, mugwort, safflower, chamomile, lettuce, wormwood, calendula, citronella, sages, thyme, chia seed, mustard, olive, coffee, *capsicum*, eggplant, paprika, cranberry, kiwi, vegetable plants (e.g., carrot, celery), *tagetes*, tansy, tarragon, sunflower, wintergreen, basil, hyssop, lavender, lemon *verbena*, marjoram, melissa, patchouli, pennyroyal, peppermint, rosemary, sesame, spearmint, primroses, samara, pepper, pimento, potato, sweet potato, tomato, blueberry, night-shades, *petunia*, morning glory, lilac, jasmin, honeysuckle, snapdragon, *psyllium*, wormseed, buckwheat, amaranth, chard, *quinoa*, spinach, rhubarb, jojoba, cypselea, *chlorella*, marula, hazelnut, canola, kale, bok choy, rutabaga, frankincense, myrrh, elemi, hemp, pumpkin, squash, cur-curbit, manioc, *dalbergia*, legume plants (e.g., alfalfa, lentils, beans, clovers, peas, fava coceira, frijole bola roja, frijole negro, *lespedeza*, licorice, lupin, mesquite, carob, soybean, peanut, tamarind, *wisteria, cassia*, chickpea, garbanzo, fenugreek, green pea, yellow pea, snow pea, lima bean, fava bean), geranium, flax, pomegranate, cotton, okra, neem, fig, mulberry, clove, *eucalyptus*, tea tree, niaouli, fruiting plants (e.g, apple, apricot, peach, plum, pear, nectarine), strawberry, blackberry, raspberry, cherry, prune, rose, tangerine, citrus (e.g., grapefruit, lemon, lime, orange, bitter orange, mandarin), mango, citrus bergamot, buchu, grape, broccoli, brussels sprout, camelina, cauliflower, rape, rapeseed (canola), turnip, cabbage, cucumber, watermelon, honeydew melon, zucchini, birch, walnut, cassava, baobab, allspice, almond, breadfruit, sandalwood, macadamia, taro, tuberose, aloe vera, garlic, onion, shallot, vanilla, *yucca*, vetiver, galangal, barley, corn, *curcuma aromatica*, ginger, lemon grass, oat, palm, pineapple, rice, rye, sorghum, triticale, turmeric, yam, bamboo, barley, cajuput, *canna*, cardamom, maize, oat, wheat, cinnamon, sassafras, *lindera benzoin*, bay laurel, avocado, ylang-ylang, mace, nutmeg, moringa, horsetail, oregano, cilantro, chervil, chive, aggregate fruits, grain plants, herbal plants, leafy vegetables, non-grain legume plants, nut plants, succulent plants, land plants, water plants, delbergia, millets, drupes, schizocarps, flowering plants, non-flowering plants, cultured plants, wild plants, trees, shrubs, flowers, grasses, herbaceous plants, brushes, lianas, cacti, green algae, tropical plants, subtropical plants, temperate plants, and derivatives and crosses thereof.

Examples of suitable algae include but are not limited to viridiplantae, strameno-piles, rhodophyta, chlorophyta, PX, bangiophyceae, florideohpyceae, trebouxiophyceae, phaeophyceae, palmariales, gigartinales, bangiales, gigartinales, *Chlorella, Laminaria japonica, Laminaria saccharina, Laminaria digitata, Macrocystis pyrifera, Alaria marginata, Ascophyllum nodosum, Ecklonia* sp., *Palmaria palmata, Gloiopeltis furcata, Porphyra columbina, Gigartina skottsbergii, Gracilaria lichenoides, Chondrus crispus, Gigartina bursa-pastoris, Rhodophyta, Porphyridium cruentum (P. purpureum), Porphyridium aerugineum, Rhodella maculate, Rhodella reticulata, Rhodella violacea, Palmaria palmata, Rhodymenia palmata, Porphyra tenera, Porphyra columbina, Gigartina skotsbergii, Chondrus crispus, Gracilaria lichenoides, Gracilaria bursa-pastoris* and derivatives and crosses thereof.

Examples of suitable fungi include but are not limited to *Candida etchellsii, Candida guilliermondii, Candida humilis, Candida utilis, Candida versatilis, Debaryomyces hansenii, Kluyveromyces lactis, Kluyveromyces marxianus, Kluyveromyces thermotolerans, Pichia pastoris, Rhodotorula* sp., *Saccharomyces bayanus, Saccharomyces beticus, Saccharomyces cerevisiae, Saccharomyces chevalieri, Saccharomyces diastaticus, Saccharomyces ellipsoideus, Saccharomyces exiguus, Saccharomyces florentinus, Saccharomyces pastorianus, Saccharomyces pombe, Saccharomyces sake, Saccharomyces uvarum, Sporidiobolus johnsonii, Sporidiobolus salmonicolor, Sporobolomyces roseus, Xanthophyllomyces dendrorhous, Yarrowia lipolytica, Zygosaccharomyces rouxii*, and derivatives and crosses thereof.

Examples of suitable microbes include but are not limited to firmicutes, cyanobacteria (blue-green algae), bacilli, oscillatoriophcideae, bacillales, lactobacillales, oscillatoriales, bacillaceae, lactobacillaceae, *arthrospira, Bacillus coagulans, Lactobacillus acidophilus, Lactobacillus reuteri, Spirulina, Arthrospira platensis, Arthrospira maxima*, and derivatives and crosses thereof.

Natural non-animal sources may be obtained from a variety of sources including but not limited to nature (e.g., lakes, oceans, soils, rocks, gardens, forests, plants, animals), brewery stores, and commercial cell banks (e.g., ATCC, collaborative sources).

Modified non-animal sources may be obtained from a variety of sources including but not limited to brewery stores and commercial cell banks (e.g., ATCC, collaborative sources), or can be generated from non-animal sources by methods known in the art, including selection, mutation, or gene manipulation. Selection generally involves continuous multiplication and steady increase in dilution rates under selective pressure. Mutation generally involves selection after exposure to mutagenic agents. Gene manipulation generally involves genetic engineering (e.g., gene splicing, insertion of deletions or modifications by homologous recombination) of target genes. A modified non-animal source may produce a non-native protein, carbohydrate, lipid, or other compound, or produce a non-native amount of a native protein, carbohydrate, lipid, or other compound. In some embodiments, the modified non-animal source expresses higher or lower levels of a native protein or metabolic pathway compound. In other such embodiments, the modified non-animal source expresses one or more novel recombinant proteins, RNAs, or metabolic pathway components derived from another plant, algae, microbe, or fungus. In other embodiments, the modified non-animal source has an increased nutraceutical content compared to its native state. In yet other embodiments, the modified non-animal source has more favorable growth and production characteristics compared to its native state. In some such embodiments, the modified non-animal source has an increased specific growth rate compared to its native state. In other such embodiments, the modified non-animal source can utilize a different carbon source than its native state.

Other Uses

The agent release systems provided herein have a wide variety of other uses. Examples of such other uses include but are not limited to delivering nutritional supplements (e.g., omega-3 fatty acids) and pharmaceutical formulations. They may also be used in food products for human or animal consumption other than the meat-like food products described above, where they may improve or enhance certain properties. Examples of such other food products include but are not limited to dairy products and dairy product analogs, pasta and pasta analogs, and beverages. Such other food products may comprise any amount of the agent release systems provided herein, but will typically comprise an amount determined to supply a desired effect.

Packaging and Labeling

The meat-like food products provided herein may be packaged to keep them clean, fresh, contained, or safe; to facilitate inventory control, handling, distribution, stacking, display, sale, opening, reclosing, use, or reuse; or to enable portion control. Suitable packing includes but is not limited to trays, trays with overwrap, bags, cups, films, jars, tubs, bottles, pads, bowls, platters, boxes, cans, cartons, pallets, wrappers, containers, bags-in-boxes, tubes, capsules, vacuum packaging, pouches, and the like, and combinations thereof. The packaging can be made of plastic, paper, metal, glass, paperboard, polypropylene, PET, styrofoam, aluminum, or combinations thereof. To maximize shelf-life, the meat-like food products can be stored in vacuum packing, modified atmosphere packing (low oxygen with carbon monoxide), oxygen, absorb-ers, and/or High Pressure Pasteurization (HPP). In some embodiments, the packaging has UV barriers that reduce penetrance by UV irradiation (e.g., to reduce degradation of coloring agents). The meat-like products can be packaged with packets or shakers such that certain other ingredients can be sprinkled or spread on top of the meat-like food product before, during, or after cooking The packaging may carry one or more labels that communicate information to the consumer or that support the marketing of the meat-like food products. In some embodiments, the packaging carries a label required by governmental regulation. In some such embodiments, the label is required by regulation of the U.S. Food and Drug Administration (FDA) or the U.S. Department of Agriculture. In other such embodiments, the label is required by regulation of the European Food Safety Authority. In some embodiments, the governmental regulation is Title 21 of the FDA section of the code of federal regulations. In some embodiments, the label indicates that the enclosed meat-like food product is free of genetically modified organisms. In some embodiments, the label indicates that the enclosed meat-like food product is free of gluten. In some embodiments, the label indicates that the enclosed meat-like food product is Kosher. In some embodiments, the label indicates that the enclosed meat-like food product is free of cholesterol. In some embodiments, the label indicates that the enclosed meat-like food product is vegan. In some embodiments, the label indicates that the enclosed meat-like food product is free of an allergen. In some embodiments, the label indicates that the enclosed meat-like food product is free of soy. In some embodiments, the label indicates that the enclosed meat-like food product is free of nuts.

Marketing and Sale

The meat-like food products provided herein can be sold in any suitable venue. Such venues include but are not limited to internet, grocery stores, supermarkets, discounters, mass marketers (e.g., Target, Wal-Mart), membership warehouses (e.g., Costco, Sam's Club), military outlets, drug stores, restaurants, fast food restaurants, delis, markets, butcher shops, health food stores, organic food stores, private caterers, commercial caterers, food trucks, restaurant chains, kiosks, street carts, street vendors, cafeterias (e.g., cafeterias of schools, hospitals, shelters, long-term care facilities), and the like.

All references, including publications, patent applications, and patents, cited herein are hereby incorporated by reference to the same extent as if each reference were individually and specifically indicated to be incorporated by reference and/or were set forth in its entirety herein.

EXAMPLES

The following examples are included to demonstrate preferred embodiments of the invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the spirit and scope of the invention, therefore all matter set forth or shown in the accompanying drawings is to be interpreted as illustrative and not in a limiting sense.

Example 1—Production and Texture Analysis of High Edible Fiber Components

Comprising *Psyllium* Husk

A slurry of 20% by weight of *Psyllium* husk powder (5 g; ground finely in a spice grinder) with 80% by weight of water (20 g) was prepared. The slurry was spread on a hot electric griddle at 350° F. to about 1-3 mm thickness, and baked for 3 min (1.5 min on each side) with constant pressure to produce a thin sheet with minimal bubbling. The baked product was cooled for 10 minutes, and then cut into 50 mm long strips with widths of either 2 mm or 10 mm, and thicknesses ranging from 1.5 mm to 2.5 mm (n=6 for 6 mm width; n=7 for 10 mm width).

Comprising Calcium Alginate and Rice Flour

A slurry of 5% by weight of sodium alginate (5 g) and 15% by weight of glutinous rice flour (15 g) in 80% by weight of water (80 g). An about 3 mm to about 5 mm thin layer of the slurry was spread onto a clean baking sheet, and a 5% CaCl2 solution (15 g CaCl2 in 300 mL water) was used to skin the surface of the sodium alginate and rice flour slurry. The surface was pressed and kneaded to squeeze out any unexposed alginate slurry and to remove air bubbles, until the entire mass was thoroughly exposed to the CaCl2 solution. The hardened calcium alginate was rinsed with water, squeezed to remove any internal water, blotted dry, and cut into 50 mm long strips with widths of either 6 mm or 10 mm and thicknesses ranging from 1 mm to 5 mm (n=10 for 6 mm width; n=12 for 10 mm width).

WBS Strength Analysis

Figure 2:
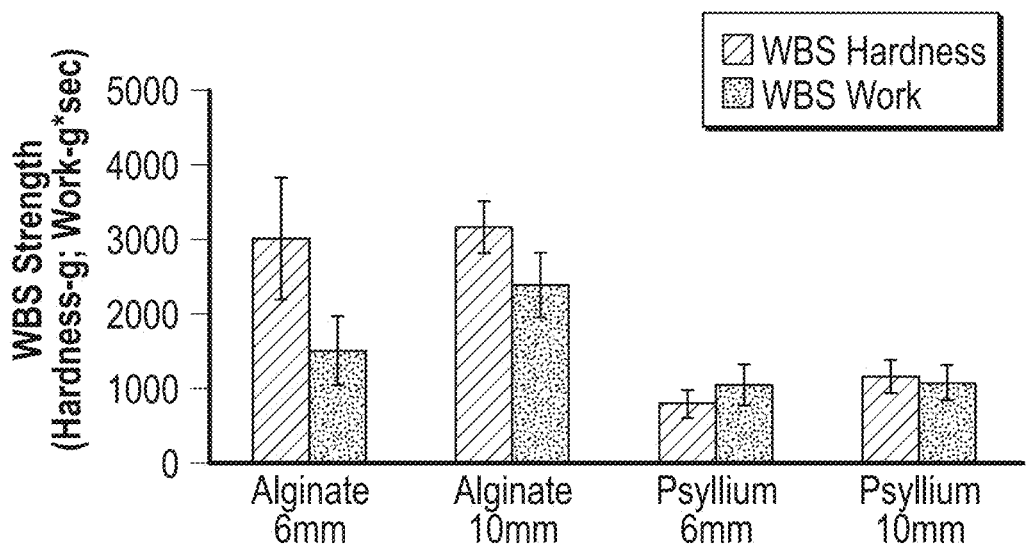
FIG. 2 shows bar charts of the Warner-Bratzler Shear (WBS) strengths (hardness and work) of exemplified high edible fiber components provided herein.

Samples were analyzed with a WBS blade (about 1 mm) on a TA.XT Express Texture analyzer (Stable Microsystems, UK) with a pre-test speed of 5 mm/sec, test speed of 5 mm/sec, post-test speed of 10 mm/sec, travel distance of 15 mm, and trigger load of 10 g. WBS Hardness (g Load) and Work (g Load*sec) were measured, and averages and standard deviations were recorded for each sample type, the results of which are provided in FIG. 2.

Example 2—Production and Texture Analysis of Meat-Structured Protein Products

EB31-1

A dry mix of composition 98.5% by weight pea protein isolate (F85M, Roquette, Inc., Lestrem, France), 1% by weight of potassium bicarbonate (Flow K; Church & Dwight Co., Inc., Ewing, NJ), and 0.5% by weight of calcium hydroxide (Mississippi Lime, St. Louis, MO) was blended for 5 minutes in a ribbon blender. The dry ingredient blend was transferred to the hopper of a gravimetric feeder that metered the blend through the feed port of a twin screw extruder (MPF 50/25 Co-rotating Twin-Screw Extruder (APV Baker, Grand Rapids, MI) at a rate of 8.2 kg/h. At the same time, a liquid mix (97% water, 3% sorbitol) was channeled from a water tank through an in-line water heater that kept the water temperature fixed at 21.1° C., and was pumped via a gear pump through the liquid feed port of the twin screw extruder (located 100 mm downstream of the dry mix feed port) at 7.6 kg/h.

Extrusion parameters are shown in Table 1.

TABLE 1

| | Extrusion Parameters |
|---|---|
| Screw Profile Assembly | Zones 1-3: conveying screw elements; Zones 4, 5: mixing screw elements; Zones 6-8: medium shear screws; Zone 9: final mixing screws. |
| Extruder Barrel | 9 zones, each individually controlled via an electric heater cartridge (4 × 900 W per zone) and a cooling water jacket (supplied with chilled water, 20-30° C.); overall barrel length = 1,250 mm; length of each zone = 125 mm. |
| Barrel Heater Set Points | Zones 1-5: 32-50° C.; Zones 6-9: 115-150° C. |
| Extrusion Screws | Co-rotating in counter-clockwise direction at 170 revolutions per minute. |
| Barrel Pressure | 123 psi |
| Product Temperature | 130-140° C. |

Meat structured protein product EB31-1 emerged from the extruder as irregular, bumpy strands with a diameter ranging between about 2 mm and about 5 mm. The composition of EB31-1 was about 40.9% by weight of protein, about 3% by weight of total carbohydrate (about 0.51% by weight of edible fiber), about 3.07% by weight of total lipid, about 2.6% by weight of ash, and about 50.5% by weight of water.

EB31-27

A dry mix of composition 98.5% by weight pea protein isolate (F85M, Roquette, Inc., Lestrem, France), 1% by weight of potassium bicarbonate (Flow K; Church & Dwight Co., Inc., Ewing, NJ), and 0.5% by weight of calcium hydroxide (Mississippi Lime, St. Louis, MO) was blended for 5 minutes in a ribbon blender. The dry ingredient blend was transferred to the hopper of a gravimetric feeder that metered the blend through the feed port of a twin screw extruder (MPF 50/25 Co-rotating Twin-Screw Extruder (APV Baker, Grand Rapids, MI) at a rate of 9.8 kg/h. At the same time, a first liquid mix (100% water) and a second liquid mix (30% water, 70% sorbitol) were pumped through 2 liquid feed ports at rates of 9.3 kg/h and 1.2 kg/hr, respectively.

Extrusion parameters are shown in Table 2.

TABLE 2

Extrusion Parameters

| | |
|---|---|
| Screw Profile Assembly | Zone 1: conveying screw elements; Zones 2, 3: mixing and low shear elements; Zones 4-5: compressing and medium shear elements; Zone 6: mixing elements; Zones 7-8: medium shear elements; Zone 9: Compressing elements. |
| Extruder Barrel | 9 zones, each individually controlled via an electric heater cartridge (4 × 900 W per zone) and a cooling water jacket (supplied with building water, 20-30° C.); overall barrel length = 1,250 mm; length of each zone = 125 mm. |
| Barrel Heater Set Points | Zones 1-5: 32-50° C.; Zones 6-9: 110-170° C. |
| Extrusion Screws | Co-rotating in counter-clockwise direction at 180 revolutions per minute. |
| Barrel Pressure | 123 psi |
| Product Temperature | 140-165° C. |

Meat structured protein product EB31-27 emerged from the extruder as irregular, bumpy strands with a diameter ranging between about 2 mm and about 5 mm. The composition of EB31-27 was about 35% by weight of protein, about 2% by weight of total carbohydrate (about 0.4% by weight of edible fiber), about 2.8% by weight of total lipid, about 2.2% by weight of ash, and about 58% by weight of water.

Density and Fold-Volume-Change-after-Hydration Analysis

Samples of 10 g of either coarsely (diameter of more than ⅛" and less than ¼") or finely (diameter of less than ⅛") chopped meat structured protein products were placed in graduated 100 mL cylinders, and the volume occupied by dry products were measured before 100 mL of water were added to the graduated cylinders. After 30 minutes the volume occupied by the hydrated meat structured protein products were measured. Density in g/cm^3 was calculated as follows: (mass of extrudate)/(volume of dry extrudate). Fold-volume-change-after-hydration was calculated as follows: (volume of hydrated extrudate−volume of dry extrudate)/(volume of dry extrudate). Results are shown in Table 3.

TABLE 3

Density, Fold-Volume-Change-After-Hydration, and Color of Meat-Structured Protein Products

| | |
|---|---|
| Density (g/cm^3) | 0.3-0.45 |
| Fold-volume-change-after- | 2.15-2.6 |
| Color | $L^*$ 45.9 +/− 0.3, $a^*$ 45.9 +/− 0.4, $b^*$ 45.9 +/− 0.5 |

Colorimetric Analysis

Samples of 30 g finely chopped meat structured protein products were placed on plastic or glass petri dishes. The samples were manually shaken for a couple of seconds before their colors were analyzed for reflectance in the 400 nm to 700 nm spectral range using a ColorFlex EZ benchtop spectrophotometer (Hunter Associates Laboratory, Inc., 11491 Sunset Hills Road, Reston, VA). The spectrophotometer was standardized with black and white glass plate standards provided by the manufacturer, and reflectance spectra for samples were converted to $L^*a^*b^*$ color values and analyzed with respect to the CIE $L^*a^*b^*$ color space. Each sample was visualized 3 times (with shaking prior to each analysis); the mean value of 3 readings for each sample was recorded as the final colorimetric value for each sample (Table 3; the formula for calculating deltaE [CIEDE2000] from the $L^*a^*b^*$ values is well known in the art).

Example 3—Production and Analysis of Gels Comprising Emulsions

Gels comprising emulsions having compositions as indicated in Table 4 were produced by mixing water and agar and heating the mixture to boiling. Pea protein isolate (PPI) emulsifier F85M (Roquette, Inc., Lestrem, France), and optionally a flavoring agent, were added, before canola oil, coconut oil, and palm oil were slowly added. The gel-stabilized emulsions were finally chilled to harden.

TABLE 4

Composition (% by weight) of Gels Comprising Emulsions

| Sample | Water | Agar | PPI | Canola Oil | Coconut Oil | Palm Oil | Flavoring Agent | Total |
|---|---|---|---|---|---|---|---|---|
| 81-1 | 55.7 | 0.56 | 1.5 | 42.2 | 0 | 0 | 0 | 99.99 |
| 81-2 | 56.27 | 0.5 | 1.5 | 42.2 | 0 | 0 | 0 | 100.5 |
| 80-5 | 55.97 | 0.5 | 1.5 | 38.2 | 3.8 | 0 | 0 | 100 |
| 80-1 | 55.47 | 1 | 1.5 | 38.2 | 3.8 | 0 | 0 | 100 |
| 80-1.5 | 54.97 | 1.5 | 1.5 | 38.2 | 3.8 | 0 | 0 | 100 |
| 79-5 | 54.6 | 0.55 | 1.7 | 41.1 | 2.1 | 0 | 0 | 100 |
| 79-10 | 54.5 | 0.55 | 1.6 | 39.4 | 4 | 0 | 0 | 100.1 |
| 79-15 | 54.6 | 0.55 | 1.6 | 37.6 | 5.6 | 0 | 0 | 99.99 |
| 1a | 38.4 | 1.5 | 2.6 | 57.6 | 0 | 0 | 0 | 100.1 |
| 1b | 38.4 | 1.5 | 2.6 | 43.2 | 14.4 | 0 | 0 | 100.1 |
| 1b-1 | 37.1 | 1.4 | 2.4 | 42.6 | 12.4 | 0 | 4.9 (agent #1) | 100 |
| 1b-2 | 37.1 | 1.4 | 2.5 | 43.3 | 12.4 | 0 | 3.3 (agent #2) | 100 |
| 1c | 38.4 | 1.5 | 2.6 | 28.8 | 28.8 | 0 | 0 | 100.1 |
| 1d | 38.4 | 1.5 | 2.6 | 14.4 | 43.2 | 0 | 0 | 100.1 |
| 1e | 38.4 | 1.5 | 2.6 | 0 | 57.6 | 0 | 0 | 100.1 |
| 2a | 38.4 | 1.5 | 2.6 | 57.6 | 0 | 0 | 0 | 100.1 |
| 2b | 38.4 | 1.5 | 2.6 | 43.2 | 0 | 14.4 | 0 | 100.1 |
| 2c | 38.4 | 1.5 | 2.6 | 28.8 | 0 | 28.8 | 0 | 100.1 |
| 2d | 38.4 | 1.5 | 2.6 | 14.4 | 0 | 43.2 | 0 | 100.1 |
| 2e | 38.4 | 1.5 | 2.6 | 0 | 0 | 57.6 | 0 | 100.1 |
| 3a | 38.8 | 0.5 | 2.6 | 58.1 | 0 | 0 | 0 | 100 |

TABLE 4-continued

Composition (% by weight) of Gels Comprising Emulsions

| Sample | Water | Agar | PPI | Canola Oil | Coconut Oil | Palm Oil | Flavoring Agent | Total |
|---|---|---|---|---|---|---|---|---|
| 3b | 38.4 | 1.5 | 2.6 | 57.6 | 0 | 0 | 0 | 100.1 |
| 3c | 37.8 | 2.9 | 2.5 | 56.7 | 0 | 0 | 0 | 99.9 |
| 3d | 38.8 | 0.5 | 2.6 | 29.1 | 29.1 | 0 | 0 | 100.1 |
| 3e | 38.4 | 1.5 | 2.6 | 28.8 | 28.8 | 0 | 0 | 100.1 |
| 3f | 37.8 | 2.9 | 2.5 | 28.4 | 28.4 | 0 | 0 | 100 |
| 4a | 39 | 1.5 | 0.9 | 58.6 | 0 | 0 | 0 | 100 |
| 4b | 38.4 | 1.5 | 2.6 | 57.6 | 0 | 0 | 0 | 100.1 |
| 4c | 37.9 | 1.5 | 3.8 | 56.8 | 0 | 0 | 0 | 100 |
| 4d | 39 | 1.5 | 0.9 | 29.3 | 29.3 | 0 | 0 | 100 |
| 4e | 38.4 | 1.5 | 2.6 | 28.8 | 28.8 | 0 | 0 | 100.1 |
| 4f | 37.9 | 1.5 | 3.8 | 28.4 | 28.4 | 0 | 0 | 100 |

Melting profiles were determined by cutting approximately 1 g samples using a small convex square cookie cutter and quickly weighing the samples. Each sample was then placed in a pre-heated aluminum weighing tray on a griddle set to 350° F., and the initial melt time (Ti=time for all edges against the tray to have oil release) and final melt time (Tf=time for all discernible edges to disappear) were recorded.

Mass loss was quantified by weighing samples before and after letting them rest at ambient temperature for 30 minutes.

Hardness was determined by TPA. The gel-stabilized emulsions were poured into a plastic mold 15 mm thickness and 90 mm diameter, and refrigerated at 4° C. for at least 24 hours. TPA was performed either immediately after removal from the fridge, or 20 min or 60 min later, at which later point the samples had equilibrated their temperature to ambient temperature. TPA was done using a TA.XT Express Texture Analyzer (Texture Technologies Corp., Hamilton, MA) and a polymethylmethacrylate cylinder probe of 25 mm diameter (Texture Technologies Corp., Hamilton, MA). The disc probe was used to compress each sample using a trigger force of 30 g to 30% compression in a 2-cycle analysis at a test speed of 5 mm/sec with 5 sec intervals between compressions. The deformation curve of the sample was obtained, and from the deformation curve was derived Force1 according to the manufacturer's protocol. Force1 expresses the Hardness of a sample (i.e., peak force of first compression of product) as described in Food Texture and Viscosity Second Edition: Concept and Measurement, Dr. Malcolm C. Bourne, April 2002, Academic Press, New York. Averages were deduced from 3 independent samples of each product.

As shown in Table 5, initial melt time, final melt time, and mass loss were influenced by the fat, agar, and emulsifier contents of the emulsion.

TABLE 5

Melt Times (sec) and Mass Loss (%) of Gels Comprising Emulsions

| Sample | Ti | Ti Stdev | Tf | Tf Stdev | Mass Loss | Mass Loss Stdev |
|---|---|---|---|---|---|---|
| 81-1 | 5 | 1 | 68 | 8 | 6.9 | 0.016 |
| 81-2 | 6 | 1 | 58 | 4 | 6.7 | 0.01 |
| 80-.5 | 3 | 1 | 66 | 3 | 10.3 | 0.013 |
| 80-1 | 8 | 1 | 99 | 17 | 4.2 | 0.004 |
| 80-1.5 | 14 | 3 | 146 | 33 | 2.4 | 0.003 |
| 79-5 | 5 | 1 | 46 | 12 | 5.3 | 0.003 |
| 79-10 | 6 | 2 | 68 | 12 | 5.7 | 0.007 |
| 79-15 | 7 | 2 | 66 | 7 | 4.8 | 0.006 |
| 1a | 24.00 | 1 | 222 | 11.2 | | |
| 1b | 3.67 | 1.2 | 46 | 10.7 | | |
| 1c | 3.67 | 0.6 | 62 | 3.6 | | |
| 1d | 4.00 | 0.0 | 62 | 9.1 | | |
| 1e | 3.00 | 0.0 | 55 | 8.7 | | |
| 2a | 41.67 | 14.6 | 379 | 92.6 | | |
| 2b | 5.67 | 0.6 | 61 | 10.0 | | |
| 2c | 3.33 | 0.6 | 54 | 2.5 | | |
| 2d | 2.00 | 0.0 | 44 | 5.0 | | |
| 2e | 3.00 | 0.0 | 49 | 18.1 | | |
| 3a | 31 | 2 | 424 | 34 | | |
| 3b | 14 | 3 | 127 | 8 | | |
| 3c | 14 | 4 | 92 | 24 | | |
| 3d | 6 | 1 | 69 | 1 | | |
| 3e | 4 | 1 | 57 | 16 | | |
| 3f | 9 | 2 | 56 | 14 | | |
| 4a | 11 | 3 | 76 | 4 | | |
| 4b | 9 | 1 | 117 | 18 | 4 | 0.012 |
| 4c | 21 | 9 | 179 | 50 | 4 | 0.003 |
| 4d | 4 | 1 | 77 | 28 | | |
| 4e | 5 | 1 | 75 | 20 | | |
| 4f | 7 | 1 | 77 | 13 | | |

The effect of increasing agar content was dependent on the saturated fat content (i.e., no effect at high saturated fat content [samples 3d-3f], possibly increased Ti and Tf at low saturated fat content [series 80], and decreasing Ti and Tf at no saturated fat content [samples 3a-3c]). Slightly increasing saturated fat content by itself had no clear effect on Ti and Tf or mass loss (series 79). Increasing agar content decreased mass loss (series 80). Increasing emulsifier increased Ti and Tf when no saturated fat was present but had no effect when saturated fat was present.

As shown in Table 5, at the highest unsaturated fat content, the gels comprising emulsions had the highest initial melt time (Ti) and final melt time (Tf). As the content of unsaturated fat decreased and the content of saturated fat increased, Ti and Tf first dropped, but then remained constant.

As also shown in Table 6, higher saturated fat content produced harder gels at 4° C. (straight out of fridge), but these softened more with time compared to the lower saturated fat gels, which did not decrease in hardness significantly after 60 minutes at room temperature.

TABLE 6

Hardness (gram) of Gels Comprising Emulsions

| Sample | 0 min | 0 min Stdev | 15 min | 15 min Stdev | 60 min | 60 min Stdev |
|---|---|---|---|---|---|---|
| 1a | 668.6 | 206.6 | 589.7 | 170.3 | 651.4 | 192.0 |
| 1b | 876.640 | 112.3 | 146.679 | 24.4 | 96.163 | 15.3 |
| 1c | 7996.225 | 99.6 | 2510.785 | 237.3 | 312.986 | 88.2 |
| 1d | 10719.069 | 2527.1 | 5202.015 | 932.1 | 386.533 | 102.0 |
| 1e | 13234.358 | 0.190 | 13234.692 | 0.086 | 3369.762 | 2087.880 |
| 2a | 1003.7 | 116.2 | 927.4 | 215.5 | 773.9 | 106.7 |
| 2b | 760.740 | 126.7 | 279.492 | 87.9 | 208.395 | 62.1 |
| 2c | 1902.810 | 591.1 | 531.378 | 291.9 | 233.070 | 42.4 |
| 2d | 11015.446 | 3842.8 | 1392.311 | 683.7 | 67.567 | 16.0 |
| 2e | 13234.398 | 0.225 | 7481.308 | 5910.774 | 1046.878 | 27.366 |
| 1b | 876.640 | 112.3 | 146.679 | 24.4 | 96.163 | 15.3 |
| 1b-1 | 3580.569 | 479.9 | 1001.674 | 58.9 | 308.388 | 17.1 |
| 1b-2 | 3557.036 | 479.2 | 1111.629 | 80.4 | 349.966 | 34.8 |

It appears that the presence of saturated fat destabilizes the emulsion, leading to softening of the gels with increasing temperature. This is reflected in the melting behavior as well since the addition of saturated fat leads to faster melting.

As shown in Table 6, the type of taste agent comprised affected the hardness of the gels comprising emulsions.

Example 4—Yeast Cell Wall Material

Hydrated Yeast Cell Wall Material

Inactive yeast cell wall material (3.0 g; SIY Cell, Lallemand, Quebec, Canada) was added to deionized water (24.5 mL; deionized by a commercial reverse osmosis water purification system; Culligan, Rosemont, IL) in a Falcon tube. After 2 hours of mixing on an orbital shaker, the yeast cell wall material was pelleted by centrifugation at 3,000 rpm for 10 minutes at 20° C. The supernatant was decanted from the pellet to yield hydrated yeast cell wall material. The final mass of the yeast cell wall material was obtained to determine that each gram of yeast cell wall material had taken up 2.80 g of water.

Bound Dye

Inactive yeast cell wall material (3.0 g; SIY Cell, Lallemand, Quebec, Canada) was combined with a 2% (wt./wt.) Vegetone® Vivid Red 57.01 natural red dye (Kalsec Inc., Kalamazoo, MI) solution in deionized water (24.5 mL; deionized by a commercial reverse osmosis water purification system from Culligan, Rosemont, IL) in a Falcon tube. After 2 hours of mixing on an orbital shaker, the yeast cell wall material was pelleted by centrifugation at 3,000 rpm for 10 minutes at 20° C. The supernatant was decanted from the pellet to yield yeast cell wall material comprising bound red dye. The final mass of the yeast cell wall material was obtained to determine that each gram of yeast cell wall material had taken up 2.75 g of the natural red dye solution. Visual inspection showed that the yeast cell wall material with bound red dye was a red color.

Bound Browning Agent

Inactive yeast cell wall material (3.0 g; SIY Cell, Lallemand, Quebec, Canada) was combined with RA03036 natural brown coloring agent solution (24.5 mL; Red Arrow, Manitowoc, WI) in a Falcon tube. After 2 hours of mixing on an orbital shaker, the yeast cell wall material was pelleted by centrifugation at 3,000 rpm for 10 minutes at 20° C. The supernatant was decanted from the pellet to yield yeast cell wall material comprising bound brown coloring agent RA03036. The final mass of the yeast cell wall material was obtained to determine that each gram of yeast cell wall material had taken up 2.79 g of the brown coloring agent RA03036 solution. Visual inspection showed that the yeast cell wall material with bound brown coloring agent RA03036 was a pale yellow-brown color.

Bound Carbohydrates

Inactive yeast cell wall material (5.0 g; SIY Cell, Lallemand, Quebec, Canada) was combined with a 6M solution of ribose (Pure Assay Ingredient, Walnut, CA) in water (40 mL) in a Falcon tube. After 2 hours of mixing on an orbital shaker, the yeast cell wall material was pelleted by centrifugation at 3,000 rpm for 10 minutes at 20° C. The supernatant was decanted from the pellet to yield yeast cell wall material comprising bound ribose. The final mass of the yeast cell wall material was obtained to determine that each gram of yeast cell wall material had taken up 3.8 g of the 6M ribose solution.

Example 5—Production of Meat-Like Food Products Comprising Hydrogels, Lipogels, and/or Emulsions as Agent Release Systems The meat structured protein products of Example 2, and others produced in similar manners, were chopped in a professional grade food mixer so that the crumbles could be passed completely through a ¼" sieve. The meat structured protein products were then separated into a coarse and fine portion by passing the crumbles through a ⅛" sieve. One part of the coarse portion was combined with one part of the fine portion to yield the meat structured protein product base. The base was then combined with other ingredients as detailed in Table 7 and mixed at every step.

TABLE 7

Composition (% by weight) of Meat-like Food Products

| Ingredient | FB11.1 | FB12 | FB17 | FB18 | FB19 | FB33 | FB45 | FB100 |
|---|---|---|---|---|---|---|---|---|
| water [h] | 23.83 | 25.05 | 24.8 | 22.77 | 24.75 | 23.95 | 25 | 40 |
| meat structured protein product | 42.9 (EB31-1) | 45.1 (EB31-1) | 44.64 (EB31-1) | 40.98 (EB31-1) | 44.55 (EB31-1) | 43.1 (EB31-1) | 42.94 (EB31-1) | 36 (EB31-27) |

TABLE 7-continued

Composition (% by weight) of Meat-like Food Products

| Ingredient | FB11.1 | FB12 | FB17 | FB18 | FB19 | FB33 | FB45 | FB100 |
|---|---|---|---|---|---|---|---|---|
| dry mix of taste agents | 2 | 2 | 1.99 | 1.82 | 1.98 | 1.9 | 2.29 | 5 [f] |
| dry mix of binding agents (Taro flour [Synthite Industries Ltd., Kerala, India], and/or a starch, and/or methylcellulose [DuPont or Ashland, Covington, KY]) | 1.91 | 2.2 | 2.18 | 2 | 2.18 | 5.17 | 4.01 | n/a [i] |
| high edible fiber component | 4.96 (Psyllium husk) | 0 | 0 | 9.11 (calcium alginate-rice flour) | 0 | 0 | 0 | 0 |
| agent release systems | 23.83 [a,b] | 25.05 [a,b] | 24.8 [a,b] | 22.77 [a,b] | 24.75 [a,b] | 23.94 [a,b] | 23.85 [a,c] | 10 [d,e] |
| lipid soluble taste agents [g] | n/a | n/a | n/a | n/a | n/a | n/a | n/a | 9 [g] |
| Ingredient | FB11.1 | FB12 | FB17 | FB18 | FB19 | FB33 | FB45 | FB100 |
| moisture enhancing/retenting agents | 0 | 0 | 0 | 0 | 0.99 | 0 | 0 | 0 |
| pH adjusting agent/antioxidant (ascorbic acid [NowFoods, Bloomingdale, IL]) | 0 | 0 | 0 | 0 | 0.2 | 0.38 | 0.38 | n/a [j] |
| other ingredient (hydrolyzed pea protein isolate [World Food, Oskaloosa, IA]) | 0 | 0 | 0.99 | 0 | 0 | 0.96 | 0.95 | 0 |

[a] Hydrogel agent release system produced by mixing water and agar, heating the mixture to boiling, adding hydrolyzed pea protein isolate (PPI) P870H (World Food Processing) and a taste agent, mixing on low speed, slowly adding coconut oil and canola oil, and chilling the mixture to harden.
[b] 36.5% water, 1.4% agar, 2.4% PPI, 12.2% coconut oil, 42.6% canola oil, and 4.9% taste agent.
[c] 29.64% water, 0.68% agar, 1.58% hydrolyzed pea protein isolate, 14.03% coconut oil, 47.51% canola oil, and 6.56% taste agent.
[d] Lipogel agent release system produced by wetting bamboo fiber in canola oil; 5-15% fiber, 85-95% oil.
[e] In some cases, an emulsion agent release system was also included. The emulsion was produced by dispersing bamboo fiber in room temperature canola oil using a shear mixer, then slowly adding cold (~8 C.) water during shearing to create a relatively stable oil-in-water emulsion; 5-20% carbohydrate, 0-10% flavor and/or color agents, 5-15% oil, 55-90% water.
[f] 30-60% of flavoring agents, 10-40% of methylcellulose, 10-40% of starch, 1-20% of salt flavor modulator.
[g] 30-60% unsaturated fats, 30-60% saturated fats, 1-10% lipid-soluble flavor agents.
[h] Comprising 0.2-5% coloring agents and/or ascorbic acid and/or pH adjusting agent.
[i] Binding agents in dry mix of taste agents; see [f].
[j] Ascorbic acid in water; see [h].

Cooked meat-like food products were obtained by forming 113 g patties, placing the patties on a griddle pre-heated to 400-450° F., cooking for 3-4 min, flipping over, and cooking for an additional 3 min.

Example 6—Analysis of a Meat-Like Food Product Comprising a Lipogel as an Agent Release System Meat-like food product comprising a lipogel were produced as described in Example 5.

Texture Profile Analysis (TPA) Samples were portioned into 113 g spheres, and formed into patties by compressing the sphere to a thickness of 22 mm. Samples were analyzed either immediately or individually vacuum sealed, frozen at −20° C., warmed to 4° C. in a refrigerator, and analyzed within 3 minutes of removal from the refrigerator. TPA was performed using a TA.XT Express Texture Analyzer (Texture Technologies Corp., Hamilton, MA) and a polymethylmethacrylate cylinder probe of 25 mm di-diameter (Texture Technologies Corp., Hamilton, MA). The cylinder probe was used to compress each sample using a trigger force of 20 g to 40% compression in a 2-cycle analysis at a test speed of 0.5 mm/sec. The deformation curve of the sample was obtained, and from the deformation curve were derived the Force1, Force2, Area FT1:2, Time-diff 1:2, AreaFT1:3, AreaFT2:3, AreaFT4:6, and Time-diff4:5, according to the manufacturer's protocol. From this raw data, the mechanical characteristics were calculated as follows:

Springiness=(Time-diff4:5/Time-diff1:2);

Cohesiveness=(AreaFT4:6/AreaFT1:3);

Hardness=Force1;

Gumminess=(Hardness×Cohesiveness);

Chewiness=(Springiness×Gumminess); and

Resilience=(Area FT2:3/Area FT1:2);

as described in Food Texture and Viscosity Second Edition: Concept and Measurement, Dr. Malcolm C. Bourne, April 2002, Academic Press, New York.

Average measurements were obtained from the analysis of 3 to 5 independent samples, the results of which are shown in Table 8.

TABLE 8

Average TPA Results for a Meat-like Food Product

| Hardness | Resilence | Cohesion | Springiness | Gumminess | Chewiness |
|---|---|---|---|---|---|
| 3181 +/− 112 | 4.7 +/− 0.2 | 0.22 +/− 0.03 | 31.4 +/− 1.6 | 698 +/− 75 | 218 +/− 15 |

Colorimetric Analysis

Samples were analyzed as described in Example 2. Each sample was visualized 3 times by rotating the visualization stage on the spectrophotometer >90 degrees; the mean value of 3 readings for each sample was recorded as the final colorimetric value for each sample. For cooked products, color readings were taken after 6 min or 10 min cooking. As shown in Table 9, color values changed gradually as a result of cooking (decreasing L*, a*, and b* values).

TABLE 9

L*a*b* Color Values for Meat-like Food Products and Ground Beef

| Ingredient | Cooking Status | L* | a* | b* |
|---|---|---|---|---|
| FB12 | Uncooked | 39.02 | 18.3 | 20.68 |
| | Cooked (6 min) | 28.36 | 14.6 | 18.69 |
| | Cooked (10 min) | 27.73 | 12.25 | 18.34 |
| FB19 | Uncooked | 40.7 | 17.34 | 16.82 |
| | Cooked (6 min) | 32.21 | 14.74 | 22.17 |
| | Cooked (10 min) | 26.46 | 12.74 | 15.22 |
| FB45 | Uncooked | 45.03 | 18.71 | 14.89 |
| | Cooked (6 min) | 38.12 | 14.09 | 20.78 |
| FBx | Uncooked | 40.8[a] | 21.81[a] | 16.58[a] |
| Ground Beef 1 | Uncooked | 38.43 | 21.34 | 20.74 |
| | Cooked (6 min) | 44.42 | 7.98 | 18.06 |
| | Cooked (10 min) | 34.79 | 10.53 | 18.95 |
| Ground Beef 2 | Uncooked | 49.04 | 21.77 | 22.81 |
| | Cooked (6 min) | 37.22 | 8.58 | 16.15 |
| | Cooked (10 min) | 28.95 | 9.4 | 12.4 |

Figure 3A:
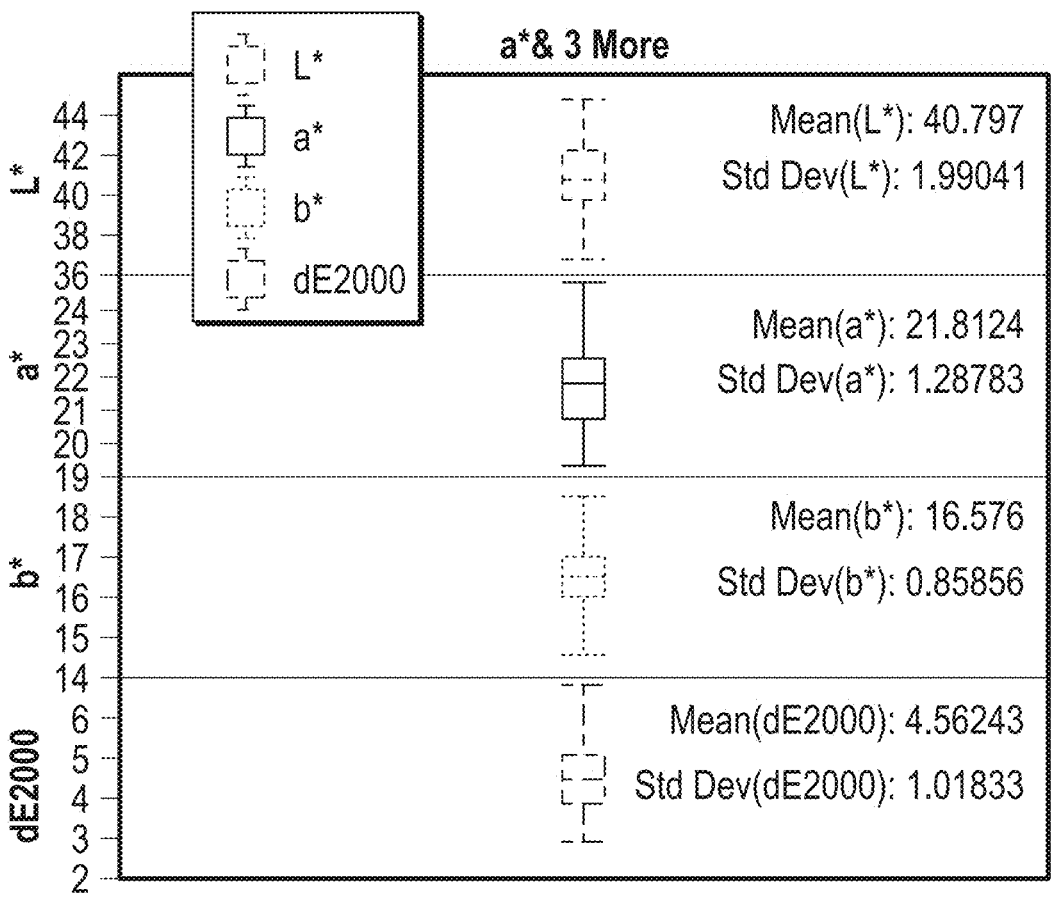
FIG. 3A shows L*a*b* color values for uncooked FBx meat-like food product, in accordance with a representative embodiment of the present invention.

[a]See FIG. 3A

Figure 3B:
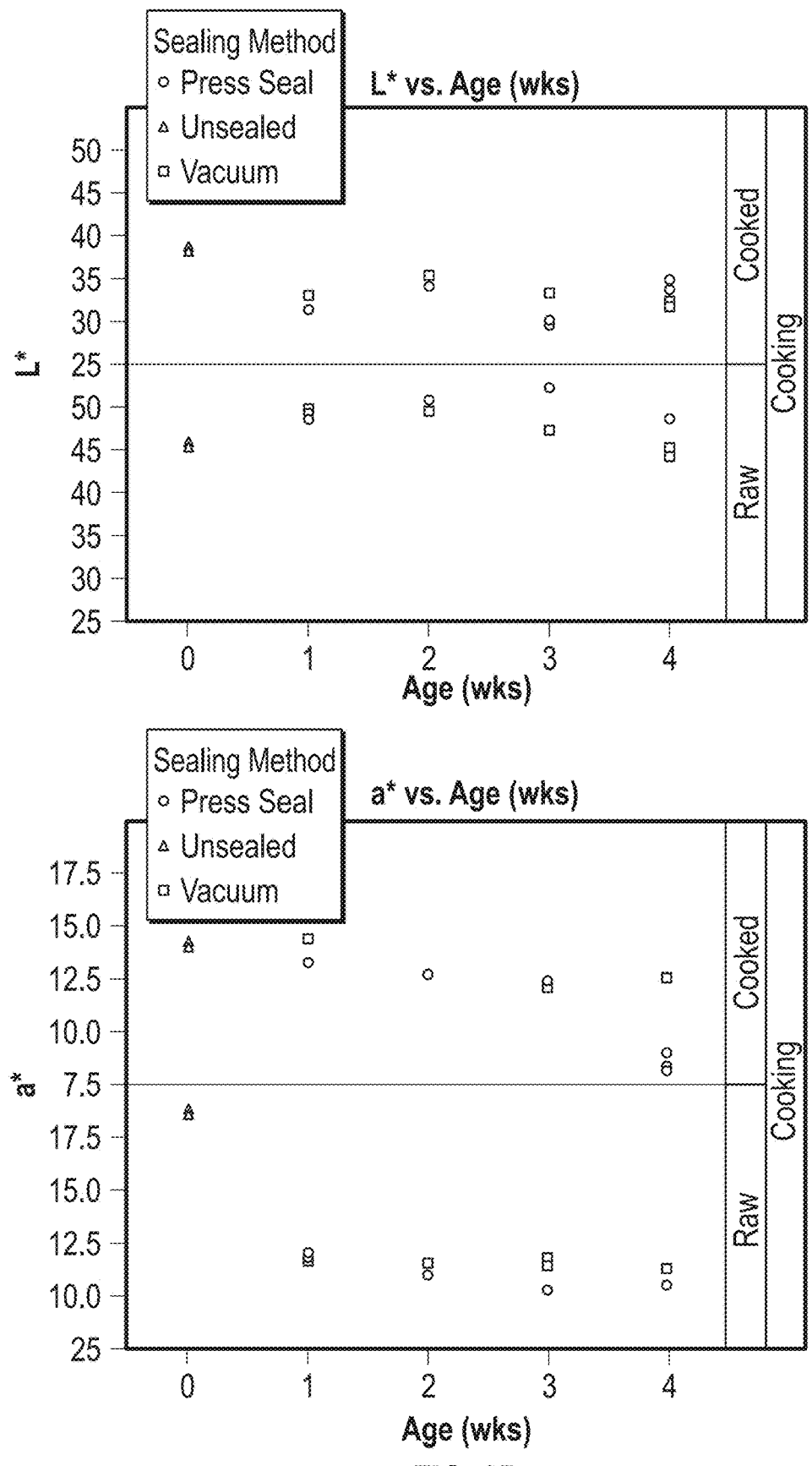
FIG. 3B shows scatter plots of L*a*b* parameters of exemplified meat-like food products stored for various time periods at 4 C, in accordance with a representative embodiment of the present invention.
Figure 3B:
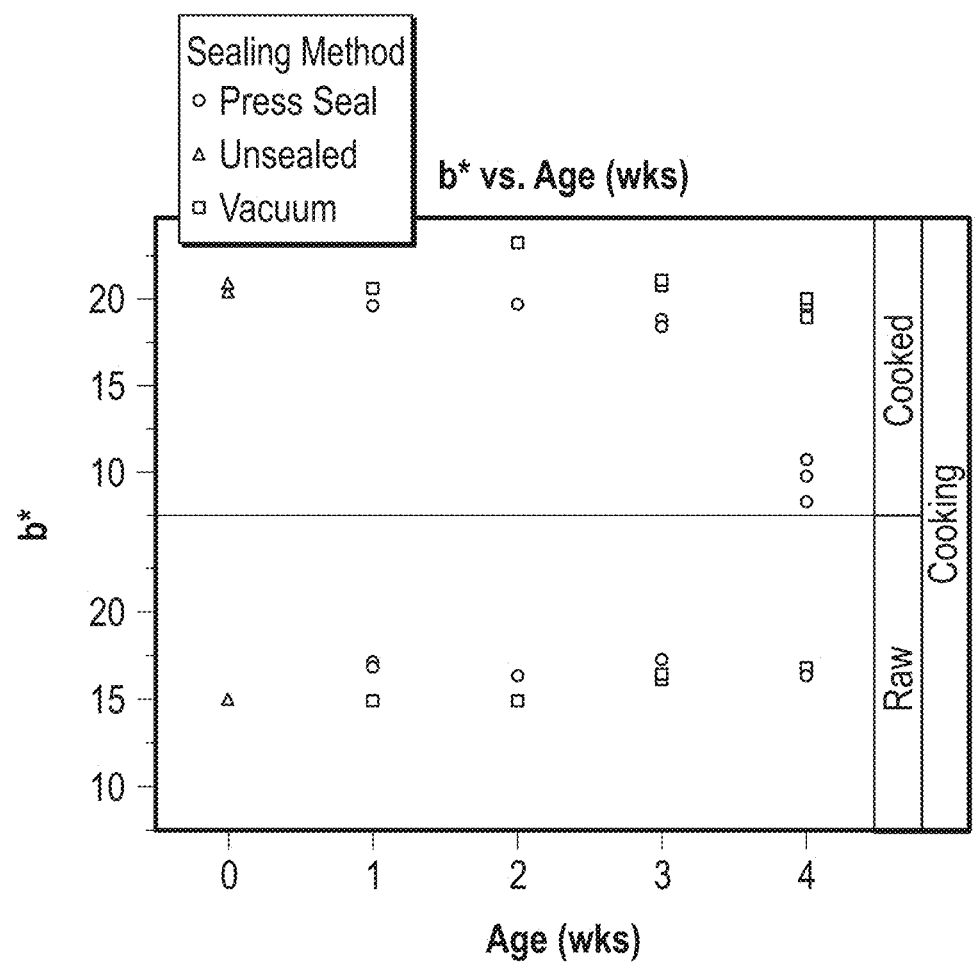

As shown in FIG. 3B, colors and color change profiles were similar for samples stored for up to 4 weeks under refrigeration.

Sizzle Sound Analysis

Figure 4A:
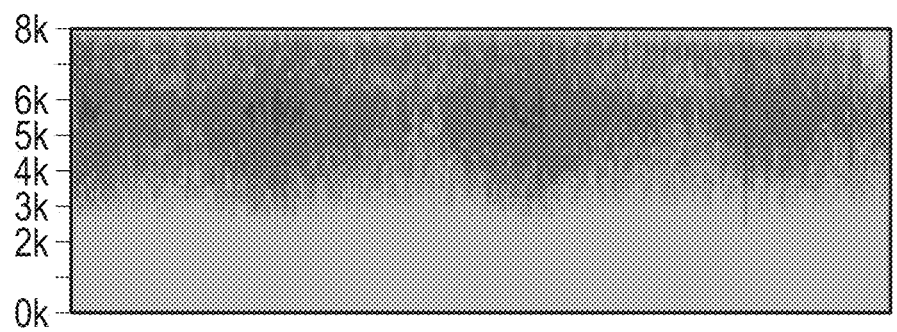
FIG. 4 shows acoustic spectrograms of ground beef (A) and meat-like food products (B, C), at 4 C, in accordance with a representative embodiment of the present invention.
Figure 4B:
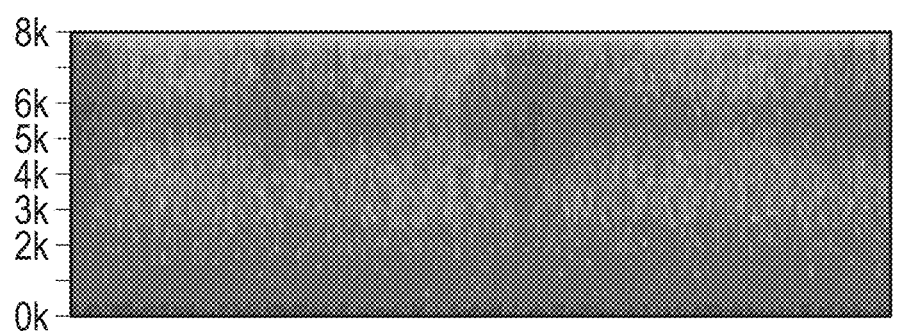
Figure 4C:
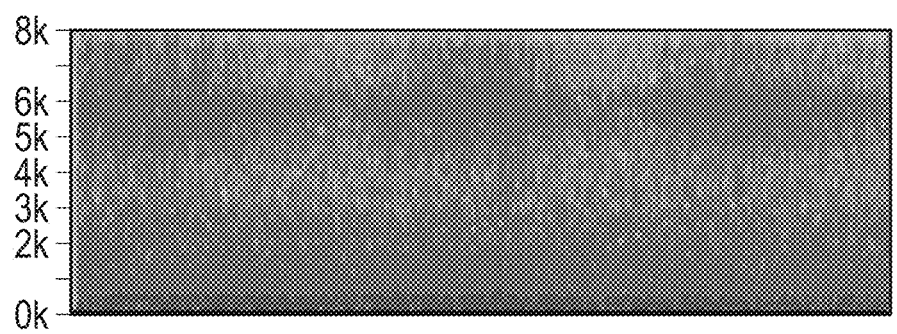

Audio sizzle characterization was done by recording the sound emitted from a 90 g patty as it was cooked for 5 min on each side at 350° F. in an acoustically isolated (quiet) environment. The obtained spectrograms show a visual representation of sound over time (x-axis), highlighting the relative amplitudes of sound (pink=higher intensity, blue=lower intensity) at a particular frequency (y-axis). As shown in FIG. 4, the meat-like food product in panel B exhibited a similar sizzle sound change profile (e.g., similar sizzle intensity ramp time, sizzle decay rate, sizzle duration) compared to ground beef (A) whereas the meat-like food product in panel C exhibited a different sizzle sound change profile.

Phase Composition Analysis 100 g of a meat-like food product is combined in a blender with 300 g of water, and blended on high setting for 3 minutes or until all components are reasonably small. The blended mix is passed through a sieve or filter to remove "solid" components, and the mass of this solid phase is recorded. The remaining lipid and aqueous phases are loaded into a centrifuge, and centrifuged for 10 minutes at 8,000 g. The centrifuge tubes moved from the centrifuge, inspected for phase blockages, stirred gently, and reloaded into the centrifuge. Centrifugation, inspection, and stirring are repeated a total of 3 times. The supernatant layer comprising the lipid phase is decanted, and its mass is recorded. The mass of the remaining aqueous phase is also recorded, and subtracted from the 300 g of water that was initially added.

Juice Extraction Assay

Uncooked samples were portioning into 113 g spheres, and formed into patties by compressing the sphere to a thickness of 22 mm. Each sample was individually vacuum sealed, frozen at −20° C., and stored at 4° C. for about 24 hours (to ensure sample internal temperatures of between 0° C. and 10° C.). Samples were then cooked 4 min/side at 218° C. (425° F.), cooled for 5 minutes, and then chopped into 36 pieces via 6 parallel cuts and 6 perpendicular cuts. Chopped samples were placed in an Aeropress Model A80 (Aerobie, Inc., Palo Alto CA) and compressed using a load force of 7 kg for 5 minutes. Extracted juice was collected in a glass weighing dish, and the extracted juice mass was recorded. The % Juice Cooked Mass (JCM) was obtained by dividing the mass of the extracted juice and the mass of the cooked sample prior to juice extraction. The extracted juice was decanted into 15 mL polypropylene test tubes, heated at 50° C. for 60 minutes, and centrifuged at 3,500 rpm and 2,800 Relative Centrifugal Force (RCF; g) for 15 minutes. Post-centrifugation samples were evaluated by eye to obtain approximate oil and water volumes to the nearest 0.1 mL, from which the oil/water volume ratio (OWR) was calculated, the results of which are shown in Table 10.

TABLE 10

Average Juciness Results for a Meat-like Food Product

| JCM | Oil Volume (mL) | Water Volume (mL) | OWR |
|---|---|---|---|
| 0.1136 +/− 0.0094 | 7.03 +/− 0.78 | 3.29 +/− 0.78 | 2.25 +/− 0.57 |

Binding Assay

Figure 5:
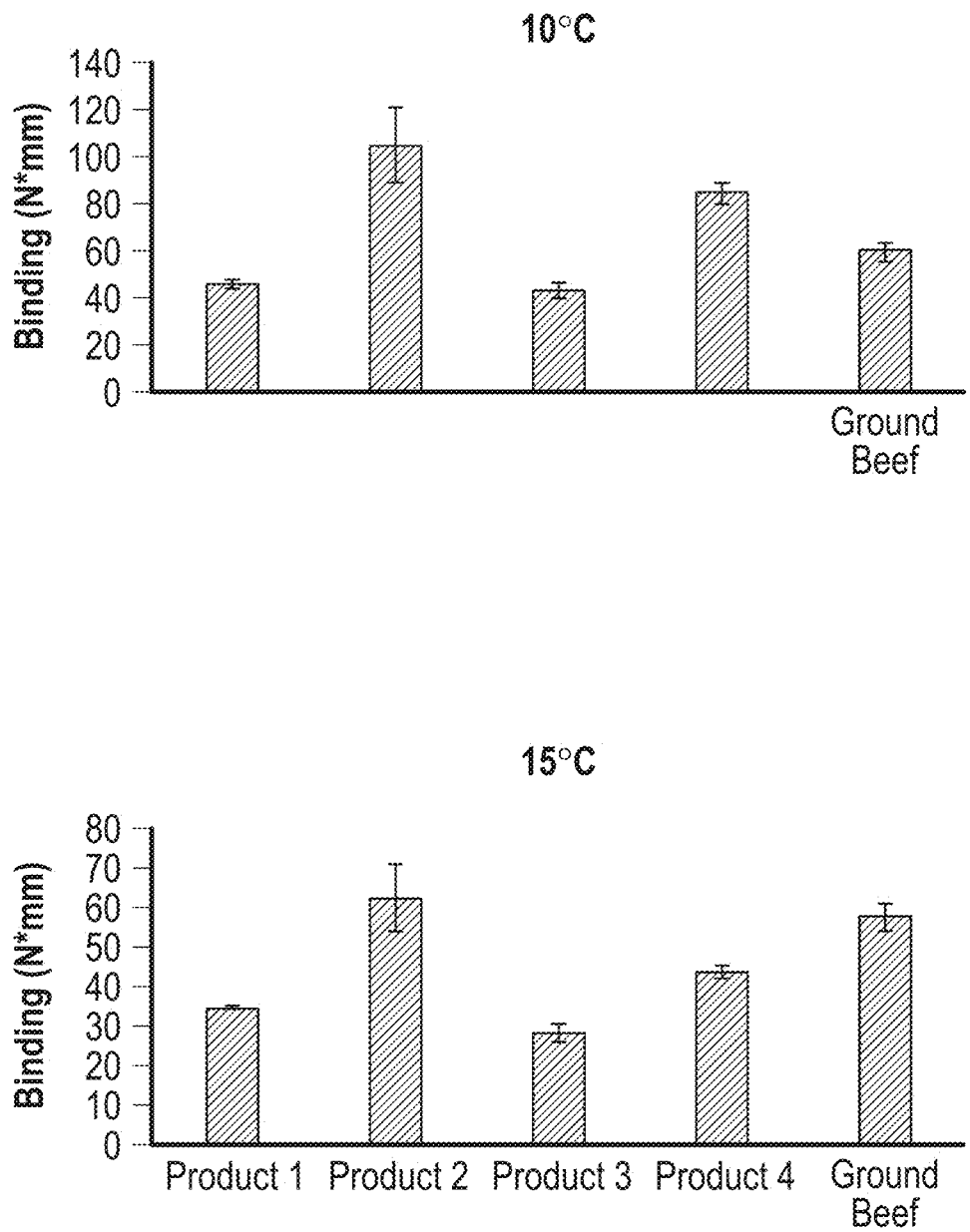
FIG. 5 shows binding at 10 C and 15 C of exemplified meat-like food products comprising agent release systems (lipogels and/or emulsions) and having different lipid contents at 4 C, in accordance with a representative embodiment of the present invention.

Uncooked samples were formed into 50 g balls and warmed or cooled to the test temperature before being formed into spheres using a manual meatball former. Compression analysis was performed using a TA.XT Express Texture Analyzer (Texture Technologies Corp., Hamilton, MA) and a TA-40A polymethylmethacrylate cylinder probe of 101.6 mm diameter and 10 mm height (Texture Technologies Corp., Hamilton, MA). The test sequence featured a single compression, a trigger force of 0.1 N, 60% strain, and a test speed of 0.5 mm/sec. The probe compressed the sample to 60% of its original sample height, and a deformation curve of the sample was obtained. Hardness was defined as the peak force. Binding was defined as the area under the curve between 0.2 N and the peak force. Average measurements were obtained from the analysis of 3 to 5 independent samples. As shown in FIG. 5, the lipid composition of meat-like food products comprising a lipogel as agent release system affected binding, as did inclusion of an emulsion as a second agent release system.

Human Sensory Analysis

Textural characteristics of FB12, FB17, FB18, and FB19 were evaluated by a panel of trained sensory experts (SCS Global Services, Emeryville, CA). Patties were formed and evaluated in uncooked and cooked state, and compared to 80/20 and 90/10 ground beef burgers purchased at Safeway. The samples were evaluated using a scorecard for a variety of attributes (e.g., surface color, flesh color, browning, aroma, smell, surface texture, taste, hardness/firmness, chewiness, bite force, mouthfeel, degradation, fattiness, adhesiveness, elasticity, rubberiness, surface thickness, moldability, binding/integrity, grittiness, graininess, lumpiness, greasiness, moistness, sliminess) and quality factors (e.g., aroma, flavor, appearance, and texture). As shown in Table 11, the meat-like food products were scored similar to 80/20 and 90/10 ground beef burger for many attributes and for overall quality.

TABLE 11

Results of Sensory Panel Evaluation

| Uncooked | Appearance | Aroma | Texture | Quality | |
|---|---|---|---|---|---|
| FB12 | 9.7 | 7.2 | 8.3 | 8.5 | |
| FB17 | 8.5 | 6.7 | 9.5 | 8.3 | |
| FB18 | 8.8 | 6.8 | 9.2 | 8.7 | |
| FB19 | 7.8 | 6.5 | 6.5 | 6.8 | |
| 80/20 Ground Beef | 12.8 | 12.7 | 12.3 | 12.7 | |
| 90/10 Ground Beef | 12.8 | 12.3 | 12.2 | 12.7 | |

| Cooked | Appearance | Aroma | Texture | Quality | Flavor Balance |
|---|---|---|---|---|---|
| FB12 | 9.3 | 7.7 | 8.2 | 8.3 | 6.8 |
| FB17 | 10.5 | 8.8 | 10.2 | 9.2 | 9.0 |
| FB18 | 10.0 | 8.7 | 8.8 | 8.2 | 7.2 |
| FB19 | 7.7 | 7.2 | 8.2 | 7.8 | 7.7 |
| 80/20 Ground Beef | 8.8 | 8.7 | 7.5 | 7.7 | 6.8 |
| 90/10 Ground Beef | 9.7 | 9.3 | 9.0 | 9.2 | 8.8 |

Sensory experts' comments on the uncooked meat-like food products included "Looks very much like real ground beef"; "Pretty good texture and flavor."; "This looks like raw ground beef"; "Even the texture is amazing. Looks like meat fibers when you pull it apart—could fool some carnivores."; "In the raw state, this is the closest I've seen to ground beef."

Sensory experts' comments on the cooked meat-like food products included "Very close to beef in cooked appearance."; "Good texture . . . very much like eating a beef hamburger."; "Looks like a well-done patty."; "Great taste."; "I REALLY LIKE THIS! GREAT TASTE PROFILE."; "The best meat substitute I've seen."

Example 6—Production of Meat-Like Food Products Comprising Yeast Cell Wall Material as Agent Release System Yeast Cell Wall Material with Bound Dye Three meat-like food products were prepared by combining the following ingredients:
1) meat structured protein product material (30-40% of finished product, quantum satis; produced essentially as described in Example 2);
2) water mixture containing 0.2% (wt./wt.) of Foodgard (Biosecur Lab Inc.; Quebec, Canada) (total water mixture was 38.7% of finished product);
3) dry mixture comprising 2.4% (wt./wt.) of natural flavors, 0.9% (wt./wt.) Novation 6600 Potato Starch (Ingredion, Westchester, IL) and 1.1% (wt./wt.) Methocel MX methyl cellulose (Dow Chemical Company, Midland, MI) (total mixture was 4.4% of finished product);
4) oil-fiber mixture that comprised 1.6% (wt./wt.) QC200 Bamboo Fiber (CreaFill, Chestertown, MD), 9.0% (wt./wt.) canola oil (Western Pacific Oils, Commerce, CA) (total mixture was 10.6% of finished product) and addition of either:
   hydrated yeast cell wall material, prepared as described in Example 4 (Product D; final hydrated yeast cell wall material content of 2.6%); or
   Vegetone® Vivid Red 57.01 (Product E; final Vegetone® Vivid Red 57.01 content of 0.038%); or
   hydrated yeast cell wall material with bound Vegetone® Vivid Red 57.01 dye, prepared as described in Example 4 (Product F; final yeast cell wall material with bound dye content of 2.6% to deliver calculated amount of 0.038% of Vegetone® Vivid Red 57.01); and
5) fat blend that comprised 5.6% (wt./wt.) canola oil (Western Pacific Oils, Commerce, CA) and 3.6% (wt./wt.) coconut oil (Nutiva; Richmond, CA) (total fat blend was 9.2% of finished product).

The product mixture was formed into burger patties of 113 g with 80 mm average diameter (+/−10 mm), packed and sealed under modified atmosphere containing carbon dioxide and nitrogen gas, frozen for 24 hours, then thawed, and analyzed before and after cooking (on a Presto® 07211 Liddle Griddle [National Presto Industries Inc., Eau Claire, WI] set to a temperature of 350° F., for 3.5 minutes per side, flipping once).

The color of the uncooked and cooked patties was evaluated by a panel of 4 human subjects. All human subjects judged the color of uncooked Product E to be brighter red than the color of uncooked Product F, and both uncooked Product E and uncooked Product F considerably more red than uncooked Product D. All human subjects judged the color of cooked Product F to be brighter red than the color of cooked Product E.

Figure 6:
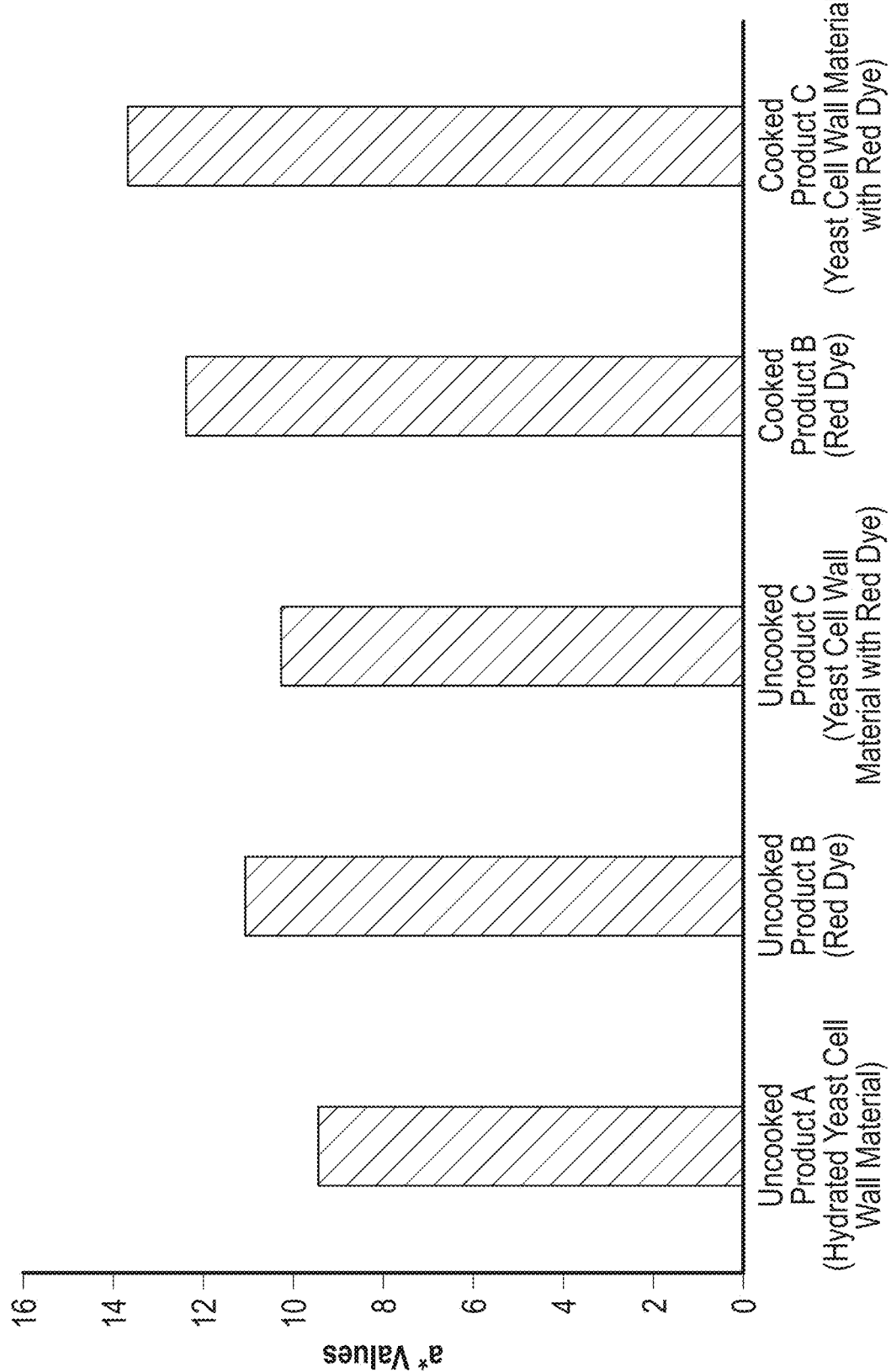
FIG. 6 shows a bar chart of a* values of various exemplified meat-like food products comprising yeast cell wall material with bound dye, at 4 C, in accordance with a representative embodiment of the present invention.

Spectral analysis confirmed the subjective evaluations made by the human subjects. Spectral analysis was done using a HunterLab Colorflex EZ system (HunterLab, Reston, VA) operating in L*a*b* color space. As shown in FIG. 6, uncooked Product B had a larger a* value (+0.9) than uncooked Product C, while both uncooked Product B and uncooked Product C had larger a* values (i.e., +1.7 and +0.8, respectively) than uncooked Product A. Upon heating, all a* values increased, and cooked Product C had a larger a* value (+1.3) than cooked Product B.

In sum, the experiment showed that yeast cell wall material can sequester a red dye and reduce the coloring effect of the dye on uncooked meat structured protein products. Furthermore, the yeast cell wall material could release the red dye upon cooking, and thereby intensify the red color of the meat structured product. The net effect was a larger color transition in red color from uncooked to cooked state when yeast cell wall material was used to provide a cooked product color more consistent with the appearance of a rare-to-medium cooked meat.

Yeast Cell Wall Material with Bound Brown Coloring Agent

Three meat structured protein products were prepared by combining the following ingredients:
1) fibrous protein product material (30-40% of finished product, quantum satis; produced essentially as described in Example 2);
2) colored water mixture containing 0.5% (wt./wt.) Vegetone® Vivid Red 57.01 (Kalsec Inc., Kalamazoo, MI), 0.1% (wt./wt.) of Natural Dark Red 5493 (ColorMaker Inc., Anaheim, CA), 0.2% (wt./wt.) of Foodgard citrus extract (Biosecur Lab Inc.; Quebec, Canada) and 37.9% (wt./wt.) water (total water mixture was 38.7% of finished product);
3) dry mixture comprising 2.4% (wt./wt.) of natural flavors, 0.9% (wt./wt.) Novation 6600 Potato Starch (Ingredion, Westchester, IL) and 1.1% (wt./wt.) Methocel MX methyl cellulose (Dow Chemical Company, Midland, MI) (total mixture was 4.4% of finished product);

4) oil-fiber mixture that comprised 1.6% (wt./wt.) QC200 Bamboo Fiber (CreaFill, Chestertown, MD), 9.0% (wt./wt.) canola oil (Western Pacific Oils, Commerce, CA) (total mixture was 10.6% of finished product) and addition of either:
  hydrated yeast cell wall material, prepared as described in Example 4 (Product G; final hydrated yeast cell wall material content of 2.6%); or
  brown coloring agent RA03036 (Product H; final brown coloring agent RA03036 content of 1.9%); or
  hydrated yeast cell wall material with bound brown coloring agent RA03036, prepared as described in Example 4 (Product I; final yeast cell wall material with bound brown color agent content of 2.6% to deliver calculated amount of 1.9% of RA03036); and
5) fat blend that comprised 5.6% (wt./wt.) canola oil (Western Pacific Oils, Commerce, CA) and 3.6% (wt./wt.) coconut oil (Nutiva; Richmond, CA) (total fat blend was 9.2% of finished product).

The product mixture was formed into burger patties of 113 g with 80 mm average diameter (+/−10 mm), packed and sealed under modified atmosphere containing carbon dioxide and nitrogen gas, frozen for 24 hours, then thawed, and analyzed before and after cooking (on a Presto® 07211 Liddle Griddle [National Presto Industries Inc., Eau Claire, WI] set to a temperature of 350° F., for 3.5 minutes per side, flipping once).

The color of the uncooked and cooked patties was evaluated by a panel of 4 human subjects. All human subjects judged the color of uncooked Product H to be greater in red intensity than uncooked Product I, and uncooked Product I and uncooked Product G to be similar in color and intensity. All human subjects judged the color of cooked Product I to be more preferable than cooked Product H for overall likeness in color relative to cooked meat. Cooked Product I was described to be significantly darker and browner than cooked Product G.

Figure 7:
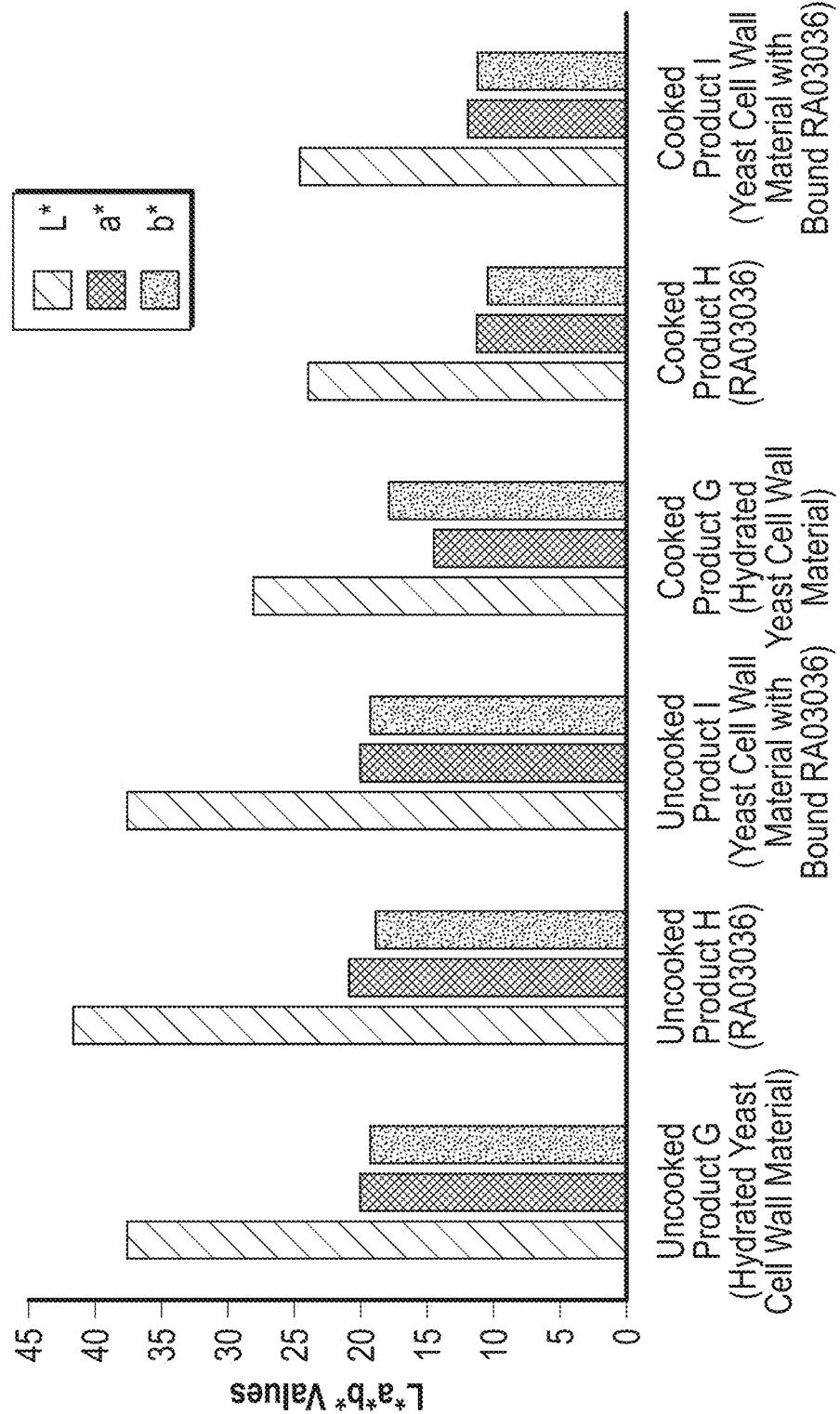
FIG. 7 shows a bar chart of L*a*b* values of exemplified meat-like food products comprising yeast cell wall material with bound brown coloring agent at 4 C, in accordance with a representative embodiment of the present invention.

Spectral analysis in L*a*b* color space confirmed the subjective evaluations made by the human subjects. As shown in FIG. 7, uncooked Product I had lower L*a*b* values than uncooked Product H (L*[+3.9] and a*[+1.1]). Uncooked Product I had similar L*a*b* values as uncooked Product G. After cooking, Product H and cooked Product I had similar L*a*b* values, but cooked Product I had markedly lower L*(−3.5), a*(−2.6), and b*(−6.5) values than cooked Product G.

In sum, the experiment showed that yeast cell wall material can sequester a brown coloring agent and reduce the coloring effect of the agent on the color of uncooked meat structured protein products. Furthermore, the yeast cell wall material could release the browning agent upon cooking, and thereby achieve nearly the same extent of browning of a cooked meat structured protein product as was affected by the brown coloring agent alone.

Yeast Cell Wall Material with Bound Carbohydrates

Two meat structured protein products were prepared from the following ingredients:
1) fibrous protein product material (30-40% of finished product, quantum satis; produced essentially as described in Example 2);
2) colored water mixture containing 0.5% (wt./wt.) Vegetone® Vivid Red 57.01 (Kalsec Inc., Kalamazoo, MI), 0.1% (wt./wt.) of Natural Dark Red 5493 (ColorMaker Inc., Anaheim, CA), 0.2% (wt./wt.) of Foodgard citrus extract (Biosecur Lab Inc.; Quebec, Canada) and 37.9% (wt./wt.) water (total water mixture was 38.7% of finished product);
3) dry mixture comprising 2.4% (wt./wt.) of natural flavors, 0.9% (wt./wt.) Novation 6600 Potato Starch (Ingredion, Westchester, IL) and 1.1% (wt./wt.) Methocel MX methyl cellulose (Dow Chemical Company, Midland, MI) (total mixture was 4.4% of finished product);
4) oil-fiber mixture that comprised 1.6% (wt./wt.) QC200 Bamboo Fiber (CreaFill, Chestertown, MD), 9.0% (wt./wt.) canola oil (Western Pacific Oils, Commerce, CA) (total mixture was 10.6% of finished product) and addition of either:
  hydrated yeast cell wall material, prepared as described in Example 4 (Product J; final yeast cell wall material content of 0.75%); or
  ribose 6M solution (Product K; final content of 0.6% of 6M solution); or
  hydrated yeast cell wall material comprising bound ribose, prepared as described in Example 4 (Product L; final yeast cell wall material with bound ribose content of 0.75% to deliver calculated final amount of 0.6% of ribose 6M solution); and
5) fat blend that comprised 5.6% (wt./wt.) canola oil (Western Pacific Oils, Commerce, CA) and 3.6% (wt./wt.) coconut oil (Nutiva; Richmond, CA) (total fat blend was 9.2% of finished product).

The product mixture was formed into burger patties of 113 g with 80 mm average diameter (+/−10 mm), packed and sealed under modified atmosphere containing carbon dioxide and nitrogen gas, frozen for 24 hours, then thawed, and analyzed before and after cooking (on a Presto® 07211 Liddle Griddle [National Presto Industries Inc., Eau Claire, WI] set to a temperature of 350° F., for 3.5 minutes per side, flipping once).

The color of the cooked patties was evaluated by a panel of 4 human subjects. All human subjects judged cooked Product L to have definitive browning and charring on the surface of the patty that was markedly greater than Product J that showed no obvious charring effect.

Figure 8:
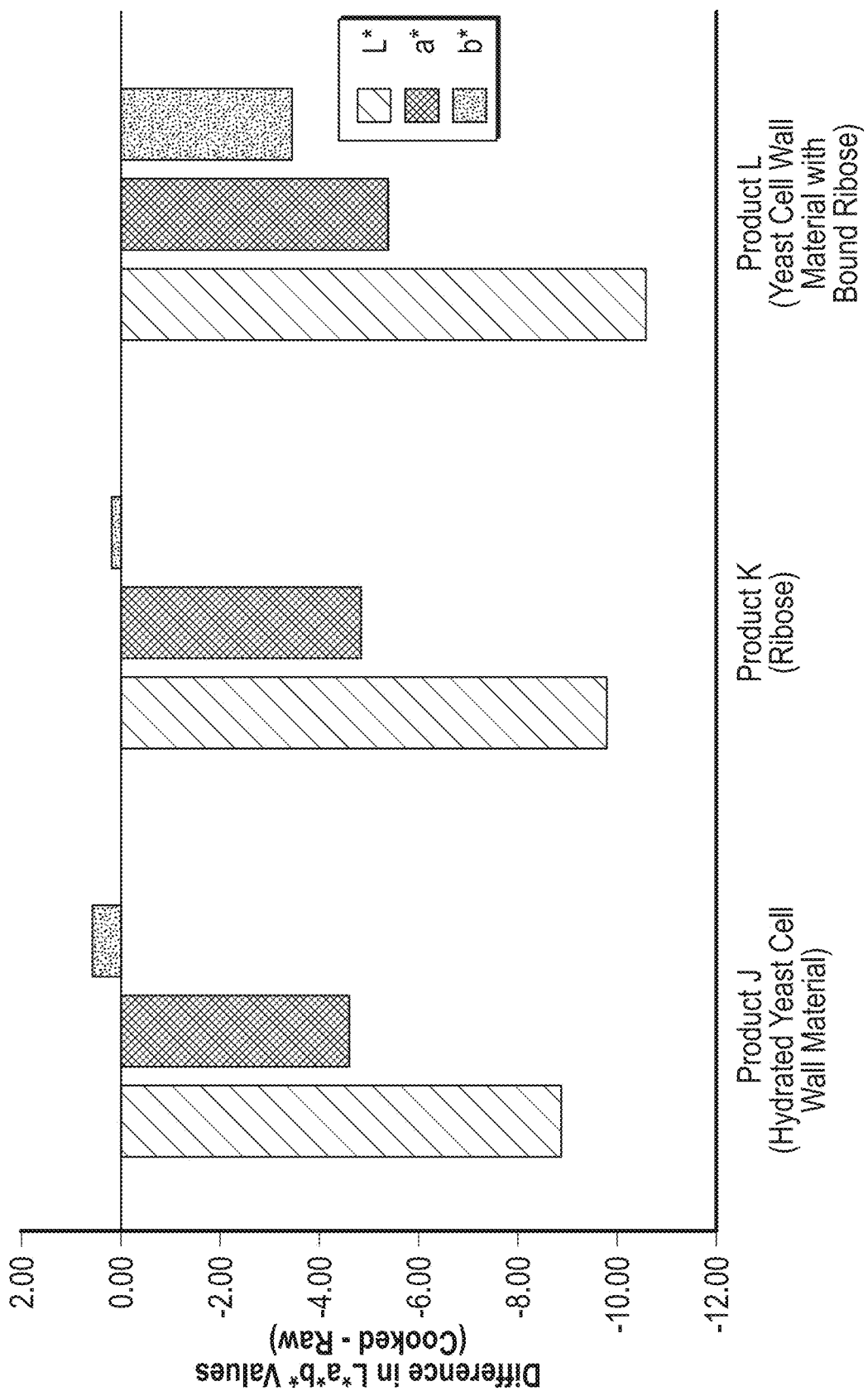
FIG. 8 shows a bar chart of difference in L*a*b* values of cooked and uncooked exemplified meat-like food products comprising yeast cell wall material with bound carbohydrates at 4 C, in accordance with a representative embodiment of the present invention.

Spectral analysis in L*a*b* color space confirmed the subjective evaluations made by the human subjects. As shown in FIG. 8, Product L exhibited a greater color transition as shown by decreased L*a*b* values (L*−10.6 units, a*−5.4 units and b*−3.4 units difference in uncooked to cooked state) compared to Product J (L*−8.9 units, a*−4.6 units and b*+0.6 units difference in uncooked to cooked state). Product L also gave a greater color transition than Product K as shown in L*a*b* values (i.e., Product L was L*−0.8 units, a*−0.6 units and b*−3.6 units relative to Product K).

In sum, the experiment showed that yeast cell wall material bound with ribose was capable of effecting browning, charring, and caramelization in meat structured protein products during cooking (e.g., by delivering a 'reducing' sugar). A greater color transition from uncooked to cooked state was obtained in the case wherein ribose was bound with yeast cell wall material.

What is claimed is:
1. A meat-like food product comprising:
  at least 25% by weight of a meat structured protein product;
  at least 0.0001% by weight of an agent release system comprising an agent to be released when a trigger condition is reached, wherein the trigger condition is a cooking temperature of at least 75° C.; and
  at least 0.1% by weight of a binding agent that binds together the meat structured protein product and the agent release system in a cohesive mass, wherein the agent release system is distributed in the meat-like food product and comprises a water-in-oil emulsion, comprising:
a dispersed carrier phase comprising water and the agent to be released; wherein the agent to be released is selected from the group consisting of a coloring agent selected from the group consisting of beet root extract, pomegranate fruit extract, cherry extract, carrot extract, red cabbage extract, red seaweed extract, beet root juice, pomegranate fruit juice, cherry juice, carrot juice, red cabbage juice, red seaweed juice anthocyanins, betanins, canthaxanthin, carmel, carmine, cochineal extract, curcumin, riboflavin saffron and turmeric, a color enhancer selected from the group consisting of non-flavonoid phenols, flavonols, arginine, metal ions, metal ion complexes, transition metals, transition metal complexes and polyphenols, and a color stabilizer selected from the group consisting of antioxidants, pH or ionic strength adjusting agents, chelating agents, reactive metal complexes and anti-microbial agents; wherein said agent to be released is water soluble and
a continuous phase including lipids.

2. A meat-like food product of claim 1, wherein the meat-like food product comprises between about 25% and about 60% by weight of the meat structured protein product.

3. A meat-like food product of claim 2, wherein the meat-like food product comprises between about 35% and about 40% by weight of the meat structured protein product.

4. A meat-like food product of claim 1, wherein the meat structured protein product comprises a first meat structure protein product and a second meat structured protein product, wherein the first meat structure protein product and the second meat structured protein product have a difference in an attribute.

5. A meat-like food product of claim 4, wherein the attribute is size.

6. A meat-like food product of claim 5, wherein the first meat structured protein product is of a size such that the first meat structured protein product can pass through a sieve having a pore size of about 3.125 mm, and wherein the second meat structured protein product is of a size is such that the second meat structured protein product can pass through a sieve having a pore size of no less than about 6.35 mm but not through a sieve having a pore size of about 3.125 mm.

7. A meat-like food product of claim 6, wherein the meat-like food product comprises between about 40% and about 50% by weight of the first meat structured protein product and between about 60% and about 50% by weight of the second meat structured protein product.

8. A meat-like food product of claim 1, wherein the meat structured protein product comprises between about 5% and about 70% by weight of protein, between about 0.5% and about 25% by weight of total carbohydrate, between about 0.05% and about 10% by weight of edible fiber, between about 0.1% and about 25% by weight of total lipid, and between about 30% and about 80% by weight of water.

9. A meat-like food product of claim 8, wherein the meat structured protein product comprises between about 30% and about 60% by weight of protein, between about 1% and about 10% by weight of total carbohydrate, between about 0.1% and about 5% by weight of edible fiber, between about 1% and about 5% by weight of total lipid, and between about 40% and about 60% by weight of water.

10. A meat-like food product of claim 9, wherein the meat structured protein product comprises between about 40% and about 60% by weight of protein, between about 2% and about 4% by weight of total carbohydrate, between about 2% and about 4% by weight of edible fiber, between about 3% and about 5% by weight of total lipid, and between about 45% and about 55% by weight of water.

11. A meat-like food product of claim 1, wherein the meat-like food product comprises between about 0.1% and about 10% by weight of the binding agent.

12. A meat-like food product of claim 11, wherein the meat-like food product comprises between about 1.0% and about 4.0% by weight of the binding agent.

13. A meat-like food product of claim 1, wherein the binding agent is a starch.

14. A meat-like food product of claim 1, wherein the binding agent is methyl cellulose.

15. A meat-like food product of claim 1, wherein the meat-like food product comprises between about 0.5% and about 50% by weight of the agent release.

16. A meat-like food product of claim 15, wherein the meat-like food product comprises between about 3% and about 10% by weight of the agent release system.

17. A meat-like food product of claim 15, wherein the meat-like food product comprises between about 1% and about 40% by weight of the agent release system.

18. A meat-like food product of claim 8, wherein the protein consists of pea protein.

19. A meat-like food product of claim 17, wherein the meat-like food product comprises between about 10% and about 35% by weight of the agent release system.

20. A meat-like food product of claim 19, wherein the meat-like food product comprises between about 10% and about 15% by weight of the agent release system.

21. A meat-like food product of claim 4, wherein the attribute is protein type.

22. A meat-like food product of claim 1, wherein the agent release system is distributed uniformly in the meat-like food product such that a property imparted by the agent release system is evenly distributed.

23. A meat-like food product of claim 1, wherein the agent release system is distributed non-uniformly in the meat-like food product.

24. A meat-like food product of claim 1, wherein the water-in-oil emulsion further comprises a taste agent, taste enhancer, or taste stabilizer.

25. A meat-like food product of claim 1, wherein the water-in-oil emulsion further comprises an aroma agent, aroma enhancer, or aroma stabilizer.

26. A meat-like food product of claim 1, wherein the agent release system comprises at least about 45% by weight of lipid.

27. A meat-like food product of claim 1, wherein the emulsion comprises a lipid selected from the group consisting of canola oil, sunflower oil, algal oil, aloe vera oil, avocado oil, glycerides, triglycerides, corn oil, cottonseed oil, flax seed oil, grape seed oil, linseed oil, olive oil, palm oil, peanut oil, rapeseed oil, sesame oil, soybean oil, safflower oil, rice oil, cocoa butter, shea butter, coconut oil, phospholipids, and fatty acids.

28. A meat-like food product of claim 1, wherein the emulsion comprises at least about 10% by weight of palm oil or coconut oil.

29. A meat-like food product of claim 1, wherein the emulsion comprises at least about 10% by weight of coconut oil and at least about 30% by weight of canola oil.

30. A meat-like food product of claim 1, wherein the emulsion further comprises an emulsifier.

31. A meat-like food product of claim 30, wherein the emulsion comprises between about 0.1% and about 10% by weight of the emulsifier.

32. A meat-like food product of claim 31, wherein the emulsion comprises at least about 30% by weight of sunflower oil or canola oil.

33. A meat-like food product of claim 31, wherein the emulsion comprises at least about 10% by weight of palm oil or coconut oil.

34. A meat-like food product of claim 30, wherein the emulsifier is selected from the group consisting of lecithins, phospholipids, polyglycerol polyricinoleate, sorbitan fatty acids esters, sorbitan monostearate, sorbitan trioleate (Span 85), sorbitan tristearate (Span 65), sorbitan sesquioleate (Arlacel 83), glyceryl monostearate, sorbitan monooleate (Span 80), sorbitan monostearate (Span 60), sorbitan monopalmitate (Span 40), sorbitan monolaurate (Span 20), and diacetyl tartaric acid esters.

35. A meat-like food product of claim 30, wherein the emulsifier is polyglycerol polyricinoleate or sorbitan monostearate.

36. A meat-like food product of claim 1, wherein the emulsion is a gel stabilized emulsion comprising a gelling agent.

37. A meat-like food product of claim 36, wherein the gelling agent is a modified polysaccharide selected from the group consisting of methyl cellulose, ethyl cellulose, carboxymethyl cellulose, hydroxypropylmethylcellulose, carrageenan, alginic acid, calcium alginate, agar, agarose, oat hydrocolloid, yeast beta-glucans, pullulan, glucuronan, pectin, low methoxyl pectin, locust bean gum, gum Arabic, gellan gum, and xanthan gum.

38. A meat-like food product of claim 1, wherein the lipid comprises a wax molecule.

39. A meat-like food product of claim 38, wherein the wax molecule is selected from the group consisting of carnauba wax molecules, ouricury wax molecules, and candellila wax molecules.

40. A meat-like food product of claim 1, wherein the antioxidant is selected from the group consisting of ascorbic acid, rosemary extract, gluconate, and metal ions.

41. A meat-like food product of claim 1, wherein the pH or ionic strength adjusting agents are selected from the group consisting of acetic acid, hydrochloric acid, phosphoric acid, nitric acid, citric acid, succinic acid, lactic acid, glucono-delta-lactone, sodium hydroxide, sodium bicarbonate, calcium hydroxide, calcium bicarbonate, calcium carbonate, potassium hydroxide, potassium bicarbonate, and trisodium phosphate.

42. A meat-like food product of claim 1, wherein the meat-like food product comprises between about 2% and about 6% by weight of edible fiber.

43. A meat-like food product of claim 1, wherein the meat-like food product comprises between about 0.5% and about 15% by weight of plant starch.

44. A meat-like food product of claim 1, wherein the meat-like food comprises between about 10% and about 25% by weight of protein, between about 6% and about 23% by weight of lipid, between about 4% and about 7% by weight of total carbohydrate, between about 3% and about 4.5% by weight of edible fiber and, further, has a moisture content of between about 40% and about 80% by weight.

45. A meat-like food product of claim 1, wherein the cohesive mass further comprises a coloring agent.

46. A meat-like food product of claim 45, wherein the coloring agent is a browning agent selected from the group consisting of a pentose, a hexose, a dextrin, and a commercial browning agent.

47. A meat-like food product of claim 45, wherein the coloring agent comprises a mixture selected from the group consisting of a beet extract and annatto mixture, a beet extract and purple carrot mixture, a beet extract and tomato extract mixture, a beet extract and lycopene mixture, a beet extract and beta carotene mixture, a beet extract and anthocyanin mixture, a beet extract and anthocyanin and annatto mixture, a beet extract and annatto and lycopene mixture, a beet extract and ascorbic acid, anthocyanin and annatto mixture, a beet extract and annatto and ascorbic acid mixture, a beet extract and annatto and beta carotene mixture, a beet extract and turmeric and ascorbic acid mixture, and a anthocyanin and lycopene and annatto mixture.

48. A meat-like food product of claim 47, wherein the beet extract and annatto mixture comprises beet extract and annatto at unequal weight ratios.

49. A meat-like food product of claim 48, wherein the beet extract and annatto mixture comprises beet extract and annatto at a weight ratio of 99:1.

50. A meat-like food product of claim 48, wherein the beet extract and annatto mixture comprises beet extract and annatto at a weight ratio of 80:20.

51. A meat-like food product of claim 1, wherein the meat-like food product comprises between about 15% and about 30% by weight of protein.

52. A meat-like food product of claim 1, wherein the meat-like food product comprises between about 2% and about 25% by weight of lipid.

53. A meat-like food product of claim 1, wherein the meat-like food product comprises between about 3% and about 35% by weight of total carbohydrate.

54. A meat-like food product of claim 1, wherein the meat-like food product comprises between about 0.01% and about 5% by weight of at least one shelf-life extending agent selected from the group consisting of carbon monoxide, nitrites, sodium metabisulfite, Bombal, vitamin E, rosemary extract, green tea extract, catechins, and antioxidants.

55. A meat-like food product of claim 1, wherein the meat-like food product comprises between 0.01% and about 5% by weight of an antioxidant selected from the group consisting of carotenes, resveratrol, alpha-tocopherol, lutein, zeaxanthin, ascorbyl palmitate, ascorbyl stearate, caffeic acid, carnosol, chlorogenic acid, coffee bean extract, ellagic acid, ethylenediaminetetraacetic acid (EDTA), eugenol, ferulic acid, flavanones, flavones, isoflavones, flavonoids, flavanols, gallic acid, acetyl gallate, methyl gallate, ethyl gallate, dodecyl gallate, gentian extract, lactic acid, sinapic acid, quercetin, retinyl palmitate, rice bran extract, rosemary extract, rosmarinic acid, sage extract, and tocopherols.

56. A meat-like food product of claim 1, wherein the meat-like food product comprises between 0.01% and about 5% by weight of a vitamin, dietary mineral, or essential nutrient selected from the group consisting of alpha-tocopherol, alpha-tocotrienol, betatocopherol, beta-tocotrienol, delta-tocopherol, delta-tocotrienols, gamma-tocopherol, gammatocotrienol, pantothenic acid, vitamin A, vitamin B-12, vitamin C, vitamin D, vitamin E, vitamin K, calcium, gypsum, iron, magnesium, potassium, aluminum, alpha-linolenic acid, gammalinolenic acid, linoleic acid, calcium, iron, omega-3 fatty acids, and zinc.

57. A meat-like food product of claim 1, wherein the binding agent is selected from the group consisting of mung bean protein, canola protein isolate, chickpea protein, lentil protein, pea protein, potato protein isolate, soybean protein, sunflower seed protein, wheat protein isolate, algae protein concentrate, chickpea protein concentrate, rice protein concentrate, hemp protein concentrate, fava bean protein concentrate, and vital wheat gluten concentrate.

58. A meat-like food product of claim 1, wherein the meat structured protein product has a fold-volume-change-after-hydration of between about 1.8 and about 3.

59. A meat-like food product of claim 1, wherein the meat structured protein product is of a size such that the meat structure protein product can pass through a sieve having a pore size of less than about 10 mm.

60. A meat-like food product of claim 1, wherein the temperature is between 75° C. and 100° C.

61. A meat-like food product of claim 1, wherein when the meat-like food product is in an uncooked state, the meat-like food product has a first spectral absorption profile selected from the group consisting of: (i) a L* value between 36.7-49, an a* value between 21.3-21.8, and b* value between 20.7-22.8; (ii) a L* value between 39-40.7, an a* value between 17.3-18.3; and a b* value between 16.8-20.7; and (iii) a L* value between 43.5-46.5, an a* value between 18-19.2, and a b* value between 14.5-15.

62. A meat-like food product of claim 61, wherein when the meat-like food product is in a cooked state, the meat-like food product has a second spectral absorption profile selected from the group consisting of: (i) a L* value between 26.4-27.8, an a* value between 12.2-12.8, and a b* value between 15.2-18.4; (ii) a L* value between 28.9-34.8, an a* value between 9.4-10.6, and a b* value between 12.4-19; and (iii) a L* value between 37-39.5, an a* value between 13.5-14.5, and a b* value between 20-21.5.

63. A meat-like food product of claim 1, wherein the agent release system protects the coloring agent, color enhancer, or color stabilizer from a chemical transformation.

64. A meat-like food product of claim 1, further comprising an agent that imparts or enhances an uncooked meat-like color on the meat-like food product, wherein the agent release system separates the agent to be released from the agent that imparts or enhances an uncooked meat-like color on the meat-like food product.

65. A meat-like food product of claim 1, wherein the emulsion comprises droplets having an average size, wherein the average size imparts a meat-like color on the meat-like food product.

66. A meat-like food product of claim 65, wherein the average size is between 100 nm and 800 nm.

67. A meat-like food product of claim 30, wherein the emulsifier is an emulsifier with a low hydrophile-lipophile balance (HLB).

68. A meat-like food product comprising:
at least 25% by weight of a meat structured protein product; at least 0.0001% by weight of an agent release system comprising an agent to be released when a trigger condition is reached, wherein the trigger condition is a cooking temperature of at least 75° C.; and
at least 0.1% by weight of a binding agent that binds together the meat structured protein product and the agent release system in a cohesive mass;
wherein the agent release system is distributed throughout the meat-like food product and comprises:
a water-in-oil emulsion, comprising:
a dispersed carrier phase including water and the agent to be released, wherein the agent to be released is an anthocyanin; and
a continuous phase including lipids.

* * * * *